US012372021B2

(12) United States Patent
Zhou et al.

(10) Patent No.: US 12,372,021 B2
(45) Date of Patent: Jul. 29, 2025

(54) EXHAUST MIXER ASSEMBLY

(71) Applicant: CUMMINS EMISSION SOLUTIONS INC., Columbus, IN (US)

(72) Inventors: Jiantao Zhou, Wuhan (CN); Zhengfu Zhu, Wuxi (CN); Xuesong Li, Beijing (CN); Jian Yang, Beijing (CN); Yan Wang, Beijing (CN)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 18/911,668

(22) Filed: Oct. 10, 2024

(65) Prior Publication Data

US 2025/0122820 A1 Apr. 17, 2025

(30) Foreign Application Priority Data

Oct. 11, 2023 (CN) ......................... 202311316042.1

(51) Int. Cl.

| | |
|---|---|
| ***F01N 3/28*** | (2006.01) |
| ***B01F 25/40*** | (2022.01) |
| ***B01F 25/42*** | (2022.01) |
| ***B01F 25/431*** | (2022.01) |
| ***F01N 1/08*** | (2006.01) |
| ***F01N 3/20*** | (2006.01) |

(52) U.S. Cl.

CPC ......... *F01N 3/2892* (2013.01); *F01N 3/2066* (2013.01); *B01F 25/40* (2022.01); *B01F 25/42* (2022.01); *B01F 25/431* (2022.01); *F01N 1/088* (2013.01); *F01N 3/206* (2013.01); *F01N 3/208* (2013.01); *F01N 2240/20* (2013.01); *F01N 2260/16* (2013.01); *F01N 2330/38* (2013.01); *F01N 2470/16* (2013.01); *F01N 2470/18* (2013.01); *F01N 2610/1453* (2013.01)

(58) Field of Classification Search

CPC combination set(s) only.
See application file for complete search history.

(56) References Cited

U.S. PATENT DOCUMENTS

| | | | | |
|---|---|---|---|---|
| 9,644,517 | B2 | 5/2017 | De Rudder | |
| 10,287,948 | B1 * | 5/2019 | Moulieres | B01F 25/4521 |
| 10,443,477 | B2 * | 10/2019 | Sampath | F01N 13/009 |

(Continued)

FOREIGN PATENT DOCUMENTS

WO WO-2022/178231 A 8/2022

*Primary Examiner* — Binh Q Tran
(74) *Attorney, Agent, or Firm* — Foley & Lardner LLP

(57) ABSTRACT

An exhaust mixer assembly includes a mixer housing, an inlet opening, an inlet plate, a support plate, a support plate opening, a conveying tube, an outlet plate, and an outlet plate opening. The mixer housing is coupled to the upstream housing. The inlet plate and the support plate define a first mixing chamber. The inlet opening is configured to receive exhaust from the upstream housing and deliver exhaust to the first mixing chamber. The support plate and the outlet plate define a second mixing chamber. The conveying tube is positioned in the second mixing chamber. The support plate opening is configured to receive treated exhaust from the first mixing chamber and deliver the treated exhaust to the second mixing chamber. The treated exhaust circumferentially flows through the second mixing chamber and through the conveying tube. The conveying tube delivers reductant to the outlet plate opening.

33 Claims, 33 Drawing Sheets

(56) References Cited

U.S. PATENT DOCUMENTS

| | | | | |
|---|---|---|---|---|
| 10,533,477 | B2 | 1/2020 | De Rudder et al. | |
| 11,035,277 | B2 * | 6/2021 | Ettorre | B01F 25/3141 |
| 2020/0131974 | A1 * | 4/2020 | Wang | F01N 3/0871 |
| 2020/0269189 | A1 * | 8/2020 | Alano | F01N 3/2066 |
| 2021/0095587 | A1 * | 4/2021 | Cvelbar | F01N 3/2066 |
| 2023/0151755 | A1 * | 5/2023 | Johnson | F01N 3/2892 60/282 |

* cited by examiner

EXHAUST MIXER ASSEMBLY

CROSS-REFERENCE TO RELATED APPLICATIONS

The present application claims priority to and the benefit of Chinese Patent Application No. 2023113160421, filed Oct. 11, 2023, the entire disclosure of which is hereby incorporated by reference herein.

TECHNICAL FIELD

The present application relates generally to an exhaust mixer assembly for an internal combustion engine.

BACKGROUND

Nitrogen oxide ($NO_x$) compounds are contained in exhaust of internal combustion engines, such as diesel engines. It is desirable to reduce $NO_x$ emissions, for example, to comply with environmental regulations. To reduce $NO_x$ emissions, reductant may be injected into the exhaust by a reductant delivery system coupled to a dosing system and within a vehicle system. The reductant facilitates conversion of a portion of the exhaust into non-$NO_x$ emissions, such as nitrogen ($N_2$), carbon dioxide ($CO_2$), and water ($H_2O$), thereby reducing $NO_x$ emissions. The flow of exhaust through the aftertreatment system must be swirled or otherwise agitated to promote mixing of the exhaust with reductant to reduce $NO_x$ emissions. However, with improper flow through the aftertreatment system, deposits of exhaust may pool within the system. Failure to allow the flow of exhaust at a desirable rate may reduce the efficiency of the vehicle system.

SUMMARY

In one embodiment, an exhaust mixer assembly includes a mixer housing, an inlet plate coupled to the mixer housing and comprising a first inlet opening, and a support plate coupled to the mixer housing downstream of the inlet plate. The support plate comprises a support plate opening. The exhaust mixer assembly also includes a first inlet tube having an upstream end coupled to the inlet plate and configured to receive exhaust from the inlet opening, and a downstream end that is closed by a first portion of the support plate. The first inlet tube includes a first inlet tube lateral opening that extends through a circumferential wall of the first inlet tube. The first inlet tube is offset from the support plate opening. The exhaust mixer assembly also includes an outlet plate coupled to the mixer housing downstream of the support plate. The outlet plate comprises an outlet plate opening. The exhaust mixer assembly further includes a conveying tube coupled to the support plate and the outlet plate. The conveying tube includes a conveying tube lateral opening that extends through a circumferential wall of the conveying tube. The conveying tube is configured to provide exhaust gas to the outlet opening.

In another embodiment, an exhaust mixer assembly includes a mixer housing. The exhaust mixer assembly also includes an inlet plate coupled to the mixer housing. The inlet plate includes a first inlet opening positioned on a first side of the inlet plate, and a second inlet opening positioned on a second side of the inlet plate opposite the first inlet opening. The exhaust mixer assembly also includes a support plate coupled to the mixer housing downstream of the inlet plate. The support plate comprises a support plate opening. The exhaust mixer assembly also includes a first wall and a second wall extending from the inlet plate to the support plate. The exhaust mixer assembly further includes a first chamber inside the first wall and the second wall. Upper edges of the first wall and the second wall define an opening into the first chamber and lower edges of the first wall and the second wall extend to the mixer housing. The exhaust mixer assembly further includes a second chamber outside of the first wall and the second wall. The exhaust mixer assembly also includes an outlet plate coupled to the mixer housing downstream of the support plate. The outlet plate comprises an outlet plate opening. The exhaust mixer assembly further includes a conveying tube coupled to the support plate and the outlet plate. The conveying tube includes a conveying tube lateral opening that extends through a circumferential wall of the conveying tube. The conveying tube is configured to provide exhaust gas to the outlet opening.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a mixer assembly for an aftertreatment system. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust that contains constituents, such as $NO_x$, $N_2$, $CO_2$, and/or $H_2O$. In some applications, an exhaust gas aftertreatment system is utilized to dose the exhaust gas with a reductant so as to reduce $NO_x$ emissions in the exhaust gas. In order to reduce emissions from an internal combustion engine, it may be desirable to treat exhaust gas by injecting reductant into the exhaust gas. However, it can be difficult to desirably treat the exhaust gas with the reductant if the exhaust gas and the reductant are not desirably mixed. Ensuring that desirable mixing occurs can be challenging in some applications, such as those with physical space and size constraints.

Implementations herein are related to exhaust gas aftertreatment systems that includes an exhaust mixer assembly. The exhaust mixer assembly disrupts the flow of exhaust through the aftertreatment system. The exhaust mixer assembly including a mixer housing surrounding a variety of components of the exhaust mixer assembly. The exhaust mixer assembly includes an inlet plate, a support plate, and an outlet plate, each of which is coupled to the mixer housing. The inlet plate and the support plate define a first mixing chamber where reductant is released into the aftertreatment system. In the first mixing chamber, exhaust gas is directed towards a center of the first mixing chamber such that the exhaust is mixed with reductant. The support plate and the outlet plate define a second mixing chamber. The second mixing chamber receives an exhaust reductant mixture from the first mixing chamber. The second mixing chamber swirls the exhaust reductant mixture circumferentially upward further mixing the exhaust reductant mixture before directing it through a conveying tube and out of the exhaust mixer assembly and into the catalyst member housing.

II. Overview of Exhaust Gas Aftertreatment System

Figure 1:
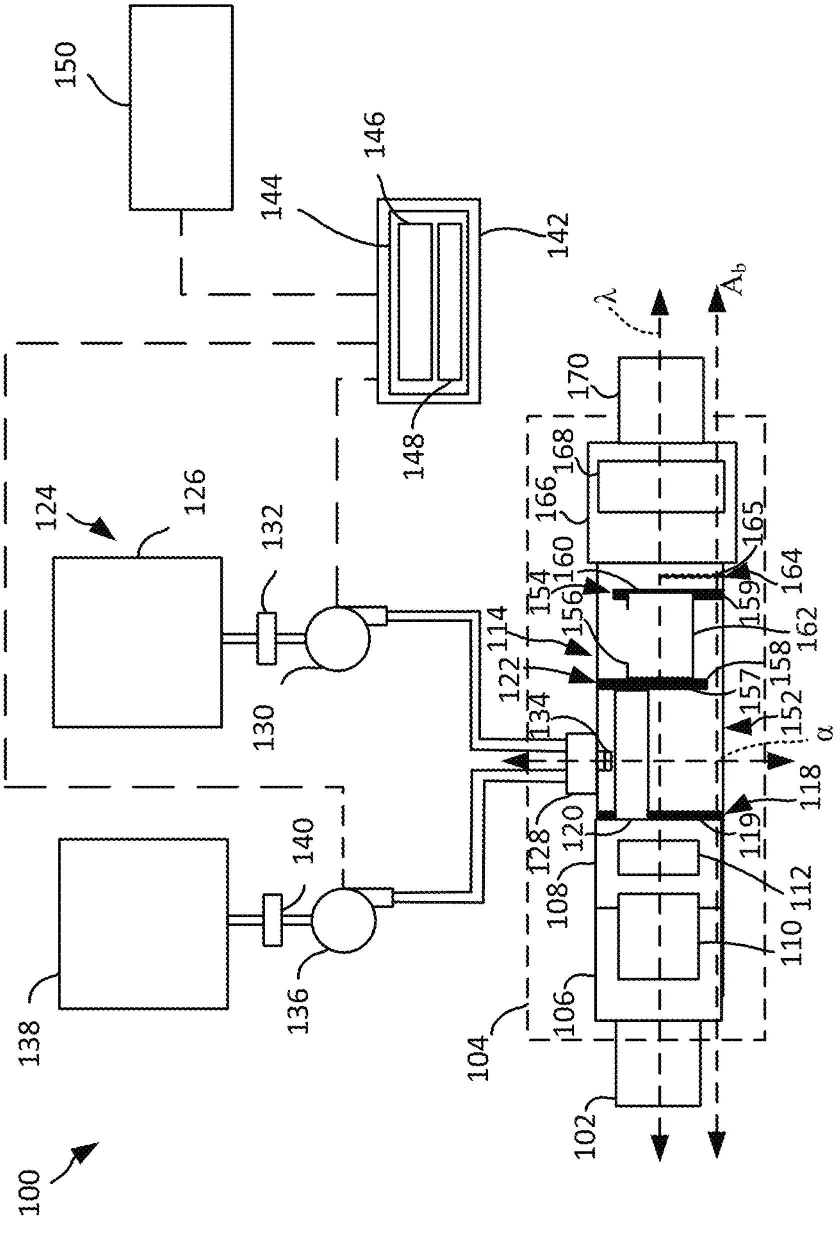
FIG. 1 is a block schematic diagram of a portion of an example exhaust aftertreatment system.

FIG. 1 depicts an exhaust gas aftertreatment system 100 (e.g., treatment system, etc.) for treating exhaust gas produced by an internal combustion engine (e.g., diesel internal combustion engine, gasoline internal combustion engine, hybrid internal combustion engine, propane internal combustion engine, dual-fuel internal combustion engine, etc.). The exhaust gas aftertreatment system 100 includes an upstream exhaust gas conduit 102 (e.g., line, pipe, etc.). The upstream exhaust gas conduit 102 is configured to receive exhaust gas from an upstream component (e.g., header, exhaust manifold, turbocharger, diesel oxidation catalyst, etc.). In some embodiments, the upstream exhaust gas conduit 102 is coupled to (e.g., attached to, fixed to, welded to, fastened to, riveted to, etc.) the internal combustion engine (e.g., the upstream exhaust gas conduit 102 is coupled to an outlet of the internal combustion engine, etc.). In other embodiments, the upstream exhaust gas conduit 102 is integrally formed with the internal combustion engine. As utilized herein, two or more elements are "integrally formed" with each other when the two or more elements are formed and joined together as part of a single manufacturing step to create a single-piece or unitary construction that cannot be disassembled without an at least partial destruction of the overall portion.

The exhaust gas aftertreatment system includes a housing assembly 104. The housing assembly 104 includes an intake body 106 (e.g., chamber, etc.). The intake body 106 is configured to receive exhaust gas from the upstream exhaust gas conduit 102. The housing assembly 104 also includes an upstream housing 108 (e.g., chamber, body, etc.). The upstream housing 108 is configured to receive exhaust gas from the intake body 106. In various embodiments, the upstream housing 108 is coupled to the intake body 106. For example, the upstream housing 108 may be fastened (e.g., using a band, using bolts, etc.), welded, riveted, or otherwise attached to the intake body 106. In other embodiments, the upstream housing 108 is integrally formed with (e.g., unitarily formed with, formed as a one-piece construction with, inseparable from, etc.) the intake body 106.

The upstream housing 108 is centered on a housing axis $\lambda$ (e.g., a longitudinal axis $\lambda$). In other words, a center point of a cross-section of the upstream housing 108 is disposed on the longitudinal axis λ along a length of the upstream housing 108. The exhaust gas may be provided (e.g., output, etc.) through the upstream housing 108 in a direction that is parallel to, or coincident with, the longitudinal axis λ.

The housing assembly 104 may include a heater (e.g., electrical heater, resistance heater, fluid heat exchanger, etc.) that is configured to heat the exhaust gas within the intake body 106 and/or the upstream housing 108. For example, the housing assembly 104 may include a heater that extends within the intake body 106 and is configured to heat the exhaust gas within the intake body 106. By heating the exhaust gas, catalytic reactions performed by catalyst members may increase and become more desirable. Additionally, heating the exhaust gas may facilitate regeneration of (e.g., burn-off of particulates from, etc.) various components of the exhaust gas aftertreatment system 100.

In various embodiments, the exhaust gas aftertreatment system 100 also includes an oxidation catalyst 110 (e.g., a diesel oxidation catalyst (DOC), etc.). At least a portion of the oxidation catalyst 110 is positioned within (e.g., contained within, housed within, located in, etc.) the upstream housing 108. In various embodiments, the oxidation catalyst 110 is positioned within the upstream housing 108 and the intake body 106. In other embodiments, the oxidation catalyst 110 is positioned within the upstream housing 108 and is not positioned within the intake body 106. In still other embodiments, the oxidation catalyst 110 is positioned within the intake body 106 and is not positioned within the upstream housing 108.

The exhaust gas is provided by the intake body 106 to the oxidation catalyst 110. The oxidation catalyst 110 may be configured to oxidize hydrocarbons and/or carbon monoxide in the exhaust gas. In this way, the oxidation catalyst 110 may remove hydrocarbons and/or carbon monoxide from the exhaust gas prior to the exhaust gas being provided to downstream components of the exhaust gas aftertreatment system 100. The oxidation catalyst 110 may be positioned within the intake body 106 and/or the upstream housing 108 (e.g., using a gasket, using a spacer, using a seal, etc.) such that flow of the exhaust gas between the oxidation catalyst and the intake body 106 and/or between the oxidation catalyst 110 and the upstream housing 108 is substantially prevented (e.g., mitigated, less than 1% of the exhaust gas flow received by the intake body 106 flows between the oxidation catalyst 110 and the intake body 106, less than 1% of the exhaust gas flow received by the intake body 106 flows between the oxidation catalyst 110 and the upstream housing 108, etc.).

The oxidation catalyst 110 may also be centered on the longitudinal axis λ. For example, where a diameter of the oxidation catalyst 110 is approximately (e.g., within 5% of, etc.) equal to a diameter of the upstream housing 108, a center point of a cross-section of the oxidation catalyst 110 may be disposed on the longitudinal axis λ along a length of the oxidation catalyst 110. The exhaust gas may be provided through the oxidation catalyst 110 in a direction that is parallel to, or coincident with, the longitudinal axis λ. As utilized herein, the term "diameter" connotes a length of a chord passing through a center point of a shape (e.g., square, rectangle, hexagon, circle, ellipse, pentagon, triangle, etc.).

In various embodiments, the exhaust gas aftertreatment system 100 also includes an exhaust gas filtration device 112 (e.g., a diesel particulate filter (DPF), etc.). The exhaust gas filtration device 112 is positioned within the upstream housing 108. For example, the exhaust gas filtration device 112 may be positioned within the upstream housing 108 downstream of the oxidation catalyst 110. The exhaust gas is provided by the oxidation catalyst 110 into the upstream housing 108 (e.g., between the oxidation catalyst 110, the upstream housing 108, and the exhaust gas filtration device 112, etc.) and subsequently into the exhaust gas filtration device 112 (e.g., after hydrocarbons in the exhaust gas have been oxidized by the oxidation catalyst 110, after carbon monoxide in the exhaust gas has been oxidized by the oxidation catalyst 110, etc.).

The exhaust gas filtration device 112 may remove particulates (e.g., soot, etc.) from the exhaust gas prior to the exhaust gas being provided to downstream components of the exhaust gas aftertreatment system 100. The exhaust gas filtration device 112 may be positioned within the upstream housing 108 (e.g., using a gasket, using a spacer, using a seal, etc.) such that flow of the exhaust gas between the exhaust gas filtration device 112 and the upstream housing 108 is substantially prevented (e.g., less than 1% of the exhaust gas flow received by the intake body 106 flows between the exhaust gas filtration device 112 and the upstream housing 108, etc.).

The exhaust gas filtration device 112 may be centered on the longitudinal axis λ. For example, where a diameter of the exhaust gas filtration device 112 is approximately equal to a diameter of the upstream housing 108, a center point of a cross-section of the exhaust gas filtration device 112 may be disposed on the longitudinal axis λ along a length of the exhaust gas filtration device 112. The exhaust gas may be provided through the exhaust gas filtration device 112 in a direction that is parallel to, or coincident with, the longitudinal axis λ.

The housing assembly 104 includes an exhaust mixer assembly 114. The exhaust mixer assembly 114 is positioned downstream of the upstream housing 108. The exhaust mixer assembly 114 is configured to mix exhaust with reductant. Exhaust may be provided from the upstream housing to the exhaust mixer assembly in a direction that is parallel to, or coincident with, the longitudinal axis λ.

The exhaust mixer assembly 114 includes a mixer housing 116. The mixer housing 116 may be coupled to the upstream housing 108 within the housing assembly 104. The mixer housing 116 is configured to house (e.g., surround, store, etc.) the various components that aid the mixing of exhaust and reductant. For example, the mixer housing 116 may be coupled to various components that aid the mixing of exhaust and reductant in an aftertreatment system.

The exhaust mixer assembly 114 includes an inlet plate 118. The inlet plate 118 is coupled to the mixer housing 116 towards an upstream end of the exhaust mixer assembly 114. The inlet plate 118 is configured to direct exhaust provided by the upstream housing 108 into the mixer housing 116.

The inlet plate 118 includes an inlet plate body 119. The inlet plate body 119 is a flat and solid portion of the inlet plate 118. The inlet plate body 119 is configured to disrupt the flow of exhaust through the exhaust mixer assembly 114. For example, the inlet plate 118 may disrupt (e.g., direct elsewhere, force elsewhere) the flow of exhaust provided in a direction that is parallel to, or coincident with, the longitudinal axis λ.

The inlet plate 118 includes an inlet opening 120. The inlet opening 120 is positioned in a top half of the inlet plate 118 when looking down the longitudinal axis λ of the mixer housing 116. For example, the inlet opening 120 is positioned in a half of the inlet plate 118 adjacent to (e.g., nearest, next to, etc.) a side of the mixer housing 116 where reductant is dosed into the aftertreatment system 100. The inlet opening 120 receives gas provided by the upstream housing 108. For example, the inlet opening 120 facilitates the passage of exhaust through the inlet plate 118.

The exhaust mixer assembly 114 also includes a support plate 122. The support plate 122 is also coupled to the mixer housing 116. The support plate 122 is coupled to the mixer housing 116 and is positioned downstream of the inlet plate 118. The support plate 122 is configured direct the flow of the exhaust and air mixture through the mixer housing 116 by blocking (e.g., preventing, mitigating, etc.) flow in a direction that is parallel to, or coincident with, the longitudinal axis λ.

The exhaust mixer assembly 114 further includes a reductant delivery system 124. The reductant delivery system 124 is positioned on an outer surface of the mixer housing 116. The reductant delivery system 124 is configured to facilitate the introduction of the reductant into the exhaust gas.

The reductant delivery system includes a dosing module 128 (e.g., doser, etc.). The dosing module 128 is configured to facilitate passage of the reductant through the mixer housing 116 and into the mixer housing 116. As is explained in more detail herein, the dosing module 128 is configured to receive reductant, and in some embodiments, configured to receive air and reductant, and provide the reductant and/or air-reductant mixture into the mixer housing 116 to facilitate treatment of the exhaust gas. The dosing module 128 may include an insulator interposed between a portion of the dosing module 128 and the portion of the mixer housing 116 on which the dosing module 128 is mounted.

The reductant delivery system 124 also includes a reductant source 126 (e.g., reductant tank, etc.). The reductant source 126 is configured to contain (e.g., store, etc.) reductant. The reductant source 126 is configured to provide the reductant to the dosing module 128. The reductant source 126 may include multiple reductant sources 126 (e.g., multiple tanks connected in series or in parallel, etc.). The reductant source 126 may be, for example, a diesel exhaust fluid tank containing Adblue®.

The reductant delivery system 124 also includes a reductant pump 130 (e.g., supply unit, etc.). The reductant pump 130 is configured to receive the reductant from the reductant source 126 and to provide the reductant to the dosing module 128. The reductant pump 130 is used to pressurize the reductant from the reductant source 126 for delivery to the dosing module 128. In some embodiments, the reductant pump 130 is pressure controlled. In some embodiments, the reductant pump 130 is coupled to a chassis of a vehicle associated with the exhaust gas aftertreatment system 100.

In some embodiments, the reductant delivery system 124 also includes a reductant filter 132. The reductant filter 132 is configured to receive the reductant from the reductant source 126 and to provide the reductant to the reductant pump 130. The reductant filter 132 filters the reductant prior to the reductant being provided to internal components of the reductant pump 130. For example, the reductant filter 132 may inhibit, prevent, or mitigate the transmission of solids to the internal components of the reductant pump 130. In this way, the reductant filter 132 may facilitate prolonged desirable operation of the reductant pump 130.

The dosing module 128 includes an injector 134 (e.g., insertion device, sprayer, etc.). The injector 134 is configured to receive the reductant from the reductant pump 130. The injector 134 is configured to dose (e.g., inject, insert, spray, etc.) the reductant received by the dosing module 128 into the exhaust gas within the mixer housing 116 along an injector axis α. For example, the injector 134 may be positioned between the inlet plate 118 and the support plate 122. In various embodiments, the injector axis α is positioned at a non-zero angle relative to the longitudinal axis λ. For example, the injector axis α may be perpendicular to the longitudinal axis λ.

In some embodiments, the reductant delivery system 124 also includes an air pump 136 and an air source 138 (e.g., air intake, etc.). The air pump 136 is configured to receive air from the air source 138. The air pump 136 is configured to provide the air to the dosing module 128. The dosing module 128 is configured to mix the air and the reductant into an air-reductant mixture and to provide the air-reductant mixture to the injector 134 (e.g., for dosing into the exhaust gas within the mixer housing 116, etc.). The injector 134 is configured to receive the air from the air pump 136. The injector 134 is configured to dose the air-reductant mixture into the exhaust gas within the mixer housing 116.

In some of these embodiments, the reductant delivery system 124 also includes an air filter 140. The air filter 140 is configured to receive the air from the air source 138 and to provide the air to the air pump 136. The air filter 140 is configured to filter the air prior to the air being provided to the air pump 136. In other embodiments, the reductant delivery system 124 does not include the air pump 136 and/or the reductant delivery system 124 does not include the air source 138. In such embodiments, the dosing module 128 is not configured to mix the reductant with air.

The exhaust gas aftertreatment system 100 also includes a controller 142 (e.g., control circuit, driver, etc.). The dosing module 128, the reductant pump 130, and the air pump 136 are electrically or communicatively coupled to the controller 142. The controller 142 is configured to control the dosing module 128 to dose the reductant and/or the air-reductant mixture into the mixer housing 116. The controller 142 may also be configured to control the reductant pump 130 and/or the air pump 136 in order to control the reductant and/or the air-reductant mixture that is dosed into the mixer housing 116.

The controller 142 includes a processing circuit 144. The processing circuit 144 includes a processor 146. The processor 146 may include a microprocessor, an application-specific integrated circuit (ASIC), a field-programmable gate array (FPGA), etc., or combinations thereof. The processing circuit 144 can also include a memory 148. The memory 148 may include, but is not limited to, electronic, optical, magnetic, or any other storage or transmission device capable of providing a processor, ASIC, FPGA, etc. with program instructions. This memory 148 may include a memory chip, Electrically Erasable Programmable Read-Only Memory (EEPROM), Erasable Programmable Read Only Memory (EPROM), flash memory, or any other suitable memory from which the controller 142 can read instructions. The instructions may include code from any suitable programming language. The memory 148 may include various modules that include instructions which are configured to be implemented by the processor 146.

In various embodiments, the controller 142 is configured to communicate with a central controller 150 (e.g., engine control unit (ECU), engine control module (ECM), etc.) of an internal combustion engine having the exhaust gas aftertreatment system 100. In some embodiments, the central controller 150 and the controller 142 are integrated into a single controller.

In some embodiments, the central controller 150 is communicable with a display device (e.g., screen, monitor, touch screen, heads up display (HUD), indicator light, etc.). The display device may be configured to change state in response to receiving information from the central controller 150. For example, the display device may be configured to change between a static state and an alarm state based on a communication from the central controller 150. By changing state, the display device may provide an indication to a user of a status of the reductant delivery system 124.

The inlet plate 118 and the support plate 122 define a first mixing chamber 152 within the mixer housing 116. The dosing module 128 may be positioned within the first mixing chamber 152. For example, the dosing module 128 may provide reductant and/or air-reductant mixture to the first mixing chamber 152. The first mixing chamber 152 defines a first area within the mixer housing 116 for the exhaust gas to mix (e.g., swirl, etc.) with the reductant and/or air-reductant mixture.

The exhaust mixer assembly 114 includes an outlet plate 154. The outlet plate 154 is coupled to the mixer housing 116 and is positioned downstream of the support plate 122. The outlet plate 154 directs flow of the exhaust gas and reductant mixture through the mixer housing 116. For example, the outlet plate 154 may direct the flow the exhaust reductant mixture back in a direction back towards the longitudinal axis λ.

The support plate 122 and the outlet plate 154 define a second mixing chamber 156. The second mixing chamber 156 is positioned downstream of the support plate 122 and upstream of the outlet plate 154. For example, the second mixing chamber 156 is positioned downstream of the first mixing chamber 152. The second mixing chamber 156 is configured to mix (e.g., swirl, etc.) the exhaust gas and reductant mixture a second time within the mixer housing 116.

The support plate 122 includes a support plate body 157. The support plate body 157 is a flat and solid portion of the support plate 122. The support plate body 157 is configured to disrupt (e.g., prevent, block, direct, etc.) the flow of exhaust through the exhaust mixer assembly 114.

The support plate 122 further includes a support plate opening 158. The support plate opening 158 is positioned on a bottom half of the support plate 122 when looking down a longitudinal axis λ of the mixer housing 116. For example, the support plate opening 158 may be positioned in a half (e.g., a portion, etc.) of the support plate 122 opposite a side of the mixer housing 116 where reductant is provided into the aftertreatment system 100. For example, the support plate may be centered on the support plate opening axis $A_b$ of the mixer housing 116. The support plate opening 158 may include two edges perpendicular to a horizontal top edge and a curved bottom edge defined by the mixer housing 116. The support plate opening 158 is configured to facilitate passage of exhaust gas mixed with reductant through the support plate 122 into the second mixing chamber 156.

The outlet plate 154 includes an outlet plate body 159. The outlet plate body 159 is a flat and solid portion of the outlet plate 154. The outlet plate body 159 is configured to disrupt (e.g., prevent, block, direct, etc.) the flow of exhaust through the exhaust mixer assembly 114.

The outlet plate 154 includes an outlet opening 160. The outlet opening 160 may be circular in shape. In some embodiments, the outlet opening 160 may be positioned centrally on the outlet plate 154. For example, the outlet opening 160 may be centered along the housing central axis λ. In other embodiments, the outlet opening 160 may be offset from the housing central axis λ. The outlet opening 160 is configured to direct the treated exhaust gas (e.g., the exhaust gas reductant mixture, etc.) through the outlet plate 154. For example, the outlet opening 160 facilitates the passage of the exhaust reductant mixture in a direction that is parallel to, or coincident with, the longitudinal axis λ.

The exhaust mixer assembly 114 also includes a conveying tube 162. The conveying tube 162 is coupled to each of the support plate 122 and the outlet plate 154. For example, an upstream end of the conveying tube is coupled to the support plate 122 and a downstream end of the conveying tube 162 is coupled to the outlet plate 154. For example, the downstream end of the conveying tube 162 may be coupled to an aligned with the outlet opening 160. The conveying tube 162 is configured to provide treated exhaust to the outlet opening 160 of the outlet plate 154. For example, the conveying tube may be centered along the longitudinal axis λ to provide the exhaust reductant mixture in a direction that is parallel to, or coincident with, the longitudinal axis λ.

The exhaust mixer assembly 114 further includes a perforated plate 164. The perforated plate 164 is coupled to the mixer housing 116 and is positioned downstream of the outlet plate 154. According to some embodiments, the perforated plate 164 may partially overlap the outlet opening 160. For example, when viewed along the longitudinal axis λ, such as the housing central axis λ, of the exhaust mixer assembly 114, the perforated plate 164 may overlap a portion of the outlet opening 160. For example, the perforated plate 164 may overlap between 30% and 70% of the outlet opening 160 when viewed along housing central axis λ.

By the perforated plate 164 overlapping between 30-70% of the outlet opening 160, the flow of the exhaust reductant mixture is disrupted to further mix the exhaust reductant mixture. For example, a first portion of the exhaust reductant mixture may flow through the outlet opening 160 and through the perforated plate 164, while a second portion of the exhaust reductant mixture may flow only through the outlet opening 160. The first portion of the exhaust reductant mixture may be disrupted (e.g., flow slowed through the perforated plate 164, redirected, etc.) prior to mixing with the unobstructed second portion of the exhaust reductant mixture. Further, the velocity of the flow of the exhaust reductant mixture through the outlet opening 160 is relatively high (e.g., fast moving, etc.). By the perforated plate 164 overlapping only a portion of the outlet opening 160 (e.g., overlapping between 30-70%), the perforated plate 164 partially blocks a portion of the flow from the outlet opening 160 which improves the flow distribution index (FDI) of the flow out of the aftertreatment system 100. The perforations in the perforated plate 164 decrease backpressure by facilitating some flow through the perforated plate 164. By variously configuring the perforated plate 164 (e.g., shape, size, location, number of perforations, size of perforations, location of perforations, etc.), a target FDI of the flow out of the aftertreatment system 100 can be attained.

The perforated plate 164 includes a perforated plate body 165. The perforated plate body 165 is a solid portion of the perforated plate 164. The perforated plate body 165 prevents the flow of exhaust reductant mixture through the perforated plate 164. The perforated plate body 165 is configured to disrupt the flow and further mix the exhaust reductant mixture provided by the outlet opening 160.

The housing assembly 104 also includes a catalyst member housing 166 and a catalyst member 168. The catalyst member housing 166 is located downstream of the perforated plate 164. The catalyst member housing 166 is coupled to the catalyst member 168 (e.g., selective catalytic reduction (SCR) catalyst member, etc.). The catalyst member 168 is configured to receive, treat, and output the exhaust gas output by the exhaust mixer assembly 114. At least a portion of the catalyst member 168 is positioned within the catalyst member housing 166. As is explained in more detail herein, the catalyst member 168 is configured to cause decomposition of components of the exhaust gas using the reductant (e.g., via catalytic reactions, etc.). Specifically, the reductant that has been provided into the exhaust gas by the injector 134 undergoes the processes of evaporation, thermolysis, and hydrolysis to form non-$NO_x$ emissions within the mixer housing 116, the catalyst member housing 166, the catalyst member 168, and/or the housing assembly 104. The catalyst member 168 is configured to assist in the reduction of $NO_x$ emissions by accelerating a $NO_x$ reduction process between the reductant and the $NO_x$ of the exhaust gas into diatomic nitrogen, water, and/or carbon dioxide.

III. First Example Exhaust Mixer Assembly

FIGS. 2-10 illustrate the exhaust mixer assembly 114 according to various embodiments.

The inlet plate 118 includes a first inlet opening 202. According to this embodiment, the first inlet opening 202 is circular in shape. In other embodiments, although other shapes (e.g., oval, elliptical, rectangular, square, hexagonal, etc.) are possible. The first inlet opening 202 may be positioned in an upper half of the inlet plate 118 when viewing the exhaust mixer assembly 114 down the longitudinal axis λ. Further, the first inlet opening 202 may be positioned offset from a transverse axis of the exhaust mixer assembly 114.

The first inlet opening 202 is configured to receive exhaust from (e.g., provided by, etc.) the upstream housing 108 and direct the exhaust through the inlet plate 118.

The inlet plate 118 may further include a second inlet opening 204. According to this embodiment, the second inlet opening 204 is circular. In other embodiments, other shapes (e.g., oval, elliptical, rectangular, square, hexagonal, etc.) are possible. The second inlet opening 204 is positioned in the upper half of the inlet plate 118 when viewing the exhaust mixer assembly 114 down the longitudinal axis λ and is adjacent to the first inlet opening 202. The second inlet opening 204 is configured to receive exhaust from the upstream housing 108 and direct the exhaust through the inlet plate 118.

The inlet plate 118 also includes an auxiliary opening 206. The auxiliary opening 206 is positioned on a bottom half of the inlet plate 118 when looking down the longitudinal axis λ of the exhaust mixer assembly 114. For example, the auxiliary opening 206 is positioned in a half (e.g., a portion, etc.) of the inlet plate 118 opposite the half where the first inlet opening 202 and the second inlet opening 204 are positioned. According to this embodiment, the auxiliary opening 206 may be substantially rectangular in shape (e.g., the sides are perpendicular to the top edge and the bottom edge is curved and defined by the housing, etc.). In other embodiments, other shapes (e.g., square, oval, circular, etc.) are possible. The auxiliary opening 206 is configured to direct exhaust through the bottom of the inlet plate 118 into the first mixing chamber 152. The auxiliary opening 206 is also configured to aid flow of exhaust and air through the exhaust mixer assembly 114.

The inlet plate 118 also defines a transverse axis $A_T$. The transverse axis $A_T$ is perpendicular to the longitudinal axis λ and parallel to the injector axis α. For example, the transverse axis $A_T$ bisects the inlet plate 118. The inlet plate 118 is symmetric across the transverse axis $A_T$. For example, the first inlet opening 202 is positioned on the first side of the inlet plate 118 and the second inlet opening 204 is positioned on a second side of the inlet plate and the first inlet opening 202 and the second inlet opening 204 are equidistant from the transverse axis $A_T$. The symmetry of the inlet plate 118 facilitates equal flow through each of the first inlet opening 202 and the second inlet opening 204.

The exhaust mixer assembly 114 includes a first inlet tube 208. The first inlet tube 208 is coupled to each of the inlet plate 118 and the support plate 122. An upstream end of the first inlet tube 208 is coupled to the inlet plate 118 and aligned with the first inlet opening 202. A downstream end of the first inlet tube 208 is coupled to the support plate 122. The downstream end of the first inlet tube 208 is blocked (e.g., closed off, etc.) by a first portion of the support plate 122. For example, the support plate 122 prevents the flow of exhaust through the downstream end of the first inlet tube 208. The first inlet tube 208 is configured to receive exhaust from the first inlet opening 202. The first inlet tube 208 is also configured to provide exhaust to the first mixing chamber 152.

The first inlet tube 208 includes a first inlet tube lateral opening 210. The first inlet tube lateral opening 210 is positioned on a side of the first inlet tube 208. For example, the first inlet tube lateral opening 210 may be positioned on a top side (e.g., a circumferential side) of the first inlet tube 208 facing towards the injector 134. According to this embodiment, the first inlet tube lateral opening 210 is rectangular in shape. However, in other embodiments, other shapes (e.g., oval, square, etc.) are possible. The first inlet tube lateral opening 210 is configured to provide exhaust to the first mixing chamber 152.

The first inlet tube 208 also include a first flat surface 212. The first flat surface 212 is positioned on a side of the first inlet tube 208 adjacent to the injector axis α. The first flat surface 212 protrudes into an interior cavity of the first inlet tube 208. The first flat surface 212 is configured to direct exhaust flow upward through the first inlet tube lateral opening 210 towards the injector axis α.

A first portion of exhaust is provided to the first inlet tube 208 through the first inlet opening 202. The first portion of exhaust flows through the first inlet tube 208 and out of the first inlet tube lateral opening 210 into the first mixing chamber 152. For example, the first portion of exhaust flows horizontally, parallel to the longitudinal axis λ, through the first inlet tube 208. The first portion of exhaust is then directed upward by the first flat surface 212, at a non-zero angle relative to the longitudinal axis λ, out of the first inlet tube 208 through the first inlet tube lateral opening 210.

The exhaust mixer assembly 114 includes a second inlet tube 214. An upstream end of the second inlet tube 214 is coupled to the inlet plate 118 and aligned with the second inlet opening. A downstream end of the second inlet tube 214 is coupled to the support plate 122. The downstream end of the second inlet tube 214 is obstructed by a second portion of the support plate 122. For example, the support plate 122 prevents the flow of exhaust through the downstream end of the second inlet tube 214. The second inlet tube 214 may also be positioned adjacent (e.g., parallel, etc.) to the first inlet tube 208. For example, the second inlet tube 214 is adjacent to the first inlet tube 208 along a horizontal plane. In other embodiments, the second inlet tube 214 is positioned above or below the first inlet tube 208. The second inlet tube 214 is configured to receive exhaust gas from the upstream housing 108 and provide the exhaust to the first mixing chamber 152.

The second inlet tube 214 includes a second inlet tube lateral opening 216. The second inlet tube lateral opening 216 is positioned on a side of the second inlet tube 214. For example, the second inlet tube lateral opening 216 may be positioned on a top side (e.g., a circumferential side, etc.) of the second inlet tube 214 near the injector 134. According to this embodiment, the second inlet tube lateral opening 216 is also rectangular in shape. In other embodiments, other shapes (e.g., square, circle, oval, etc.) are possible. The second inlet tube lateral opening 216 is configured to provide exhaust to the first mixing chamber 152.

The second inlet tube 214 also includes a second flat surface 218. The second flat surface 218 is positioned on a side of the second inlet tube 214. For example, the second flat surface 218 may be positioned on a side of the second inlet tube 214 adjacent to the injector axis α. The second flat surface 218 protrudes into an interior cavity of the second inlet tube 214. The second flat surface 218 is configured to direct exhaust upward and out of the second inlet tube lateral opening 216.

A second portion of exhaust is provided to the second inlet tube 214 through the second inlet opening 204. The second portion of exhaust flows through the second inlet tube 214 and out of the second inlet tube lateral opening 216 into the first mixing chamber 152. For example, the second portion of exhaust flows horizontally, substantially parallel to the longitudinal axis λ through the second inlet tube 214. The second portion of exhaust is then directed upward by the second flat surface 218, at a non-zero angle relative to the longitudinal axis λ, out of the second inlet tube 214 through the second inlet tube lateral opening 216. The second portion of exhaust exits the second inlet tube lateral opening 216 into the first mixing chamber 152 opposite of the first portion of exhaust. For example, the first portion of exhaust exits the first inlet tube lateral opening 210 and is directed toward the injector axis α. The second portion of exhaust exits the second inlet tube lateral opening 216 opposite the first inlet tube lateral opening 210 and is directed toward the injector axis α such that the first portion of exhaust and the second portion of exhaust collide (e.g., mix, etc.) in the first mixing chamber 152 along the injector axis α.

Further a third portion of exhaust is provided to the auxiliary opening 206. The third portion of exhaust flows horizontally through the auxiliary opening 206 and into the first mixing chamber 152 along the support plate opening axis $A_b$. The third portion of exhaust is mixed with the first portion of exhaust and the second portion of exhaust along the support plate opening axis $A_b$.

The first inlet tube 208 and the second inlet tube 214 are configured to simultaneously (e.g., at the same time, etc.) provide exhaust to the first mixing chamber 152. For example, exhaust flows from the upstream housing 108, through the first inlet opening 202 of the inlet plate 118 into the first inlet tube 208 along a first inlet axis $A_1$. Simultaneously, exhaust flows from the upstream housing 108 through the second inlet opening 204 of the inlet plate 118 into the second inlet tube 214 along a second inlet axis $A_2$. The first inlet axis $A_1$ and second inlet axis $A_2$ are substantially parallel to each other and substantially parallel to the longitudinal axis λ. Exhaust is then directed out of the first inlet tube 208 through the first inlet tube lateral opening 210 by the first flat surface 212 and directed out of the second inlet tube 214 through the second inlet tube lateral opening 216 by the second flat surface 218. As exhaust is directed upward through each of the first inlet tube lateral opening 210 and the second inlet tube lateral opening 216, the exhaust flows at a non-zero angle relative to the first inlet axis $A_1$ and the second inlet axis $A_2$ respectively. For example, exhaust may flow along the first inlet axis $A_1$ and the second inlet axis $A_2$, and then be directed out of the first inlet tube lateral opening 210 and the second inlet tube lateral opening 216 at an angle substantially perpendicular to the first inlet axis $A_1$ and the second inlet axis $A_2$.

Figure 2:
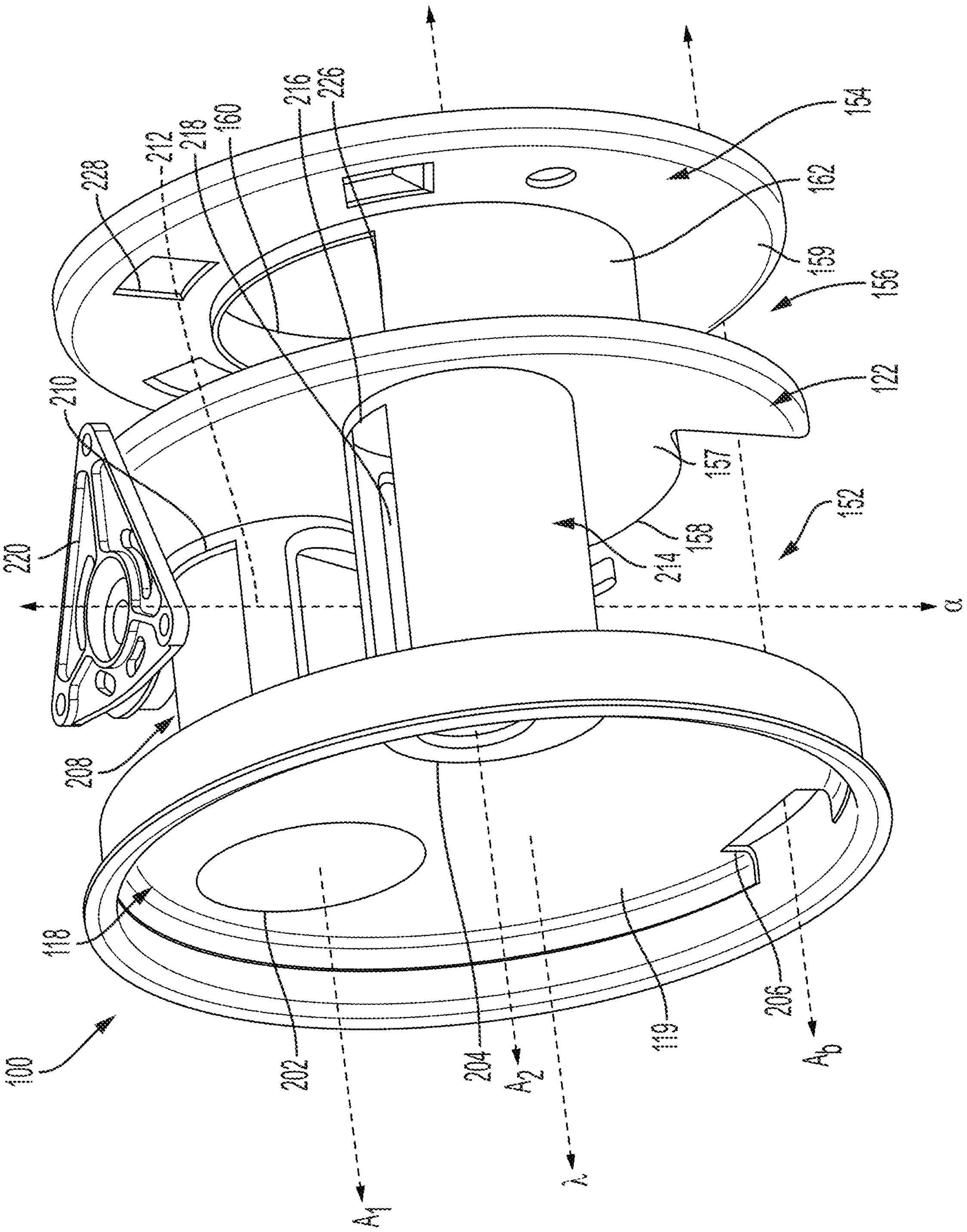
FIG. 2 is a perspective view of a portion of an exhaust mixer assembly according to one embodiment.

As shown in FIG. 2, the exhaust mixer assembly 114 includes an injector mounting bracket 220. The injector mounting bracket 220 is coupled to the housing. The injector mounting bracket 220 is positioned within the first mixing chamber 152 and between the first inlet tube 208 and the second inlet tube 214. For example, the injector mounting bracket 220 is positioned such that the injector axis α is between the first inlet tube 208 and the second inlet tube 214.

As exhaust flows out of the first inlet tube lateral opening 210 and the second inlet tube lateral opening 216, reductant is injected downward along the injector axis α in the first mixing chamber 152. As reductant is injected downward between the first inlet tube 208 and the second inlet tube 214 along the injector axis α, exhaust is then forced downward along the injector axis α inside the first mixing chamber 152.

The support plate 122 includes the support plate body 157. The support plate body 157 is a substantially flat and solid portion of the support plate 122. For example, the support plate body 157 blocks flow of exhaust along the longitudinal axis λ.

The support plate 122 includes the support plate opening 158. The support plate opening 158 is positioned on a bottom edge of the support plate 122 adjacent to a side of the mixer housing 116 opposite the injector 134. For example, the exhaust mixer assembly 114 may define a support plate opening axis $A_b$, parallel to the longitudinal axis λ, the first inlet axis $A_1$, and the second inlet axis $A_2$, that the support plate opening 158 may be centered on. The support plate opening 158 may be defined as having a curved upper edge. The support plate opening 158 is configured to direct exhaust and reductant out of the first mixing chamber 152 through the support plate 122. For example, exhaust travels from the first mixing chamber 152 through the support plate opening 158 to the second mixing chamber 156.

The first portion of exhaust flows from the first inlet opening 202 through the first inlet tube 208 and out of the first inlet tube lateral opening 210 into the first mixing chamber 152. The second portion of exhaust flows from the second inlet opening 204 through the second inlet tube 214 and out of the second inlet tube lateral opening 216 into the first mixing chamber 152. The third portion of exhaust flows through the auxiliary opening into the first mixing chamber 152. Each of the first portion of exhaust, the second portion of exhaust, and the third portion of exhaust along with reductant flow through the support plate opening 158 out of the first mixing chamber 152.

The exhaust mixer assembly 114 further includes the outlet plate 154. The outlet plate is positioned downstream of the support plate 122. The outlet plate 154 is configured to direct the flow of exhaust into the second mixing chamber 156. For example, the outlet plate 154 may prevent the flow of the exhaust reductant mixture along the support plate opening axis $A_b$.

The outlet plate 154 includes the outlet plate body 159. The outlet plate body 159 is a flat and solid portion of the outlet plate 154. The outlet plate body 159 is configured to disrupt (e.g., prevent, block, direct, etc.) the flow of exhaust through the exhaust mixer assembly 114.

The outlet plate 154 defines the outlet opening 160. The outlet opening 160 is circular in shape. In other embodiments, other shapes (e.g., square, oval, etc.) are possible. The outlet opening 160 may be defined centrally (e.g., centered along the longitudinal axis λ) on the outlet plate 154. However, in other embodiments, the outlet opening 160 may be offset of the longitudinal axis λ. The outlet opening 160 is configured to direct treated exhaust (e.g., exhaust-reductant mixture, etc.) through the outlet plate 154 and provide treated exhaust downstream of the exhaust mixer assembly 114.

The exhaust mixer assembly 114 includes the conveying tube 162. The conveying tube 162 is positioned between the support plate 122 and the outlet plate 154 within the second mixing chamber 156. A first end of the conveying tube 162 is coupled to the support plate 122. The first end of the conveying tube 162 is closed (e.g., blocked, etc.) by the support plate 122. A second end of the conveying tube 162 is coupled to the outlet plate 154 such that the second end of the conveying tube 162 is aligned with the outlet opening 160. The conveying tube 162 is configured to provide treated exhaust from the second mixing chamber 156 to the outlet opening 160 of the outlet plate 154.

The conveying tube 162 includes a conveying tube lateral opening 226. The conveying tube lateral opening 226 is positioned on a circumferential side of the conveying tube 162. For example, the conveying tube lateral opening 226 may be positioned on a circumferential side of the conveying tube 162 facing the side of the mixer housing 116 where the injector 134 is positioned (e.g., a top side of the conveying tube 162). According to this embodiment, the conveying tube lateral opening 226 may be rectangular in shape and extend around a portion of the circumference of the conveying tube 162. In other embodiments, other shapes (e.g., square, oval, etc.) are possible. The conveying tube lateral opening 226 is configured to receive treated exhaust (e.g., exhaust reductant mixture, etc.) from the second mixing chamber 156 and provide the treated exhaust to a downstream end of the exhaust mixer assembly 114 through the outlet opening 160.

As shown in FIG. 2, the second mixing chamber 156 is positioned between the support plate 122 and the outlet plate 154, and around the conveying tube 162. Exhaust enters a lower end of the second mixing chamber 156 through the support plate opening 158 along the support plate opening axis $A_b$. Exhaust then flows upward around the conveying tube 162. For example, exhaust enters the second mixing chamber 156 along the support plate opening axis $A_b$ and then is forced upward (e.g., perpendicular to the support plate opening axis $A_b$) around the conveying tube 162. The exhaust then travels through the conveying tube lateral opening 226, through the conveying tube 162, and out of the outlet opening 160 of the outlet plate 154.

The outlet plate 154 further includes a plurality of peripheral openings 228. The plurality of peripheral openings 228 are positioned around the outlet opening 160. For example, the plurality of peripheral openings 228 may be positioned around the outlet opening 160 on a top half of the outlet plate 154 when looking down the longitudinal axis λ. For example, the peripheral openings 228 may be positioned in a half of the outlet plate 154 adjacent to the side of the mixer housing 116 in which reductant is provided. According to this embodiment, the plurality of peripheral openings 228 are rectangular in shape. In other embodiments, other shapes (e.g., square, circular, etc.) are possible. As shown in this embodiment, the outlet plate 154 includes three peripheral openings 228. However, in other embodiments, the outlet plate 154 may include more (e.g., 4, 5, etc.) or less (e.g., 1, or 2) peripheral openings 228. The plurality of peripheral openings 228 are configured to aid the flow of treated exhaust and air through a top half of the outlet plate 154 of the exhaust mixer assembly 114.

Figure 3:
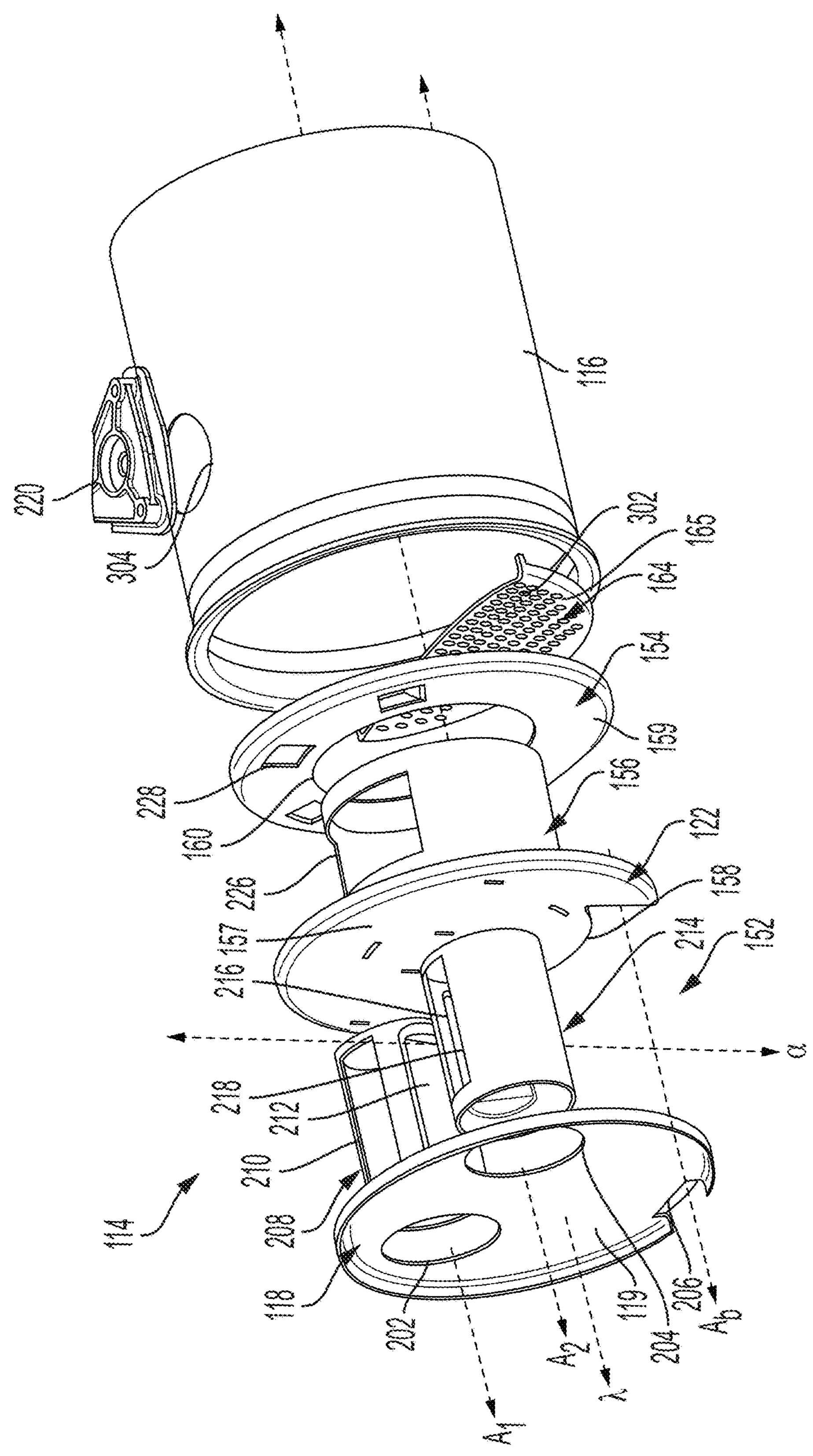
FIG. 3 is an exploded view of the exhaust mixer assembly of FIG. 2.

As shown in FIG. 3, the exhaust mixer assembly 114 further includes the perforated plate 164. The perforated plate 164 is coupled to the mixer housing 116 and is positioned downstream of the outlet plate 154. The perforated plate 164 is positioned on a side of the mixer housing along the support plate opening axis $A_b$. For example, the perforated plate 164 is located in a bottom half of a cross-sectional area of the mixer housing 116. For example, at least 80% of a cross-sectional area of the perforated plate 164 may be located in the bottom half of the cross-sectional area of the mixer housing 116. By 80% of the cross-sectional area of the perforated plate 164 being positioned in the bottom half of the cross-sectional area of the mixer housing 116, the exhaust gas reductant mixture directed downward (e.g., towards the bottom of the mixer housing 116) is also directed towards the perforated plate 164 to promote further mixing of the exhaust reductant mixture. When viewed in a longitudinal direction (e.g., along the longitudinal axis λ, etc.) of the mixer housing 116, the perforated plate 164 partially overlaps a portion of the outlet opening 160. For example, the perforated plate 164 may overlap between 30% to 70% of the outlet opening 160. The perforated plate 164 is configured to disrupt the flow of treated exhaust through the exhaust mixer assembly 114. The perforated plate 164 is also configured to adjust the airflow velocity and improve the FDI of the flow out of the aftertreatment system 100. In other embodiments, the perforated plate 164 may overlap the entire outlet opening 160 to improve FDI of the flow out of the aftertreatment system 100.

The perforated plate includes the perforated plate body 165. The perforated plate body 165 prevents the flow of the exhaust reductant mixture through the perforated plate 164 forcing the exhaust reductant mixture to further mix.

The perforated plate 164 defines a plurality of openings 302. The plurality of openings 302 are the same shape and have the same cross-sectional area and are spaced a n equal distance apart from adjacent openings 302 throughout the perforated plate 164. However, in other embodiments, the plurality of openings 302 may be defined only in a portion of the perforated plate 164. As shown in FIG. 3, the plurality of openings 302 may be circular in shape. In other embodiments, other shapes (e.g., squares, rectangles, etc.) are possible. The plurality of openings 302 are configured to provide flow of the exhaust reductant mixture through the perforated plate 164 received by the outlet opening 160.

The mixer housing 116 defines an injector opening 304. The injector opening 304 is positioned on a circumferential side of the mixer housing 116 opposite the support plate opening axis $A_b$ (e.g., a top side, etc.). The injector opening 304 is configured to receive the injector mounting bracket 220 of the dosing module 128. According to this embodiment, the injector opening 304 may be circular in shape. In other embodiments, other shapes (e.g., oval, square, etc.) are possible.

Figure 4:
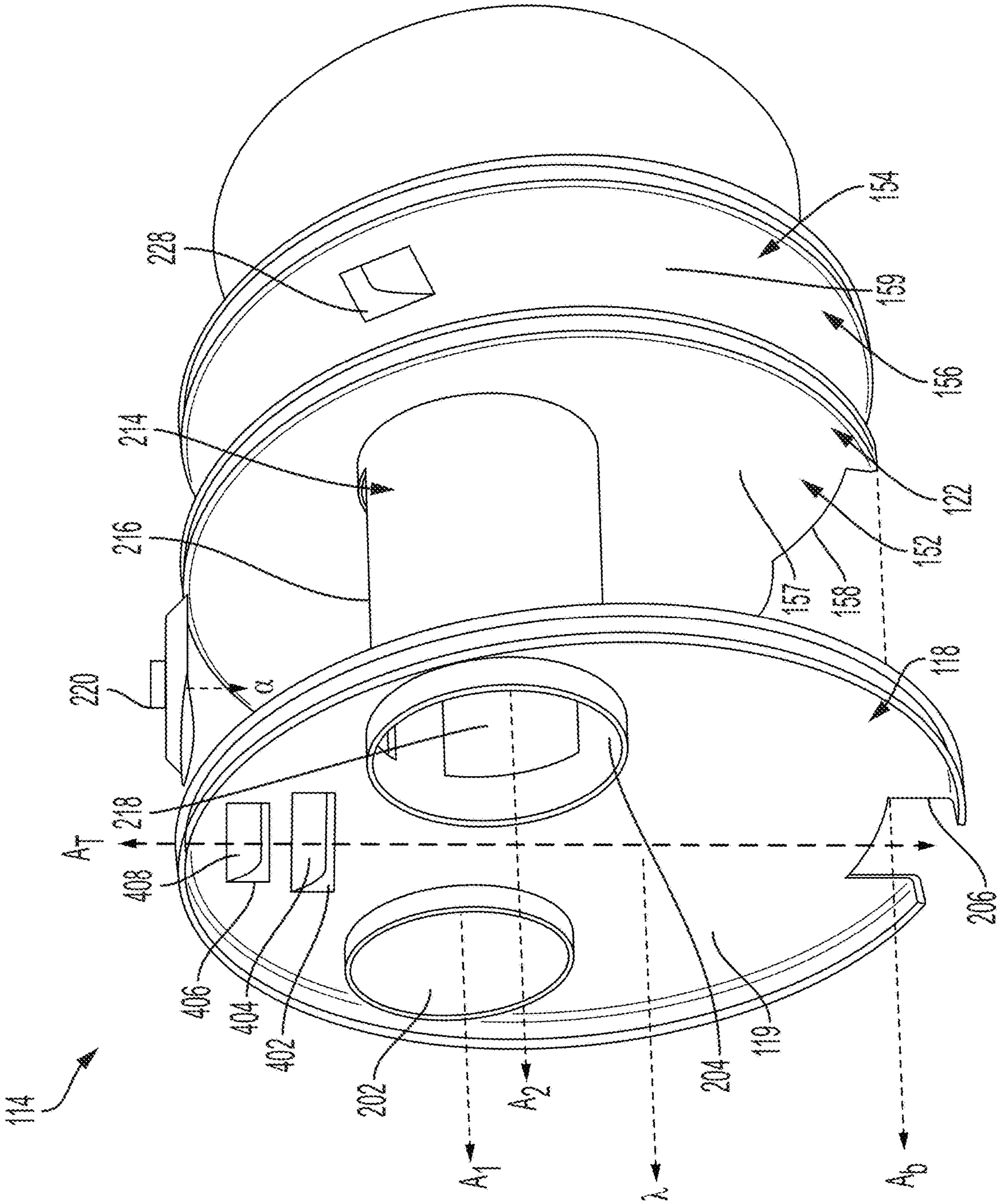
FIG. 4 is a perspective view of a portion of the exhaust mixer assembly of FIG. 2.

FIG. 4 is another perspective view of the exhaust mixer assembly 114. According to this embodiment, the inlet plate 118 further includes a flow assist opening 402. The flow assist opening 402 is positioned adjacent to each of the first inlet tube 208 and the second inlet tube 214. For example, the flow assist opening 402 may be centered above each of the first inlet tube 208 and the second inlet tube 214. In this embodiment, the flow assist opening 402 is rectangular in shape. In other embodiments, other shapes (e.g., circle, oval, etc.) are possible. The flow assist opening 402 is configured to receive exhaust from the upstream housing. The flow assist opening 402 is also configured to aid the flow of exhaust through the inlet plate 118 of the exhaust mixer assembly 114.

The flow assist opening 402 may include a flow assist flap 404. The flow assist flap 404 extends from a top edge of the flow assist opening 402. For example, the flow assist flap 404 extends at a non-zero angle (e.g., between 30-80 degrees, etc.) into the first mixing chamber 152. The flow assist flap 404 is configured to disrupt the flow of exhaust through the flow assist opening 402. For example, the flow assist flap 404 can direct the flow of exhaust through the flow assist opening 402 downward to facilitate mixing with reductant within the first mixing chamber 152.

The exhaust mixer assembly 114 can further include a second flow assist opening 406. The second flow assist opening 406 is positioned adjacent to the flow assist opening 402 on an edge of the inlet plate 118 near the injector mounting bracket 220. In other embodiments, the second flow assist opening 406 is positioned elsewhere (e.g., adjacent to each of the first inlet opening 202 and the second inlet opening 204, adjacent to the auxiliary opening 206, etc.) on the inlet plate 118. In this embodiment, the second flow assist opening 406 is also rectangular in shape. However, in other embodiments, other shapes (e.g., circles, squares, ovals, etc.) are possible. According to this embodiment, the second flow assist opening 406 is smaller (e.g., less cross-sectional area, etc.) than the flow assist opening 402. The second flow assist opening 406 is also configured to aid the flow of exhaust through the inlet plate 118 of the exhaust mixer assembly 114.

The second flow assist opening 406 can include a second flow assist flap 408. The second flow assist flap 408 extends from a top edge of the second flow assist opening 406. For example, the second flow assist flap 408 extends at a non-zero angle (e.g., between 30-80 degrees, etc.) into the first mixing chamber 152. The second flow assist flap 408 is configured to disrupt the flow of exhaust through the second flow assist opening 406. For example, the second flow assist flap 408 can direct the flow of exhaust through the second flow assist opening 406 downward to facilitate mixing with reductant within the first mixing chamber 152.

Each of the peripheral openings 228 may also include peripheral opening flaps 410. Each of the peripheral opening flaps 410 may extend from any edge of each of the peripheral openings 228. The peripheral opening flaps 410 are configured to disrupt the flow of the exhaust-reductant mixture (e.g., treated exhaust) through the outlet plate 154 to further facilitate mixing.

Figure 5:
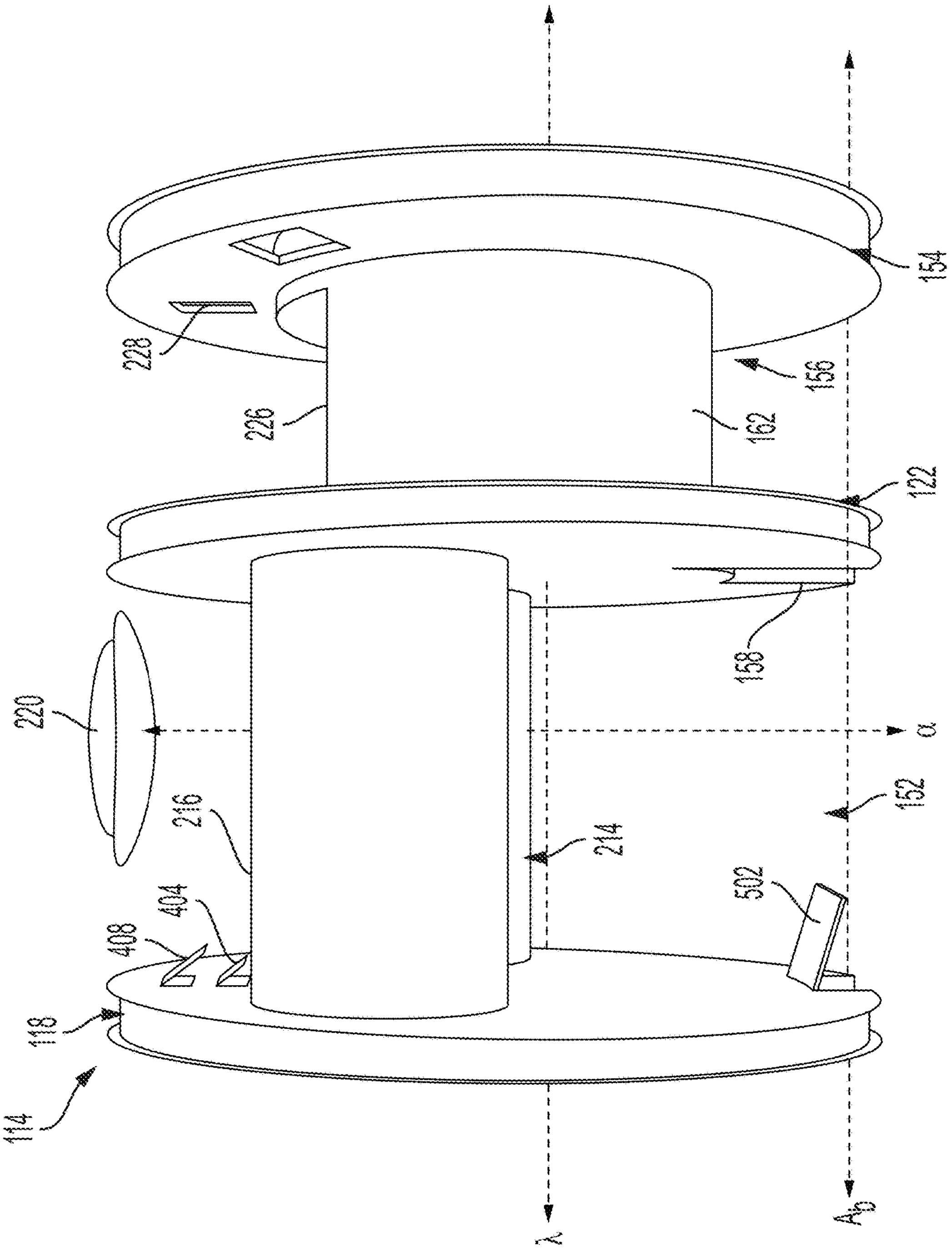
FIG. 5 is another perspective view of the portion of the exhaust mixer assembly of FIG. 2.

FIG. 5 is a side view of the exhaust mixer assembly 114. As shown in FIG. 5, the first inlet tube 208 and the second inlet tube 214 are positioned in the upper half of the first mixing chamber 152 when looking down the longitudinal axis λ of the mixer housing 116. For example, the first inlet tube 208 and the second inlet tube 214 may be positioned in a half of the outlet plate 154 adjacent to the side of the mixer housing 116 in which reductant is provided. Further, the conveying tube 162 is centered within the second mixing chamber 156 along the longitudinal axis λ of the mixer housing 116.

The auxiliary opening 206 further includes an auxiliary opening flap 502. The auxiliary opening flap 502 is positioned on an upper edge of the auxiliary opening 206. For example, the auxiliary opening flap 502 extends off of the upper edge of the auxiliary opening 206 at a non-zero angle relative to the inlet plate 118. The auxiliary opening flap 502 is configured to disrupt the flow of exhaust through the auxiliary opening 206 to facilitate mixing with reductant. For example, the auxiliary opening flap 502 may direct exhaust flow downward into the first mixing chamber 152 as the exhaust flows through the auxiliary opening 206 of the inlet plate 118. The auxiliary opening flap 502 may direct exhaust downward at a non-zero angle relative to the support plate opening axis $A_b$.

Also as shown in FIG. 5, the injector mounting bracket 220 is positioned above the first mixing chamber 152. The injector mounting bracket 220 may be centered above the first mixing chamber 152 or may be positioned offset from a center of the first mixing chamber 152.

Figure 6:
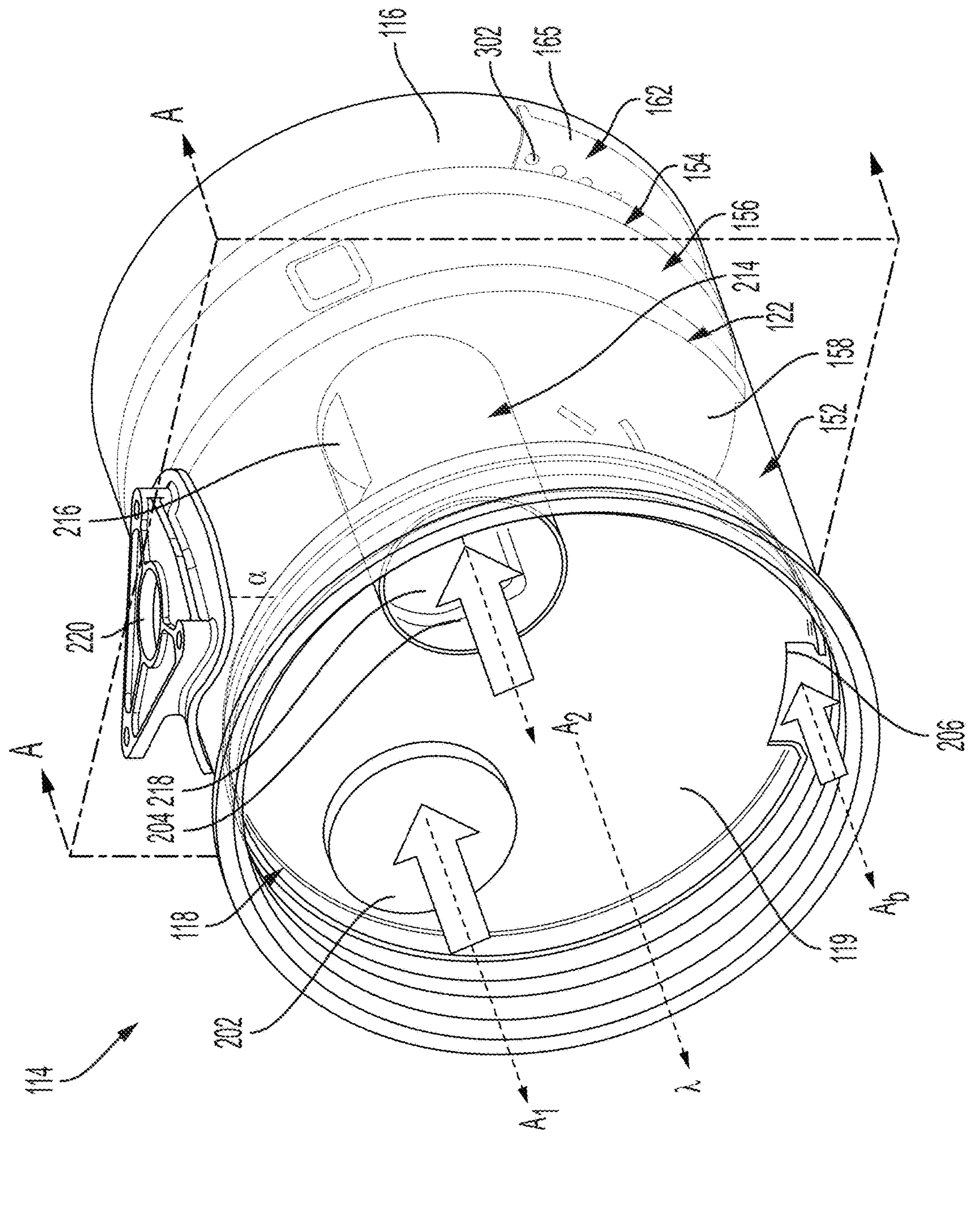
FIG. 6 is a perspective view of the exhaust mixer assembly of FIG. 2 with a portion of the exhaust mixer assembly shown with partial transparency.

FIG. 6 illustrates the flow of exhaust into the exhaust mixer assembly 114. As shown in FIG. 6, the first inlet axis $A_1$ and the second inlet axis $A_2$ are parallel to each of the support plate opening axis $A_b$ and the longitudinal axis λ of the exhaust mixer assembly 114. Further, the first inlet axis $A_1$ and the second inlet axis $A_2$ are aligned a horizontal plane. According to this embodiment, the support plate opening axis $A_b$ may be positioned below and in between the first inlet axis $A_1$ and the second inlet axis $A_2$.

Figure 7:
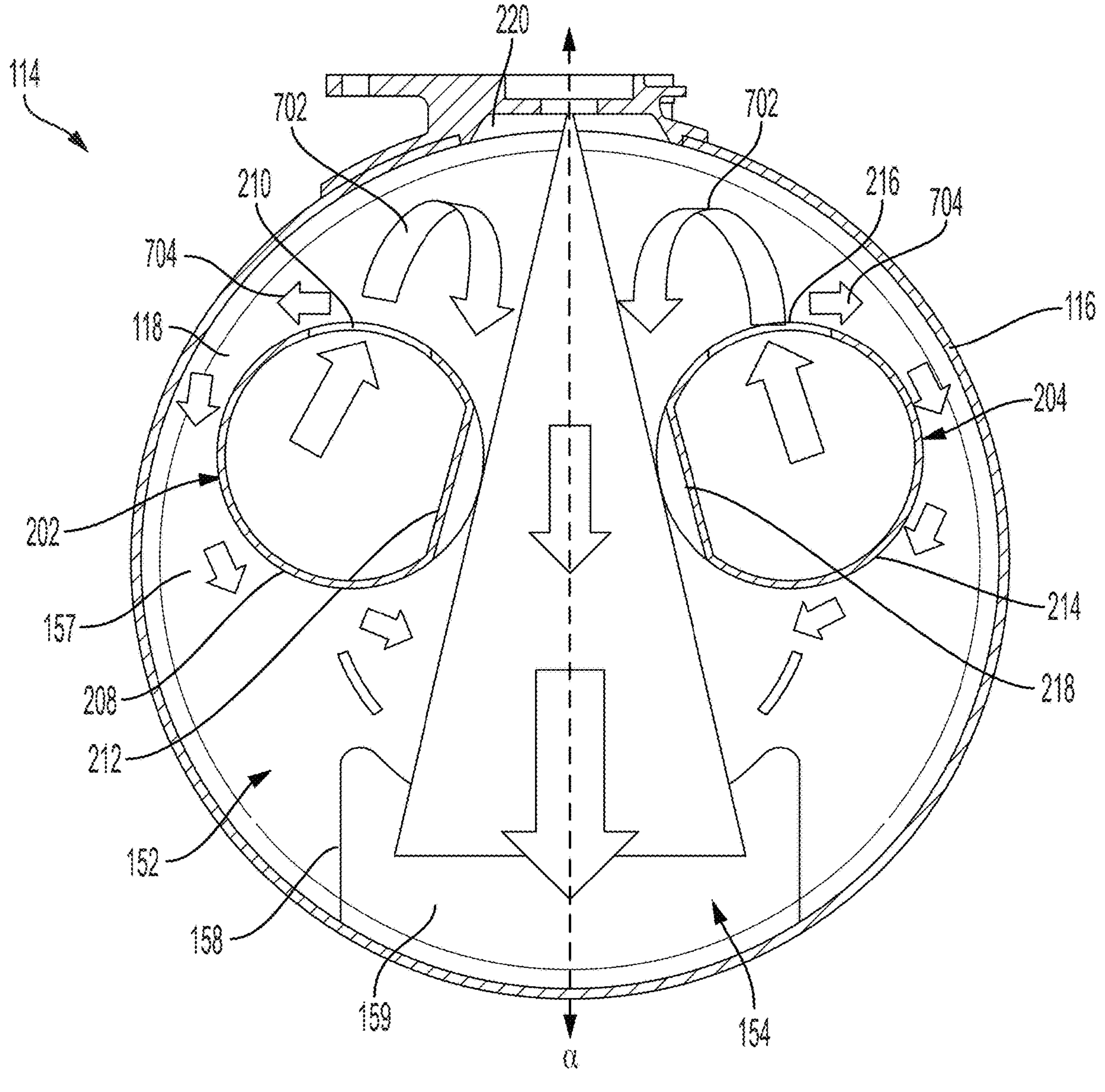
FIG. 7 is a longitudinal view of the exhaust mixer assembly of FIG. 6 taken along plane A-A.

FIG. 7 is a longitudinal view of the exhaust mixer assembly 114. FIG. 7 illustrates the flow of exhaust and reductant into and within the first mixing chamber 152.

The first portion of exhaust flows through the inlet plate 118 via the first inlet tube, the second portion of exhaust flows through the second inlet tube 214, and the third portion of exhaust flows through the auxiliary opening 206. Once the first portion of exhaust and the second portion of exhaust is within the first inlet tube 208 and the second inlet tube 214 respectively, is the first portion of exhaust and the second portion of exhaust is then directed upward through each of the first inlet tube lateral opening 210 and the second inlet tube lateral opening 216, respectively. For example, the first portion of exhaust and the second portion of exhaust are be directed upward by the first flat surface 212 and the second flat surface 218 at a non-zero angle relative to each of the first inlet axis $A_1$ and the second inlet axis $A_2$ respectively.

The auxiliary opening 206 is configured to provide the third portion of exhaust to the first mixing chamber 152. The auxiliary opening 206 provides the third portion of exhaust into the first mixing chamber 152 along the support plate opening axis $A_b$. The third portion of exhaust provided through the auxiliary opening 206 provides a high flow rate along a bottom surface of the mixer housing 116, opposite the injector 134. For example, the high rate of flow of the third portion of exhaust provided through the auxiliary opening 206 may mitigate deposit formation (e.g., pooling of exhaust, etc.) by providing a hot flow of exhaust at a high flow rate along the bottom surface of the mixer housing 116, opposite the injector 134.

As shown in FIG. 7, the first flat surface 212 and the second flat surface 218 are positioned on a side of each of the first inlet tube 208 and the second inlet tube 214 adjacent to the injector axis α. Further, each of the first flat surface 212 and the second flat surface 218 are positioned at a non-zero angle relative to the injector axis α. For example, the non-zero angle may be between 10 and 60 degrees.

The first inlet tube lateral opening 210 may be positioned offset from the first inlet axis $A_1$. For example, in some embodiments, the first inlet tube lateral opening 210 may be centered above the first inlet axis $A_1$. For example, a first inlet tube lateral opening central axis may be perpendicular to and intersect the first inlet axis $A_1$. However, as shown in this embodiment, the first inlet tube lateral opening 210 may be positioned above and offset from the first inlet axis $A_1$. For example, the first inlet tube lateral opening central axis perpendicular to and offset a horizontal distance from the first inlet axis $A_1$. For example, the first inlet tube lateral opening 210 may be positioned above the first inlet axis $A_1$ and towards the injector axis α to direct exhaust flow out of the first inlet tube 208 towards the injector axis α. The position of the first inlet tube lateral opening 210 is configured to direct exhaust flow towards the injector axis α such that the exhaust mixes with the reductant.

The second inlet tube lateral opening 216 may be positioned offset from the second inlet axis $A_2$. For example, in some embodiments, the second inlet tube lateral opening 216 may be centered above the second inlet axis $A_2$. For example, a second inlet tube lateral opening central axis may be perpendicular to and intersect the second inlet axis $A_2$. However, as shown in this embodiment, the second inlet tube lateral opening 216 may be positioned above and offset from the second inlet axis $A_2$. For example, the second inlet tube lateral opening central axis perpendicular to and offset a horizontal distance from the second inlet axis $A_2$. For example, the second inlet tube lateral opening 216 may be positioned above the second inlet axis $A_2$ and towards the injector axis α to direct exhaust flow out of the second inlet tube 214 towards the injector axis α). The position of the second inlet tube lateral opening 216 is configured to direct exhaust flow towards the injector axis α such that the exhaust mixes with the reductant.

Once exhaust is provided to the first mixing chamber 152 (e.g., exhaust has exited each of the first inlet tube 208 and the second inlet tube 214), exhaust flows upward towards the injector mounting bracket 220. The exhaust is then directed downward towards the injector axis α with the reductant. For example, the exhaust may be directed downward by a top surface of the mixer housing 116. A portion of exhaust may also flow outward and around each of the first inlet tube 208 and the second inlet tube 214. For example, a first portion of exhaust 702 may be directed upward and toward the injector axis α. For example, the first portion of exhaust 702 may flow clockwise out of the first inlet tube lateral opening 210 and counterclockwise out of the second inlet tube lateral opening 216 towards the injector axis α. A second portion of exhaust 704 may flow outward between a side of the mixer housing 116 and each of the first inlet tube 208 and the second inlet tube 214. For example, the second portion of exhaust 704 may flow counterclockwise out of the first inlet tube lateral opening 210 and clockwise of the second inlet tube lateral opening 216.

The exhaust and the reductant then travel along the injector axis α (e.g., downward, etc.) toward the support plate opening 158. As the exhaust and reductant travel downward along the injector axis α, the reductant mixes with the exhaust to treat the exhaust gas. The exhaust and reductant mixture then exits the first mixing chamber 152 through the support plate opening 158.

Figure 8:
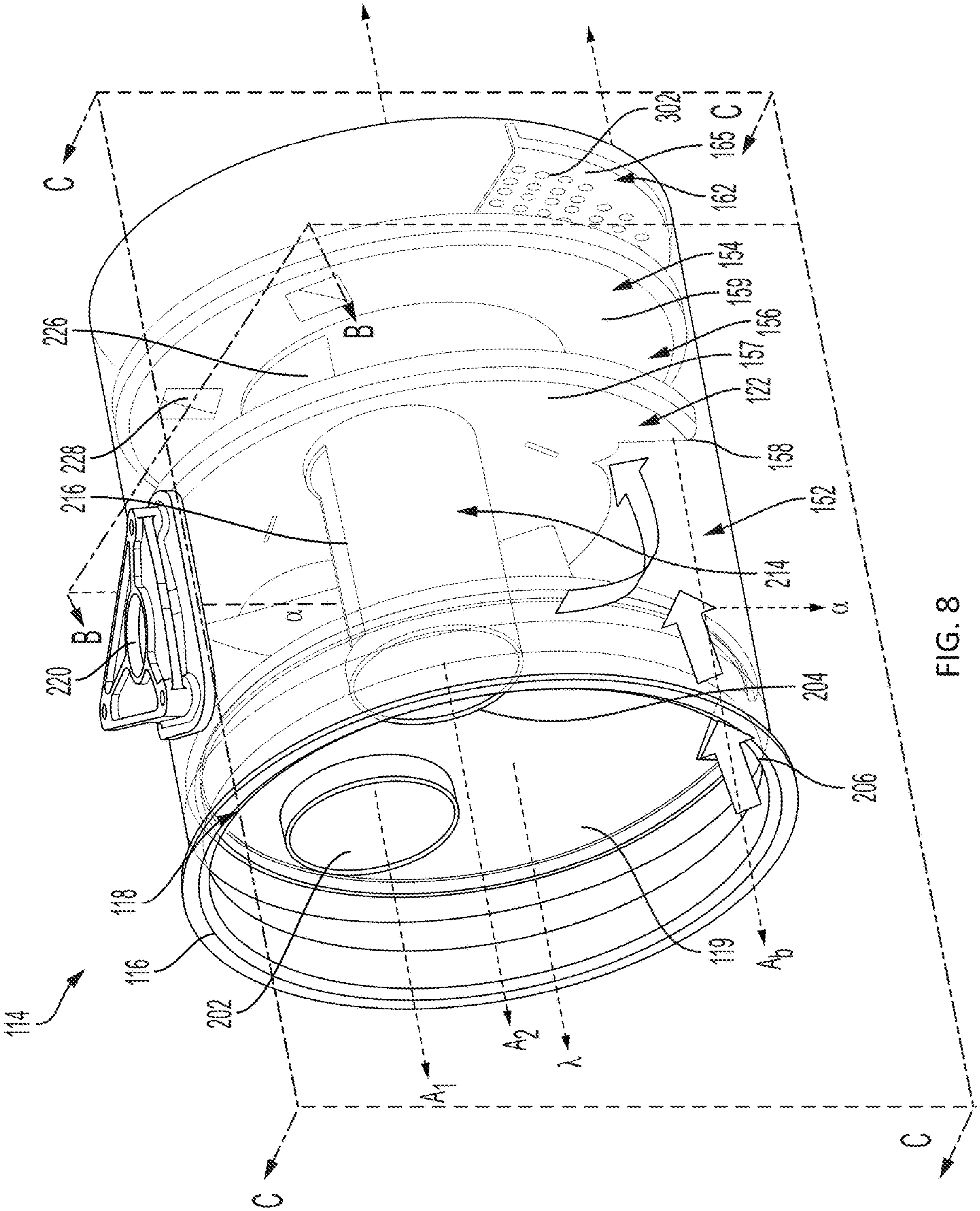
FIG. 8 is another perspective view of the exhaust mixer assembly of FIG. 2 with a portion of the exhaust mixer assembly shown with partial transparency.

FIG. 8 is a perspective view of the exhaust mixer assembly 114. As shown in FIG. 8, the exhaust and reductant mixture flows towards a bottom surface of the mixer housing 116 and through the support plate opening 158. Untreated exhaust also flows into the first mixing chamber 152 near the bottom surface of the mixer housing 116 through the auxiliary opening 206. The untreated exhaust that flows into the first mixing chamber 152 through the auxiliary opening 206 (e.g., the third portion) mixes with the exhaust and reductant mixture (e.g., treated exhaust, etc.) in the first mixing chamber 152 near the bottom surface of the mixer housing 116 opposite the injector 134. The untreated exhaust is then treated with reductant and also flows out of the first mixing chamber 152 through the support plate opening 158.

Figure 9:
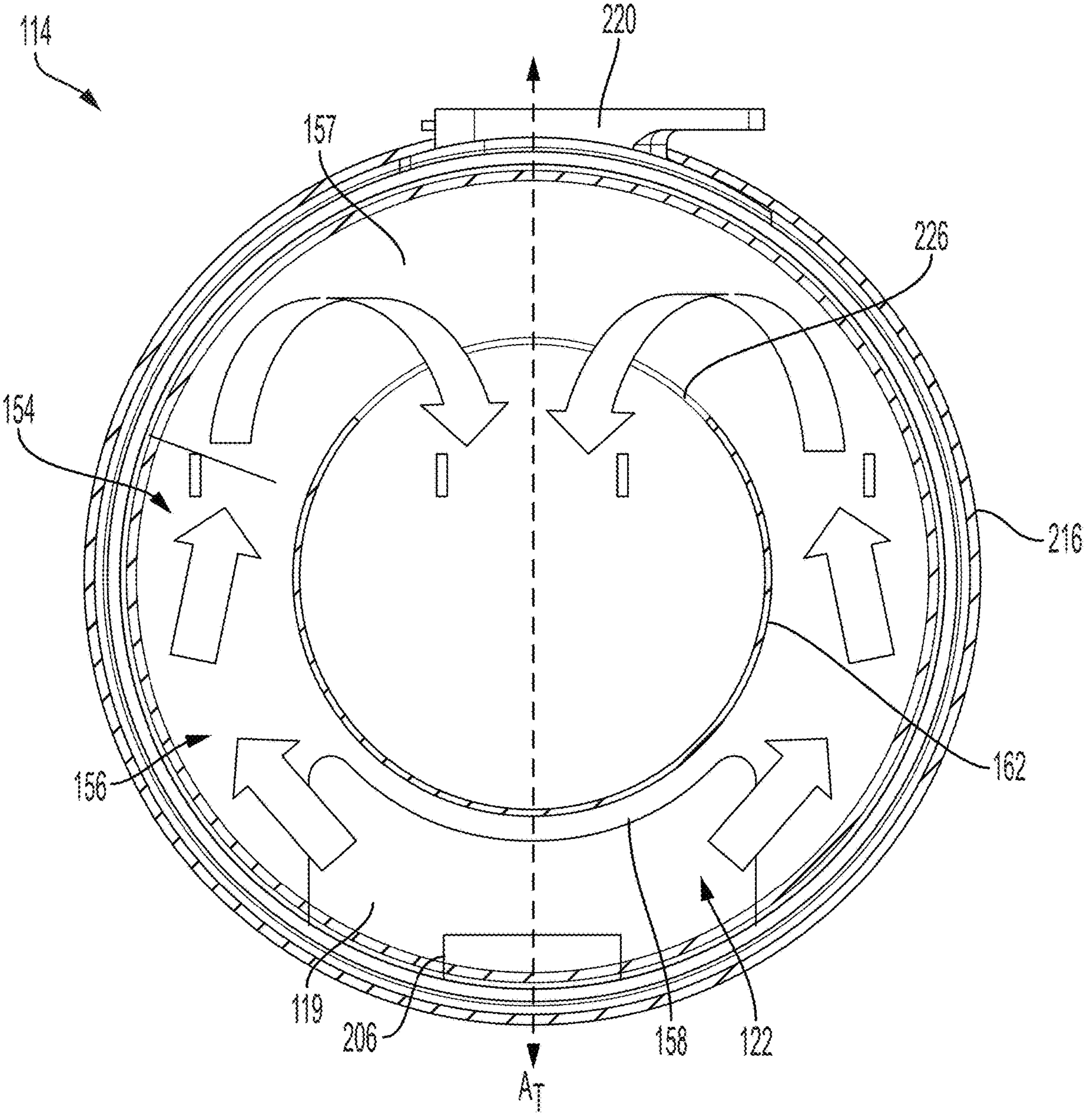
FIG. 9 is a longitudinal view of the exhaust mixer assembly of FIG. 8 taken along plane B-B.

FIG. 9 is another longitudinal view of the exhaust mixer assembly 114 according to the embodiment of FIG. 2. FIG. 9 is a longitudinal view looking from a back end of the exhaust mixer assembly 114 to a front end of the exhaust mixer assembly 114. FIG. 9 illustrates the flow of the exhaust and reductant mixture within the second mixing chamber 156.

Exhaust enters the second mixing chamber 156 near the bottom surface of the mixer housing 116. For example, the second mixing chamber 156 receives the exhaust and reductant mixture from the support plate opening 158.

The exhaust reductant mixture is then directed upward and around the conveying tube 162. For example, the exhaust and reductant mixture flows between the sides of the mixer housing 116 and the conveying tube 162. For example, the exhaust and reductant mixture flows into the second mixing chamber 156 along the support plate opening axis $A_b$. Then, the horizontal flow of the exhaust and reductant mixture along the support plate opening axis $A_b$ is disrupted by the outlet plate 154 and forced upward around the conveying tube 162 towards a top surface of the mixer housing 116.

The exhaust reductant mixture is then directed downward through the conveying tube lateral opening 226. As shown in FIG. 9, the conveying tube lateral opening 226 is positioned in the upper half of the exhaust mixer assembly 114 when view the mixer assemble along the longitudinal axis λ. The conveying tube lateral opening 226 is centered on a transverse axis $A_T$ of the exhaust mixer assembly 114 that is perpendicular to the longitudinal axis λ.

Figure 10:
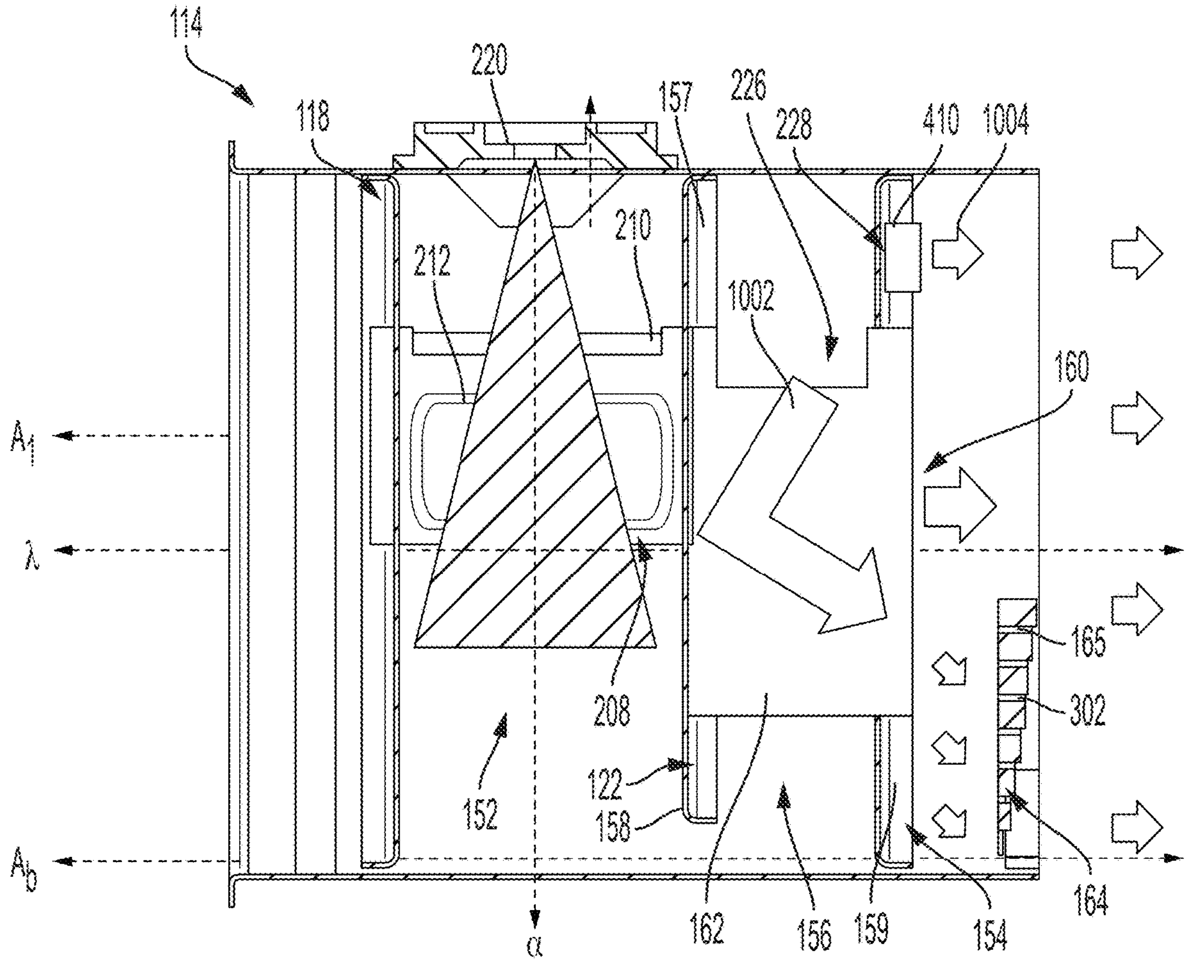
FIG. 10 is a cross-sectional view of the exhaust mixer assembly of FIG. 8 taken along plane C-C.
Figure 11:
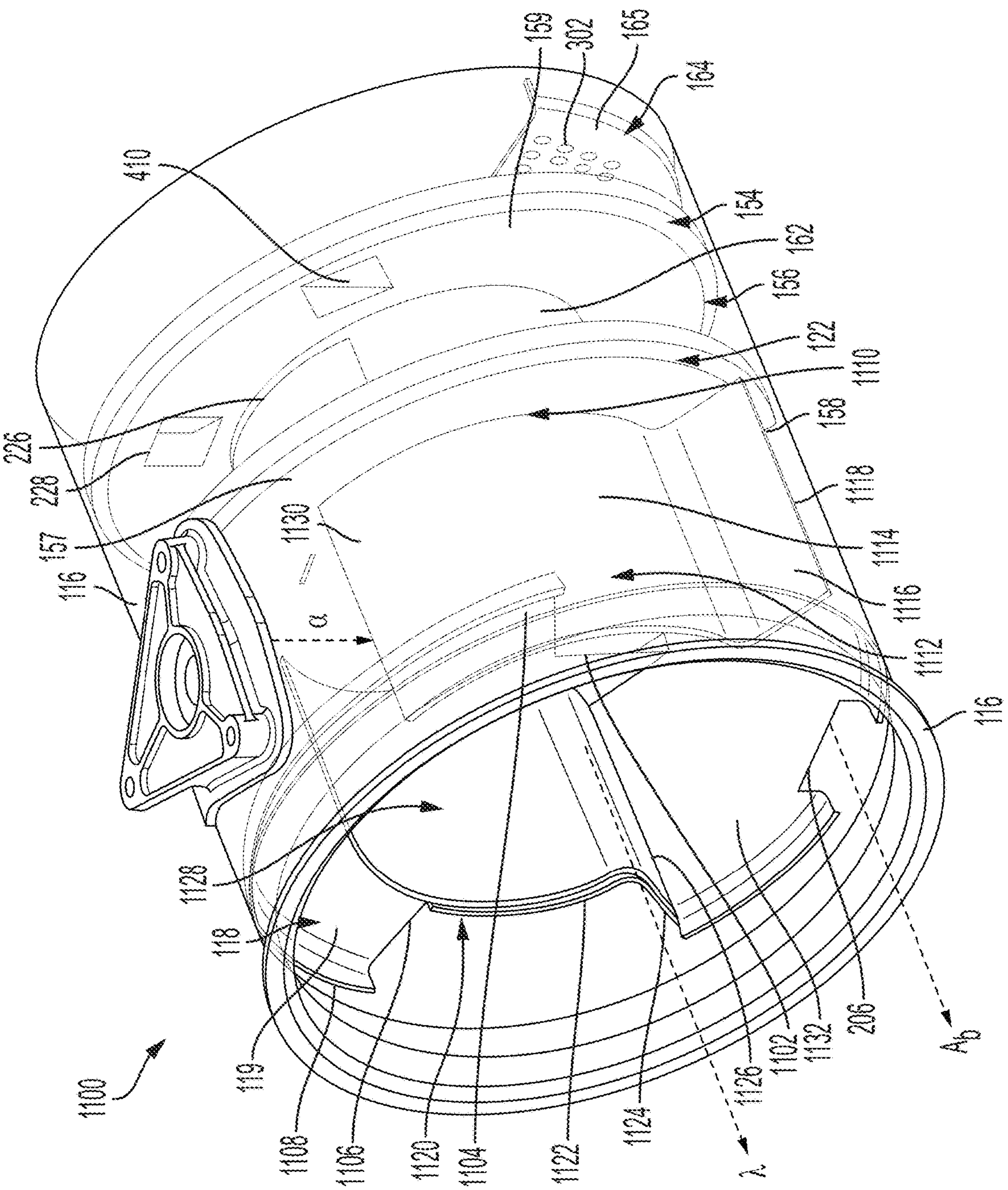
FIG. 11 is a perspective view of the exhaust mixer assembly according to another embodiment with a portion of the exhaust mixer assembly shown with partial transparency.
Figure 12:
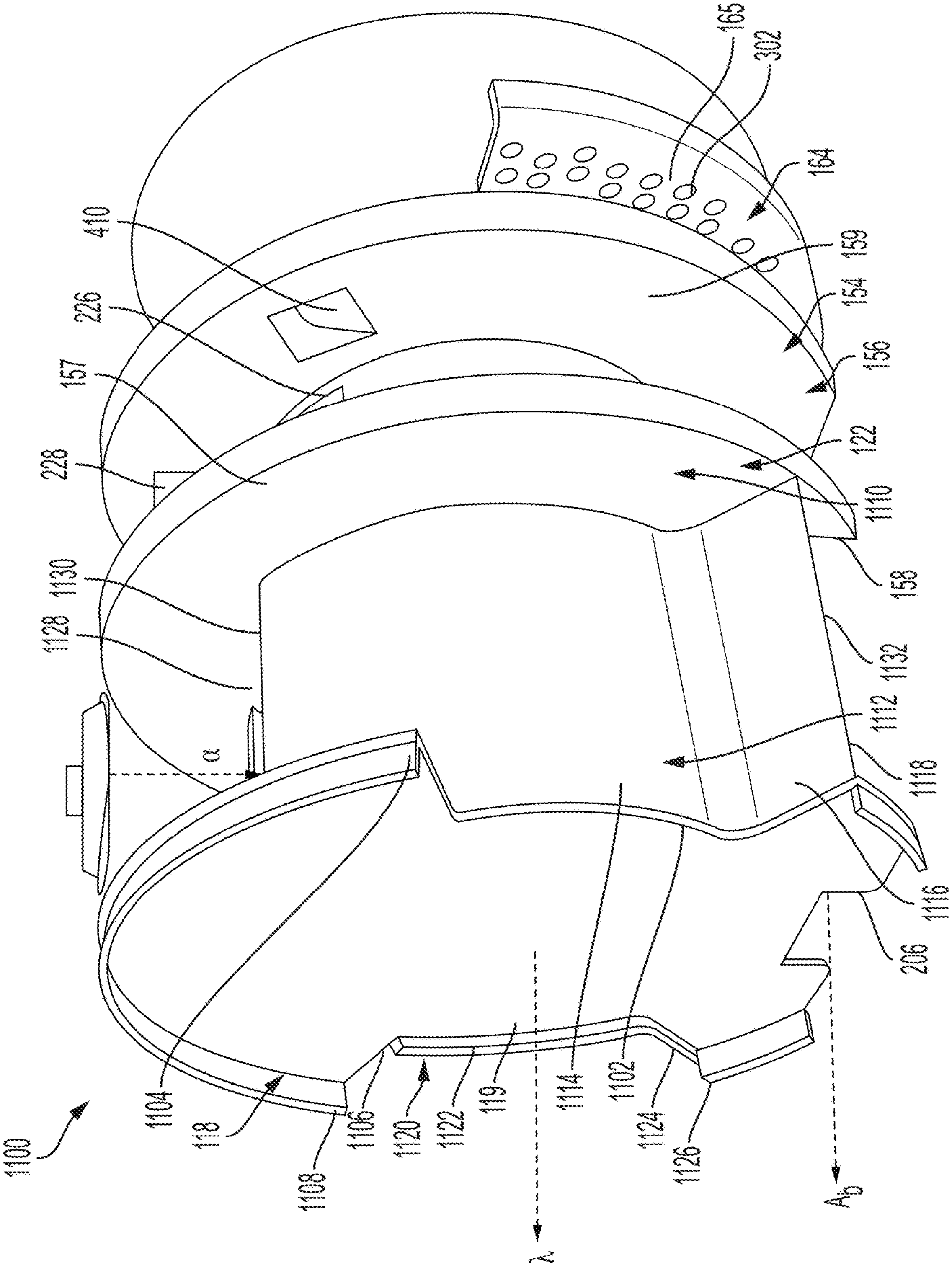
FIG. 12 is a perspective view of a portion of the exhaust mixer assembly according to FIG. 11.
Figure 13:
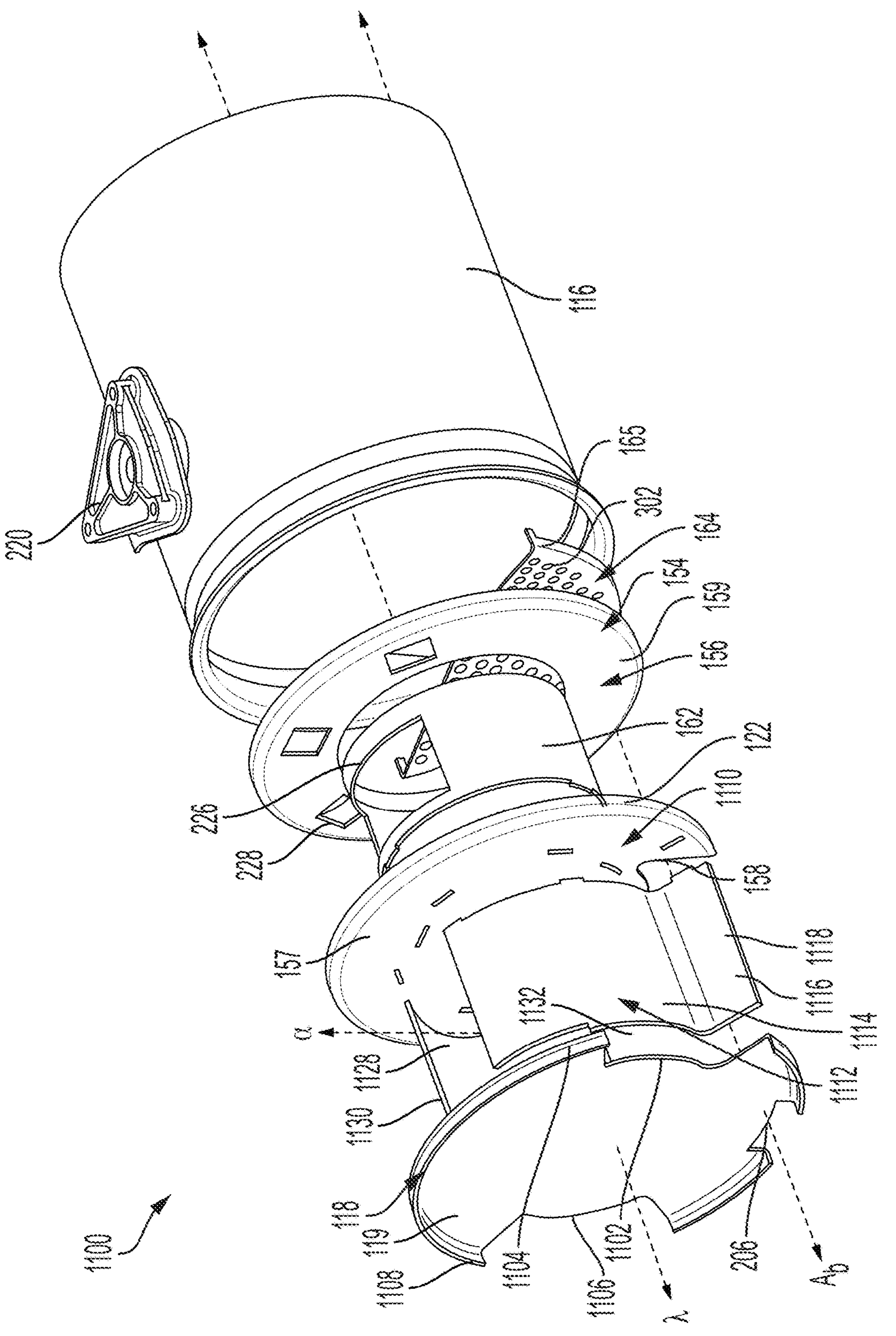
FIG. 13 is an exploded view of the exhaust mixer assembly of FIG. 11.
Figure 14:
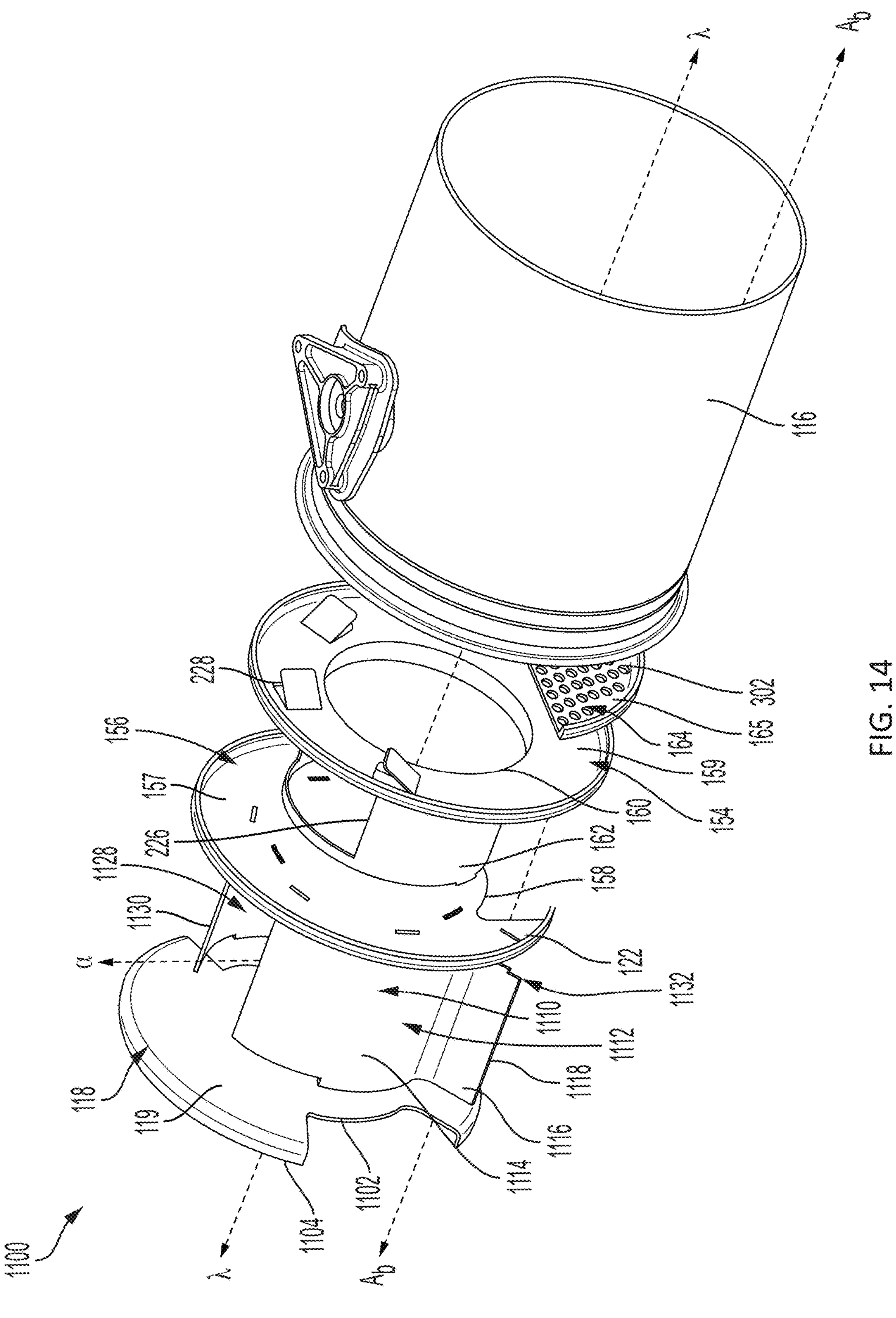
FIG. 14 is another exploded view of the exhaust mixer assembly of FIG. 11.
Figure 15:
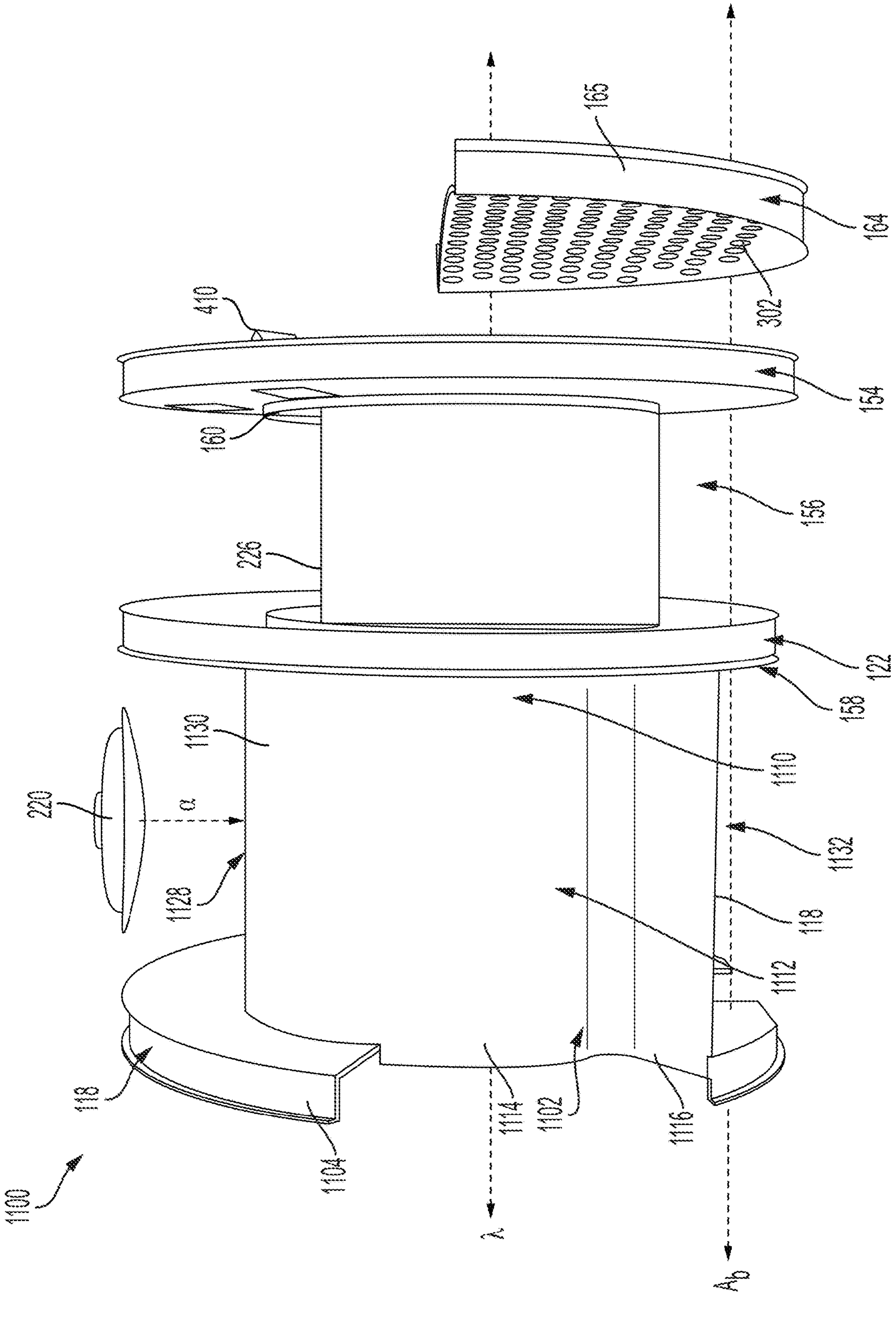
FIG. 15 is another perspective view of the exhaust mixer assembly of FIG. 11.
Figure 16:
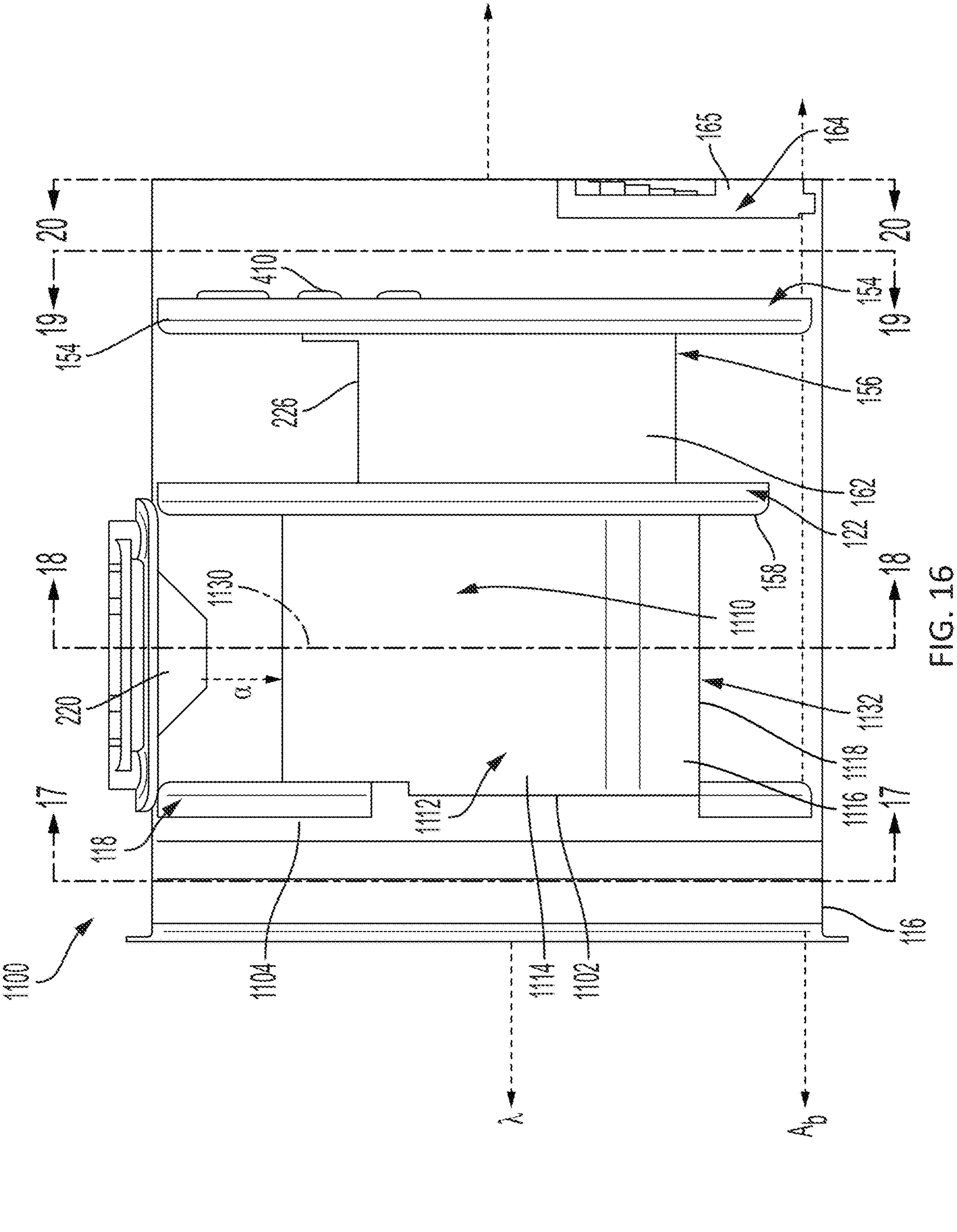
FIG. 16 is another perspective view of the exhaust mixer assembly of FIG. 11.
Figure 17:
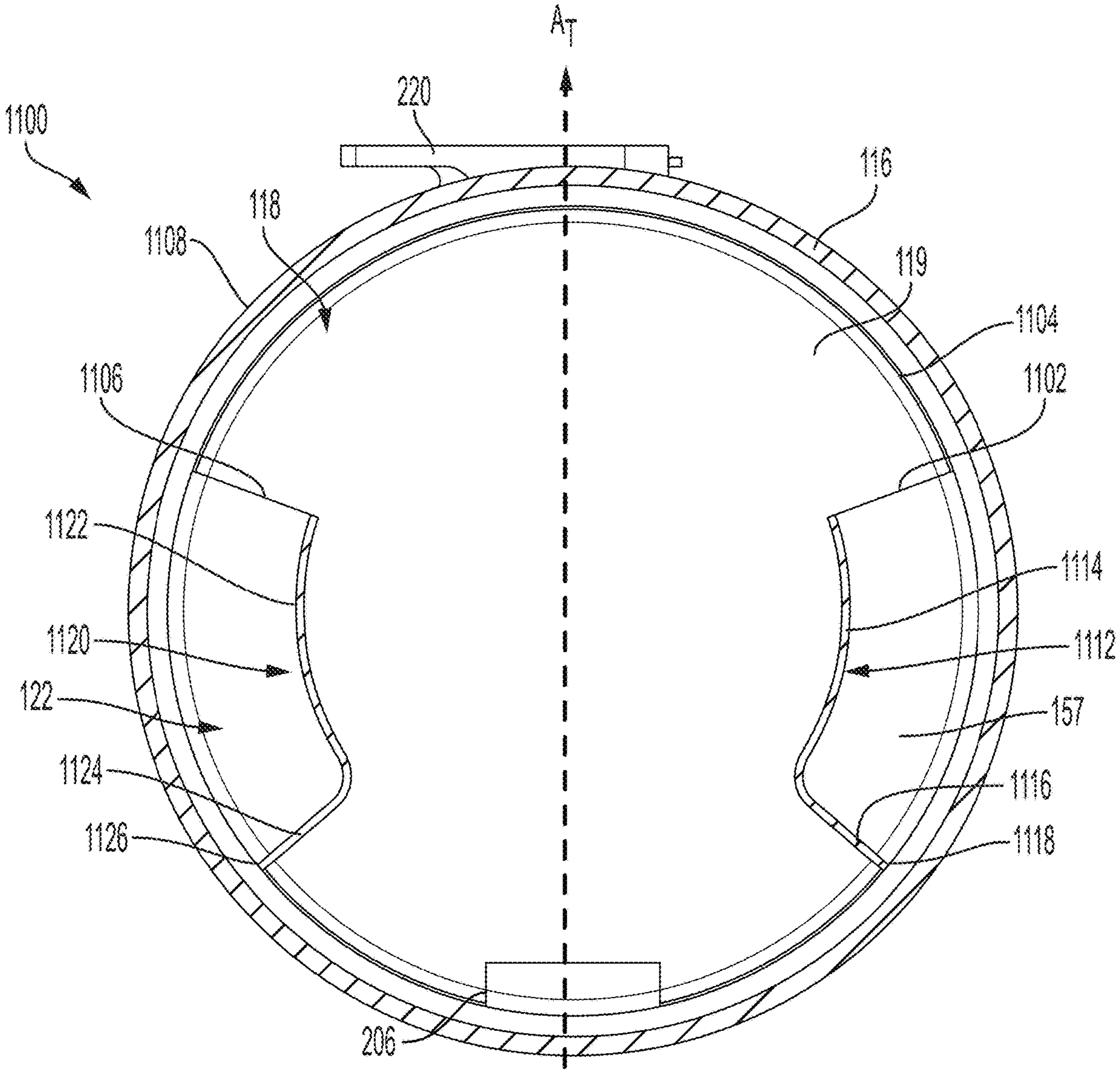
FIG. 17 is a longitudinal view of the exhaust mixer assembly of FIG. 16 taken along plane A-A.
Figure 18:
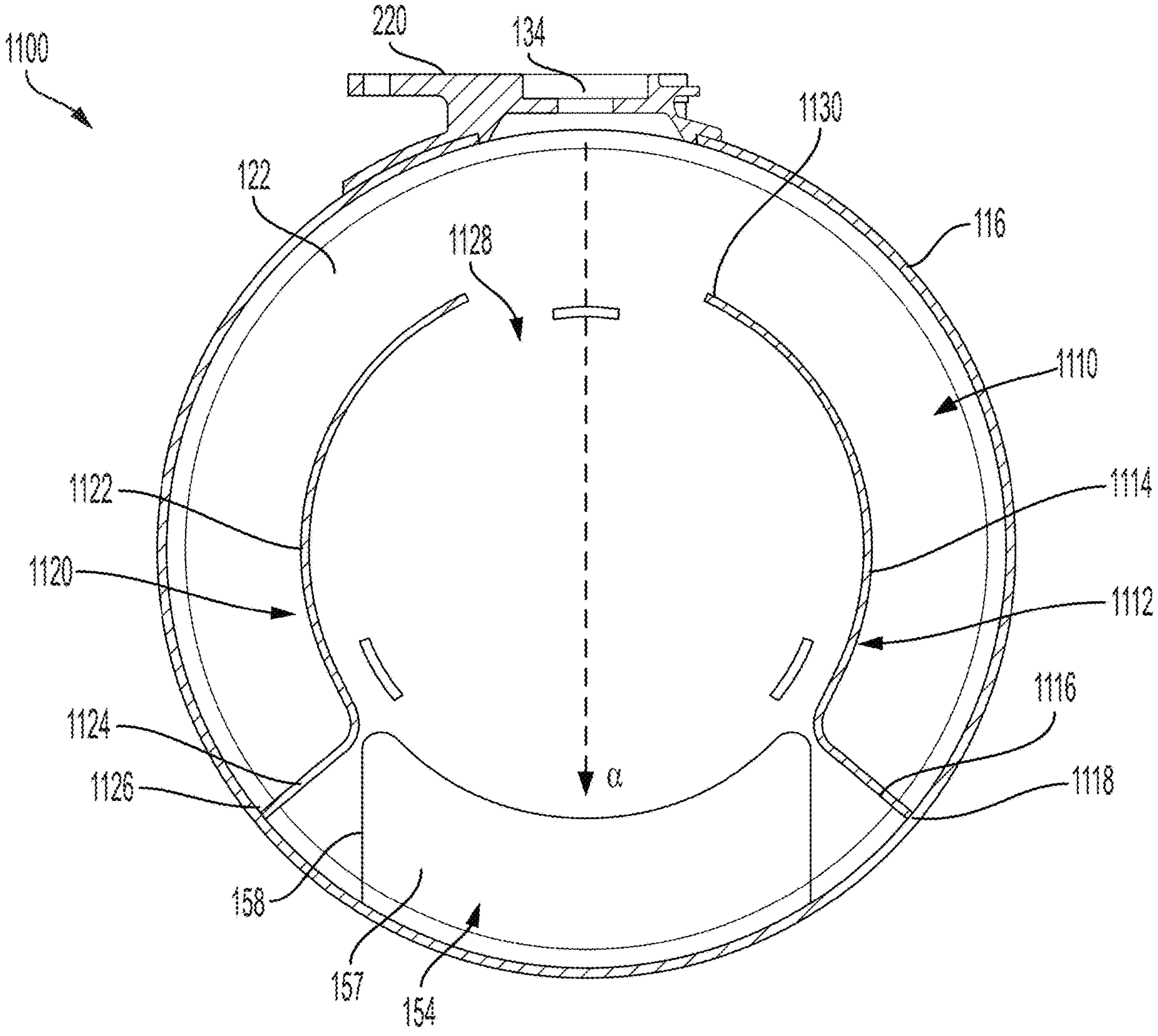
FIG. 18 is a longitudinal view of the exhaust mixer assembly of FIG. 16 taken along plane B-B.
Figure 19:
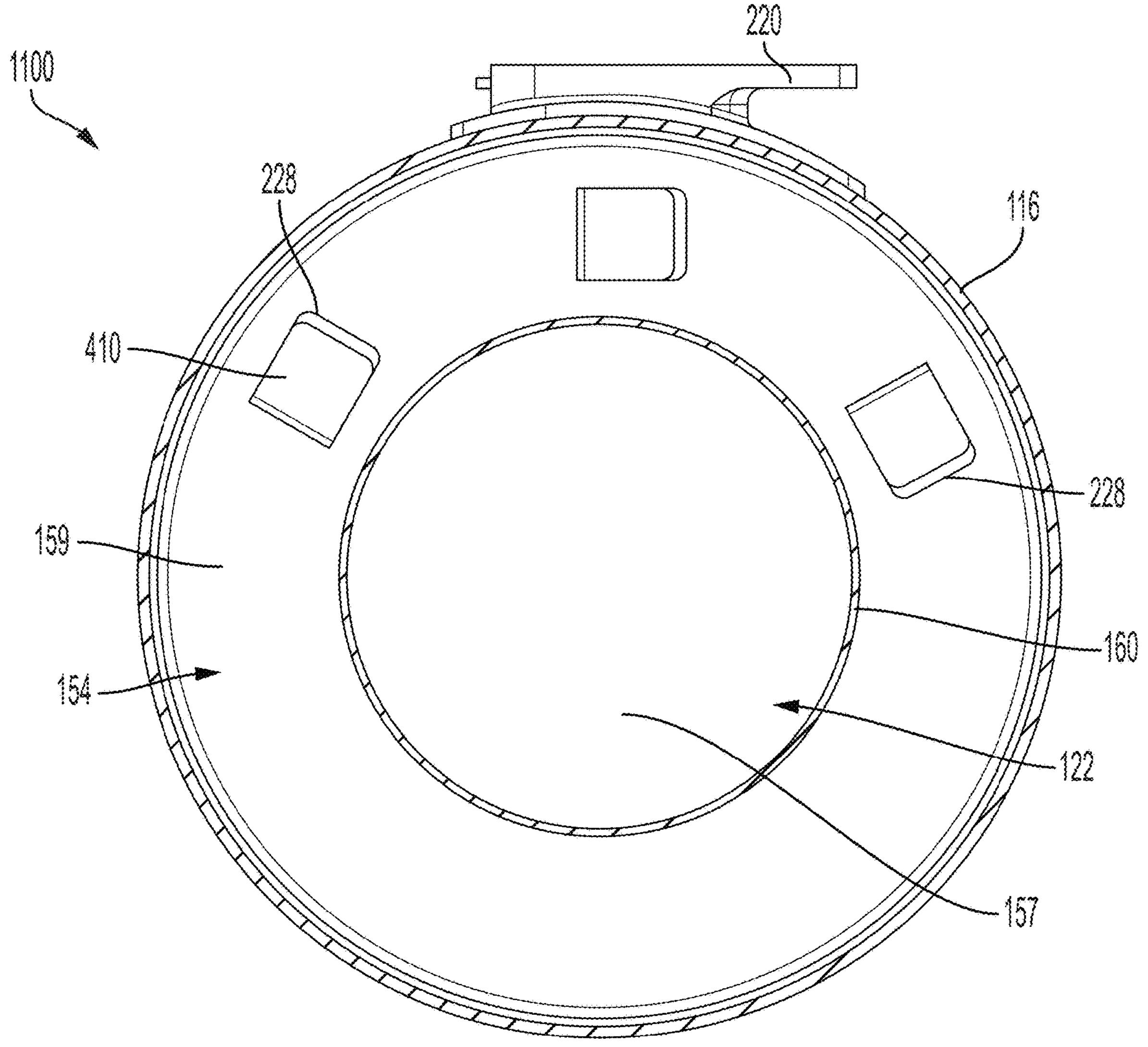
FIG. 19 is a longitudinal view of the exhaust mixer assembly of FIG. 16 taken along plane C-C.
Figure 20:
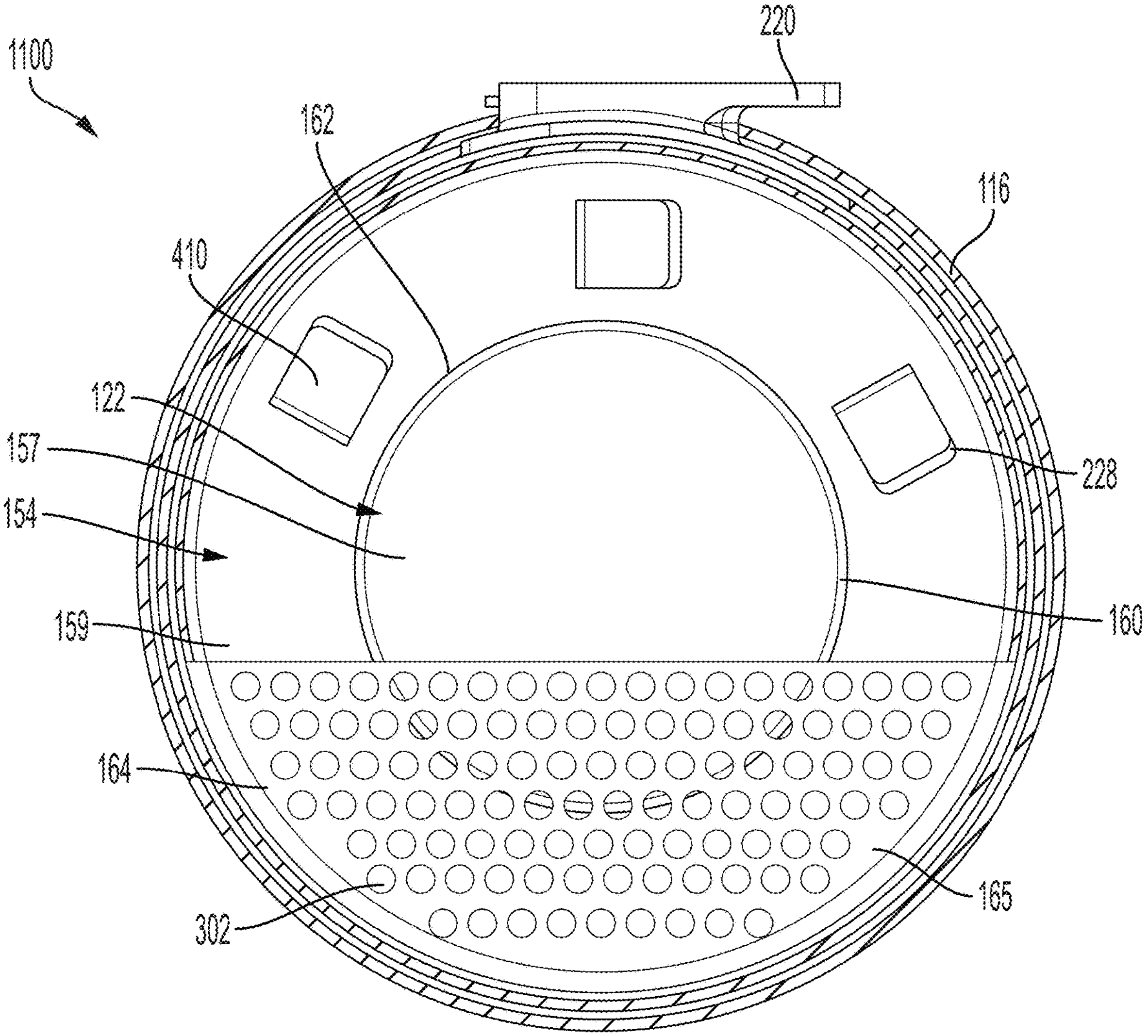
FIG. 20 is a longitudinal view of the exhaust mixer assembly of FIG. 16 taken along plane D-D.

FIG. 10 is a side cross-sectional view of the exhaust mixer assembly 114 according to the embodiment of FIG. 2. As shown in FIG. 10, a first portion of the exhaust reductant mixture 1002 flows out of the second mixing chamber 156 by flowing through the conveying tube lateral opening 226 and out of the outlet opening 160. A second portion of the exhaust reductant mixture 1004 may exit the second mixing chamber 156 by flowing though the peripheral openings 228. For example, the second portion of the exhaust reductant mixture 1004 may bypass the conveying tube 162 and flow through the peripheral openings 228 out of the second mixing chamber 156.

As the exhaust reductant mixture exits the conveying tube 162 through the outlet opening 160, the exhaust reductant mixture may exit the conveying tube at a non-zero angle relative to the longitudinal axis λ. For example, the exhaust reductant mixture may flow out of the conveying tube 162 through the outlet opening 160 at a non-zero angle (e.g., between 20 and 60 degrees, 45 degrees, etc.) downward towards the perforated plate 164. However, some of the exhaust reductant mixture may also flow out of the conveying tube 162 through the outlet opening 160 along the longitudinal axis λ (e.g., perpendicular to the direction of flow into the conveying tube 162).

The exhaust and reductant flow that exits the conveying tube 162 at a non-zero angle relative to the longitudinal axis λ is directed towards the perforated plate 164. The exhaust reductant mixture may flow through the plurality of openings 302 of the perforated plate 164 at a non-zero angle. The plurality of openings 302 facilitate passage of reductant through a portion of the perforated plate 164. The perforated plate 164 further disrupts the flow of the exhaust reductant mixture to facilitate further mixing in the downstream end of the exhaust mixer assembly 114.

IV. Second Example Exhaust Mixer Assembly

FIGS. 11-20 illustrate an exhaust mixer assembly 1100 according to various embodiments. The exhaust mixer assembly 1100 is similar to the exhaust mixer assembly 114 previously described, and the aforementioned description of the exhaust mixer assembly 114 similarly applies to the exhaust mixer assembly 1100, unless indicated to the contrary below.

The inlet plate 118 defines a first inlet opening 1102. The first inlet opening 1102 is positioned on a first side 1104 of the inlet plate 118. The first inlet opening 1102 is configured to receive exhaust from the upstream housing 108 and facilitate passage of the exhaust through the inlet plate 118.

The inlet plate 118 also defines a second inlet opening 1106. The second inlet opening 1106 is positioned on a second side 1108 of the inlet plate 118. The second inlet opening 1106 is positioned opposite the first inlet opening 1102. The second inlet opening 1106 is configured to receive exhaust from the upstream housing 108 and facilitate passage of the exhaust through the inlet plate 118.

The inlet plate 118 also defines a transverse axis $A_T$. The transverse axis $A_T$ is perpendicular to the longitudinal axis λ and parallel to the injector axis α. For example, the transverse axis $A_T$ bisects the inlet plate 118. The inlet plate 118 is symmetric across the transverse axis $A_T$. For example, the first inlet opening 1102 is positioned on the first side 1104 of the inlet plate 118 and the second inlet opening 1106 is positioned on a second side 1108 of the inlet plate and the first inlet opening 1102 and the second inlet opening 1106 are equidistant from the transverse axis $A_T$. The symmetry of the inlet plate 118 facilitates equal flow through each of the first inlet opening 1102 and the second inlet opening 1106.

Further, each of the auxiliary opening 206, the flow assist opening 402, and the second flow assist opening 406 are centered on the transverse axis $A_T$. For example, the transverse axis $A_T$ bisects each of the auxiliary opening 206, the flow assist opening 402, and the second flow assist opening 406.

The exhaust mixer assembly 1100 also includes the support plate 122, including the support plate opening 158, positioned downstream of the inlet plate 118. The inlet plate 118 and the support plate 122 define a second chamber 1110.

The exhaust mixer assembly 1100 further includes a first wall 1112. The first wall 1112 extends from the inlet plate 118 to the support plate 122. The first wall 1112 is configured to direct the flow of exhaust between the inlet plate 118 and the support plate 122.

The first wall 1112 includes a first cylindrical surface 1114. The first cylindrical surface 1114 is positioned in the second chamber 1110. The first cylindrical surface 1114 extends from a back side of the inlet plate 118 and the first inlet opening 1102 to the support plate 122. The first cylindrical surface 1114 is configured to direct exhaust from the first inlet opening 1102 upward within the second chamber 1110 towards the injector mounting bracket 220.

The first wall 1112 also includes a first flat surface 1116. The first flat surface 1116 is coupled to a bottom edge of the first cylindrical surface 1114. The first flat surface 1116 is also coupled to a bottom edge of the first inlet opening 1102. The first flat surface 1116 is configured to direct exhaust flow from the first inlet opening 1102 upward around the first cylindrical surface 1114 towards the injector mounting bracket 220. The first flat surface 1116 is also configured to prevent the flow of exhaust from the auxiliary opening 206 upward into the second chamber 1110.

The first flat surface 1116 includes a first lower edge 1118. The first lower edge 1118 is coupled to a side of the mixer housing 116. The first lower edge 1118 is configured to prevent the flow of exhaust downward away from the injection of reductant.

The exhaust mixer assembly 1100 also includes a second wall 1120. The second wall 1120 extends from the inlet plate 118 to the support plate 122. The second wall 1120 is positioned opposite the first wall 1112. The second wall 1120 is configured to direct the flow of exhaust between the inlet plate 118 and the support plate 122.

The second wall 1120 includes a second cylindrical surface 1122. The second cylindrical surface 1122 is positioned in the second chamber 1110 opposite of the first cylindrical surface 1114. The second cylindrical surface 1122 extends from the back side of the inlet plate 118 and the second inlet opening 1106 to the support plate 122. The second cylindrical surface 1122 is configured to direct exhaust from the second inlet opening 1106 upward within the second chamber 1110 towards the injector mounting bracket 220.

The second wall 1120 also includes a second flat surface 1124. The second flat surface 1124 is coupled to a bottom edge of the second cylindrical surface 1122. The second flat surface 1124 is also coupled to a bottom edge of the second inlet opening 1106. The second flat surface 1124 is positioned within the second chamber 1110 opposite the first flat surface 1116. The second flat surface 1124 is configured to direct exhaust flow from the second inlet opening 1106 upward around the second cylindrical surface 1122 towards the injector mounting bracket 220. The second flat surface 1124 is also configured to prevent the flow of exhaust from the auxiliary opening 206 upward into the second chamber 1110.

The second flat surface 1124 includes a second lower edge 1126. The second lower edge 1126 is coupled to a side of the mixer housing 116. The second lower edge 1126 is configured to prevent the flow of exhaust downward away from the injection of reductant.

The first wall 1112 and the second wall 1120 define a first chamber 1128. The first chamber 1128 is positioned along the injector axis α. For example, according to this embodiment, the first chamber 1128 is centered along the injector axis α. However, in other embodiments, the first chamber 1128 may be positioned on the injector axis α and offset.

An upper edge of each of the first wall 1112 and the second wall 1120 define a first opening 1130. For example, the upper edge of each of the first wall 1112 and the second wall 1120 are edges that are adjacent to the injector 134. The first opening 1130 is positioned in an upper half of the exhaust mixer assembly 1100 when looking down the longitudinal axis λ of the exhaust mixer assembly 114. For example, the first opening 1130 may be positioned in a half of the outlet plate 154 adjacent to the side of the mixer housing 116 in which reductant is provided. The first opening 1130 facilitates passage of exhaust and reductant into the first chamber 1128.

According to this embodiment, the first wall 1112 and the second wall 1120 are separate walls. In other embodiments, the first wall 1112 and the second wall 1120 may be coupled or connected. For example, the upper edge of each of the first wall 1112 and the second wall 1120 may extend toward each other to connect or may include a connector portion coupling the upper edge of each of the first wall 1112 and the second wall 1120, In yet another embodiment, the first wall 1112 and the second wall 1120 may be integrally formed as one continuous wall with an upper edge defining the first opening 1130.

The first inlet opening 1102 is configured to provide a first portion of exhaust to the first chamber 1128. For example, the first portion of exhaust provided by the first inlet opening 1102 flows around the first wall 1112 through the first opening 1130 into the first chamber 1128 through the first opening 1130. The second inlet opening 1106 is configured to provide a second portion of exhaust to the first chamber 1128. For example, the second portion of exhaust provided by the second inlet opening 1106 flows around the second wall 1120 through the first opening 1130 into the first chamber 1128.

The first lower edge 1118 and the second lower edge 1126 define a second opening 1132. The second opening 1132 is positioned in a lower half of the exhaust mixer assembly 1100 when looking down the longitudinal axis λ of the exhaust mixer assembly 114. For example, the second opening 1132 is positioned adjacent to a side of the mixer housing 116 opposite the injector 134. The second opening 1132 facilitates passage of the exhaust reductant mixture from the first chamber 1128 and through the support plate opening 158.

As the exhaust reductant mixture flows out of the second opening 1132, a third portion of exhaust is flowing into a bottom portion of the first chamber 1128 opposite the injector 134 through the auxiliary opening 206 along the support plate opening axis $A_b$. The untreated exhaust flowing through the auxiliary opening 206 mixes with the exhaust reductant mixture (e.g., treated exhaust) in the bottom of the first chamber 1128 opposite the injector 134 and into the second mixing chamber 156.

The third portion of exhaust provided through the auxiliary opening 206 provides a high flow rate along a bottom surface of the mixer housing 116, opposite the injector 134. For example, the high rate of flow of the third portion of exhaust provided through the auxiliary opening 206 may mitigate deposit formation (e.g., pooling of exhaust, etc.) by providing a hot flow of exhaust at a high flow rate along the bottom surface of the mixer housing 116, opposite the injector 134.

Once in the second mixing chamber 156, the exhaust reductant mixture is then directed upward toward the side of the mixer housing 116 where the injector 134 is positioned around the conveying tube 162. For example, in the second mixing chamber 156, the exhaust reductant mixture flows into the second mixing chamber 156 along the support plate opening axis $A_b$ and is directed upward circumferentially around the conveying tube 162.

At a top of the second mixing chamber 156 (e.g., adjacent to the side of the housing the injector 134 is positioned, etc.), a first portion of the exhaust reductant mixture flows downward towards the support plate opening axis $A_b$ opposite the injector 134 through the conveying tube lateral opening 226. For example, the first portion of the exhaust reductant mixture may be directed downward substantially parallel to the injector axis α through the conveying tube lateral opening 226.

The first portion of the exhaust reductant mixture then flows through the conveying tube 162 and out of the outlet opening 160. The first portion of the exhaust reductant mixture may flow out of the outlet opening 160 at a non-zero angle relative to the longitudinal axis λ of the exhaust mixer assembly 114 such that the first portion of the exhaust reductant mixture is directed towards the perforated plate 164. As the first portion of the exhaust reductant mixture flows through the perforated plate 164 is it further mixed (e.g., flow is disrupted, swirled, etc.) before flowing towards the catalyst member 168.

Also at the top of the second mixing chamber 156 adjacent to the side of the housing the injector 134 is positioned on, a second portion of the exhaust reductant mixture flows horizontally (e.g., substantially parallel to the longitudinal axis λ) through the plurality of peripheral openings 228. For example, the second portion of the exhaust reductant mixture may flow horizontally through the plurality of peripheral openings 228 such that the second portion of the exhaust reductant mixture bypasses the perforated plate 164 when flowing through an end of the exhaust mixer assembly 1100. The second portion of the exhaust reductant mixture flowing through the plurality of peripheral openings 228 is disrupted (e.g., redirected, mixed, etc.) by the plurality of peripheral opening flaps 410.

V. Third Example Exhaust Mixer Assembly

FIGS. 21-33 illustrate an exhaust mixer assembly 2100 according to various embodiments. The exhaust mixer assembly 2100 is similar to the exhaust mixer assembly 114 and the exhaust mixer assembly 1100 previously described, and the aforementioned description of the exhaust mixer assembly 114 and the exhaust mixer assembly 1100 similarly applies to the exhaust mixer assembly 2100, unless indicated to the contrary below.

The inlet plate 118 defines a first inlet opening 2102. The first inlet opening 2102 is positioned on a first side 2104 of the inlet plate 118. The first inlet opening 2102 is also positioned in a bottom half of inlet plate 118 when looking down the longitudinal axis λ of the mixer housing 116. For example, the first inlet opening 2102 may be positioned in a half of the outlet plate 154 opposite the side of the mixer housing 116 where the injector mounting bracket 220 is positioned. The first inlet opening 2102 is configured to receive exhaust from the upstream housing 108 and facilitates passage of the exhaust through the inlet plate 118.

The inlet plate 118 defines a second inlet opening 2106. The second inlet opening 2106 is positioned on a second side 2108 of the inlet plate 118 and also in a bottom half of the inlet plate 118 when looking down the longitudinal axis λ of the mixer housing 116. For example, the second inlet opening 2106 is positioned in the same half of the inlet plate 118 that the auxiliary opening 206 is positioned in. The second inlet opening 2106 is positioned opposite the first inlet opening 2102. The second inlet opening 2106 is configured to receive exhaust from the upstream housing 108 and facilitate the passage of the exhaust through the inlet plate 118.

The inlet plate 118 also defines the transverse axis $A_T$. The transverse axis $A_T$ is perpendicular to the longitudinal axis λ and parallel to the injector axis α. For example, the transverse axis $A_T$ bisects the inlet plate 118. The inlet plate 118 is symmetric across the transverse axis $A_T$. For example, the first inlet opening 2102 is positioned on the first side 2104 of the inlet plate 118 and the second inlet opening 2106 is positioned on a second side 2108 of the inlet plate and the first inlet opening 2102 and the second inlet opening 2106 are equidistant from the transverse axis $A_T$. The symmetry of the inlet plate 118 facilitates equal flow through each of the first inlet opening 2102 and the second inlet opening 2106.

Further, each of the auxiliary opening 206, the flow assist opening 402, and the second flow assist opening 406 are centered on the transverse axis $A_T$. For example, the transverse axis $A_T$ bisects each of the auxiliary opening 206, the flow assist opening 402, and the second flow assist opening 406.

The exhaust mixer assembly 2100 also includes the support plate 122, including the support plate opening 158, positioned downstream of the inlet plate 118. The inlet plate 118 and the support plate 122 define the second chamber 1110. The support plate opening 158 is positioned along the support plate opening axis $A_b$. The auxiliary opening 206 is also positioned along the support plate opening axis $A_b$. The alignment of the auxiliary opening 206 and the support plate opening 158 along the support plate opening axis $A_b$ facilitates continuous (e.g., unobstructed, etc.) flow between the inlet plate 118 and the support plate 122 mitigates formation of deposits within the exhaust mixer assembly 2100.

The exhaust mixer assembly 2100 also includes the outlet plate 154 including the outlet plate body 159 and the outlet opening 160. The support plate 122 and the outlet plate 154 define the second mixing chamber 156.

The exhaust mixer assembly 1100 further includes a first wall 2110. The first wall 2110 extends from the inlet plate 118 to the support plate 122. The first wall 2110 is curved (e.g., arched, minor arc, cylindrical, etc.) in shape. The first wall 2110 is configured to direct the flow of exhaust between the inlet plate 118 and the support plate 122.

The first wall 2110 includes a first lower edge 2112. The first lower edge 2112 is in contact with the mixer housing 116. By positioning the first lower edge 2112 of the first wall 2110 in contact with the mixer housing 116, the flow of exhaust into the second chamber 1110 via the first inlet opening 2102 is forced upward towards the injector mounting bracket 220.

The first wall 2110 includes a first tab 2114. The first tab 2114 is positioned on a first lateral edge 2115 of the first wall 1112 adjacent to the inlet plate 118. The first tab 2114 protrudes outward from the first inlet opening 2102 towards the upstream housing 108. The first tab 2114 is configured to engage with the first inlet opening 2102 and prevents a portion of exhaust from flowing through the first inlet opening 2102, such that the portion of exhaust contacts the inlet plate body 119.

The exhaust mixer assembly 1100 also includes a second wall 2116. The second wall 2116 extends from the inlet plate 118 to the support plate 122. The second wall 2116 is curved (e.g., a minor arc, arched, cylindrical, etc.) in shape. The second wall 2116 is positioned opposite the first wall 2110. The second wall 2116 is configured to direct the flow of exhaust between the inlet plate 118 and the support plate 122 (e.g., into the second chamber 1110).

The first wall 2110 and the second wall 2116 define the first chamber 1128. The first chamber 1128 is positioned along the injector axis α. For example, according to this embodiment, the first chamber 1128 is centered along the injector axis α. However, in other embodiments, the first chamber 1128 may be positioned on the injector axis α and offset.

According to this embodiment, the first chamber 1128 is a convergent mixing chamber. For example, the arc shape of each of the first wall 2110 and the second wall 2116 reduces the volume of the first chamber 1128. The reduced volume of the first chamber 1128 improves the energy utilization rate of exhaust gas. For example, the reduced volume forces the reductant and exhaust to converge towards the center of the first mixing chamber which accelerates the mixing of reductant and exhaust.

The second wall 2116 includes a second lower edge 2118. The second lower edge 2118 is in contact with the mixer housing 116. By positioning the second lower edge 2118 of the second wall 2116 in contact with the mixer housing 116, the flow of exhaust into the second chamber 1110 via the second inlet opening 2106 is forced upward towards the injector mounting bracket 220. For example, each of the first lower edge 2112 and the second lower edge 2118 prevent exhaust from flow flowing downward away from the injector mounting bracket 220 bypassing the first chamber 1128.

The second wall 2116 includes a second tab 2120. The second tab 2120 is positioned on a second lateral edge 2117 of the second wall 2116 adjacent to the inlet plate 118. The second tab 2120 protrudes outward from the second inlet opening 2106 towards the upstream housing. The second tab 2120 is configured to engage with the second inlet opening 2106 and prevents a portion of exhaust from flowing through the second inlet opening 2106, such that the portion of exhaust contacts the inlet plate body 119.

The first wall 2110 also includes a first wall opening 2122. In various embodiments, the first wall opening 2122 is positioned in an upper half of the first wall 2110 closest to the injector mounting bracket 220 when looking down the longitudinal axis λ of the mixer housing 116. For example, the first wall opening 2122 is positioned in a half of the first wall 2110 adjacent to (e.g., nearest, etc.) the injector mounting bracket 220. In various embodiments the first wall opening 2122 may be rectangular in shape. In other embodiments, other shapes (e.g., circles, ovals, etc.) are possible. The first wall opening 2122 is configured to allow a first portion of exhaust in the second chamber 1110 to flow through the first wall opening 2122 and into the first chamber 1128. For example, a portion of exhaust may flow horizontally (e.g., parallel to the longitudinal axis λ of the mixer housing 116) into the second chamber 1110 via the first inlet opening 2102. Once in the second chamber 1110, the first portion of exhaust flows through the first wall opening 2122 while the remainder of the exhaust that entered the second chamber 1110 via the first inlet opening 2102 is directed upwards towards the injector mounting bracket 220.

The second wall 2116 also includes a second wall opening 2124. In various embodiments, the second wall opening 2124 is positioned in an upper half of the second wall 2116 closest to the injector mounting bracket 220 when looking down the longitudinal axis λ of the mixer housing 116. The second wall opening 2124 is positioned opposite the first wall opening 2122. In various embodiments, the second wall opening 2124 is rectangular in shape. In other embodiments, other shapes (e.g., circles, ovals, etc.) are possible. The second wall opening 2124 is configured to allow a second portion of exhaust into the second chamber 1110 to flow through the second wall opening 2124 and into the first chamber 1128. For example, a portion of exhaust may flow horizontally (e.g., parallel to the longitudinal axis λ of the housing) into the second chamber 1110 via the second inlet opening 2106. Once in the second chamber 1110, the second portion of exhaust flows through the second wall opening 2124 while the remainder of the exhaust that entered the second chamber 1110 via the second inlet opening 2106 is directed upwards towards the injector mounting bracket 220.

An upper edge of each of the first wall 2110 and the second wall 2116 define the first opening 1130. For example, the upper edge of each of the first wall 2110 and the second wall 2116 are edges that are adjacent to the injector 134. The first opening 1130 is positioned in an upper half of the exhaust mixer assembly 2100 when looking down the longitudinal axis λ of the exhaust mixer assembly 114. For example, the first opening 1130 is positioned adjacent to the injector mounting bracket 220 where reductant is provided into the exhaust gas aftertreatment system 100. The first opening 1130 allows a portion exhaust and reductant to flow into the first chamber 1128. For example, a portion of exhaust that is received by the first inlet opening 2102 and forced upwards towards the injector mounting bracket 220 (e.g., the remainder of exhaust that does not flow through the first wall opening 2122, etc.) and another portion of exhaust received by the second inlet opening 2106 and forced upwards towards the injector mounting bracket 220 (e.g., the remainder of exhaust that does not flow through the second wall opening 2124, etc.) enter the first chamber 1128 via the first opening 1130.

The first lower edge 2112 of the first wall 2110 and the second lower edge 2118 of the second wall 2116 define the second opening 1132. The second opening 1132 is positioned in a lower half of the exhaust mixer assembly 2100 when looking down the longitudinal axis λ of the exhaust mixer assembly 114. For example, the second opening 1132 is positioned adjacent to a side of the mixer housing 116 opposite the injector 134. The second opening 1132 allows the exhaust reductant mixture to exit the first chamber 1128 and flow through the support plate opening 158.

Figure 21:
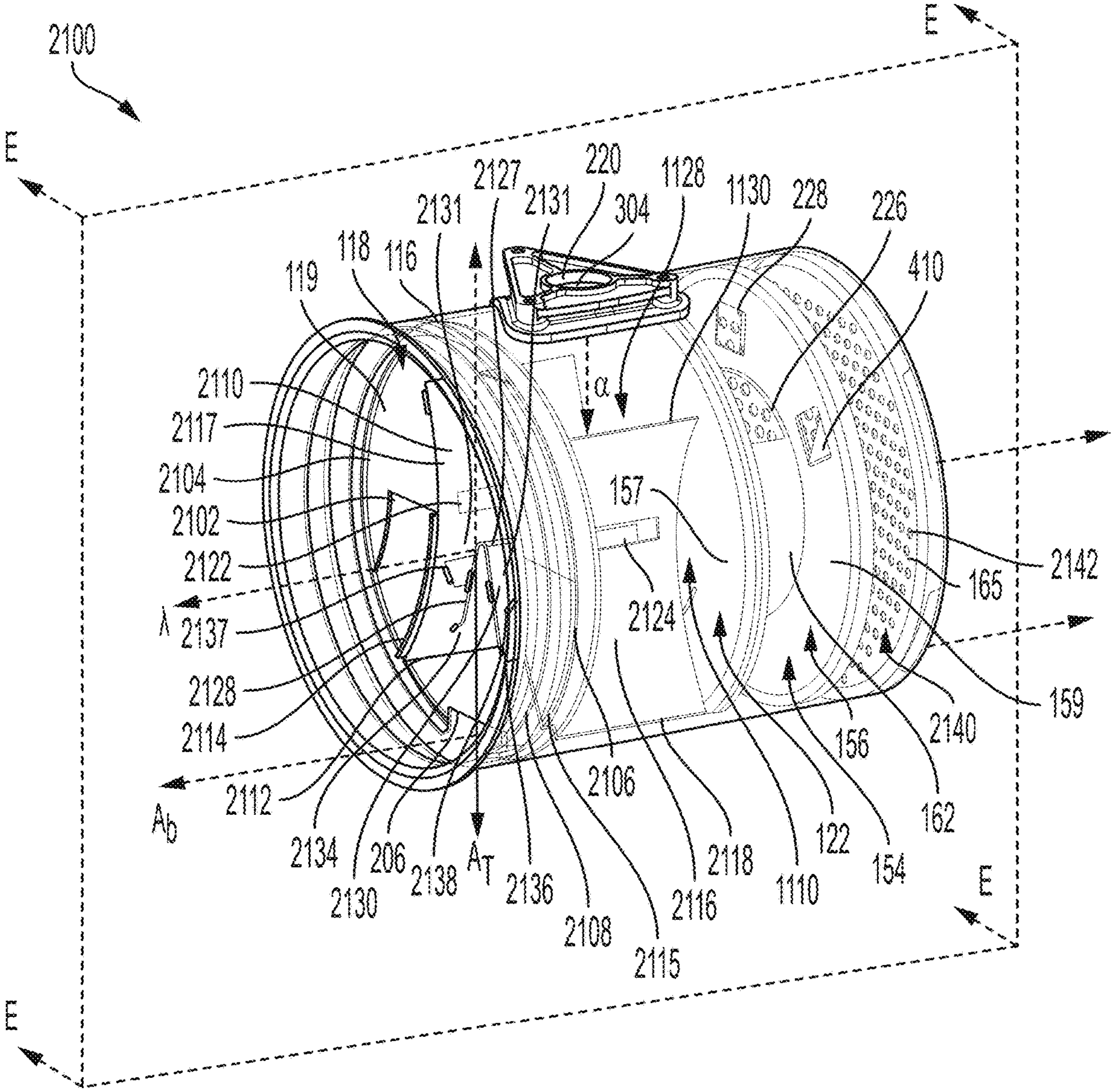
FIG. 21 is a perspective view of an exhaust mixer assembly according to another embodiment with a portion of the exhaust mixer assembly shown with partial transparency.
Figure 22:
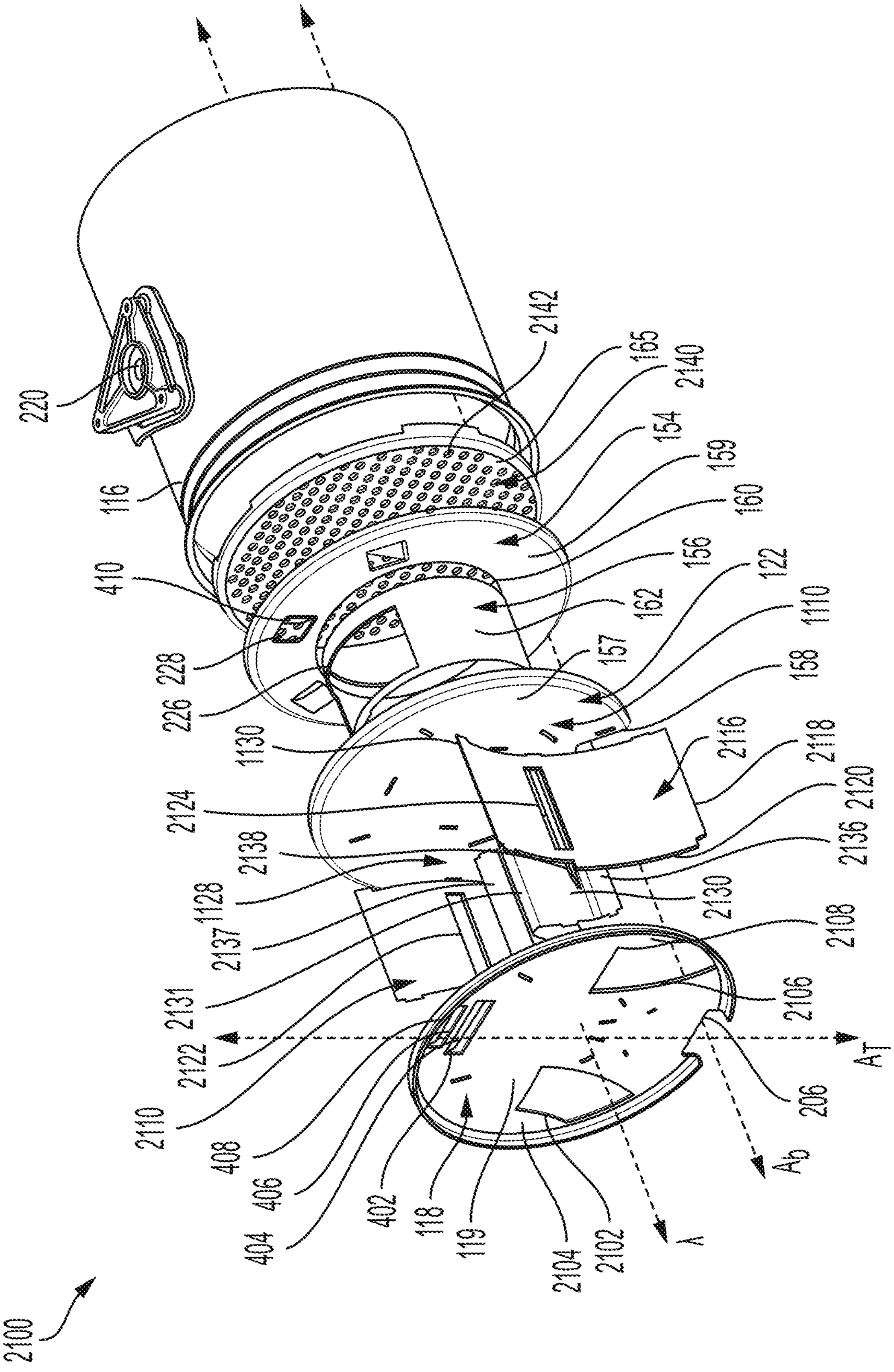
FIG. 22 is an exploded view of the exhaust mixer assembly of FIG. 21.
Figure 23:
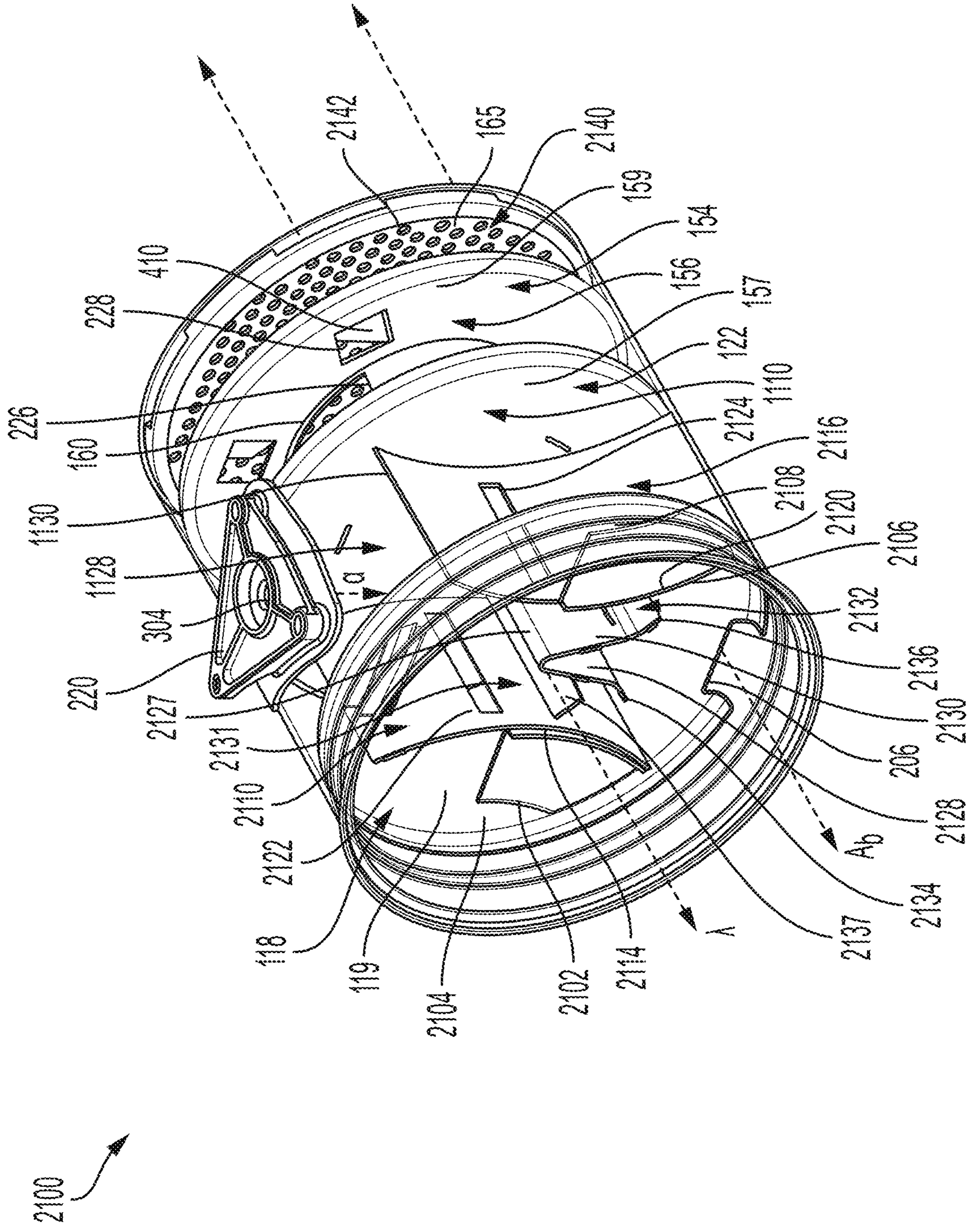
FIG. 23 is another perspective view of the exhaust mixer assembly of FIG. 21 with a portion of the exhaust mixer assembly shown with partial transparency.
Figure 24:
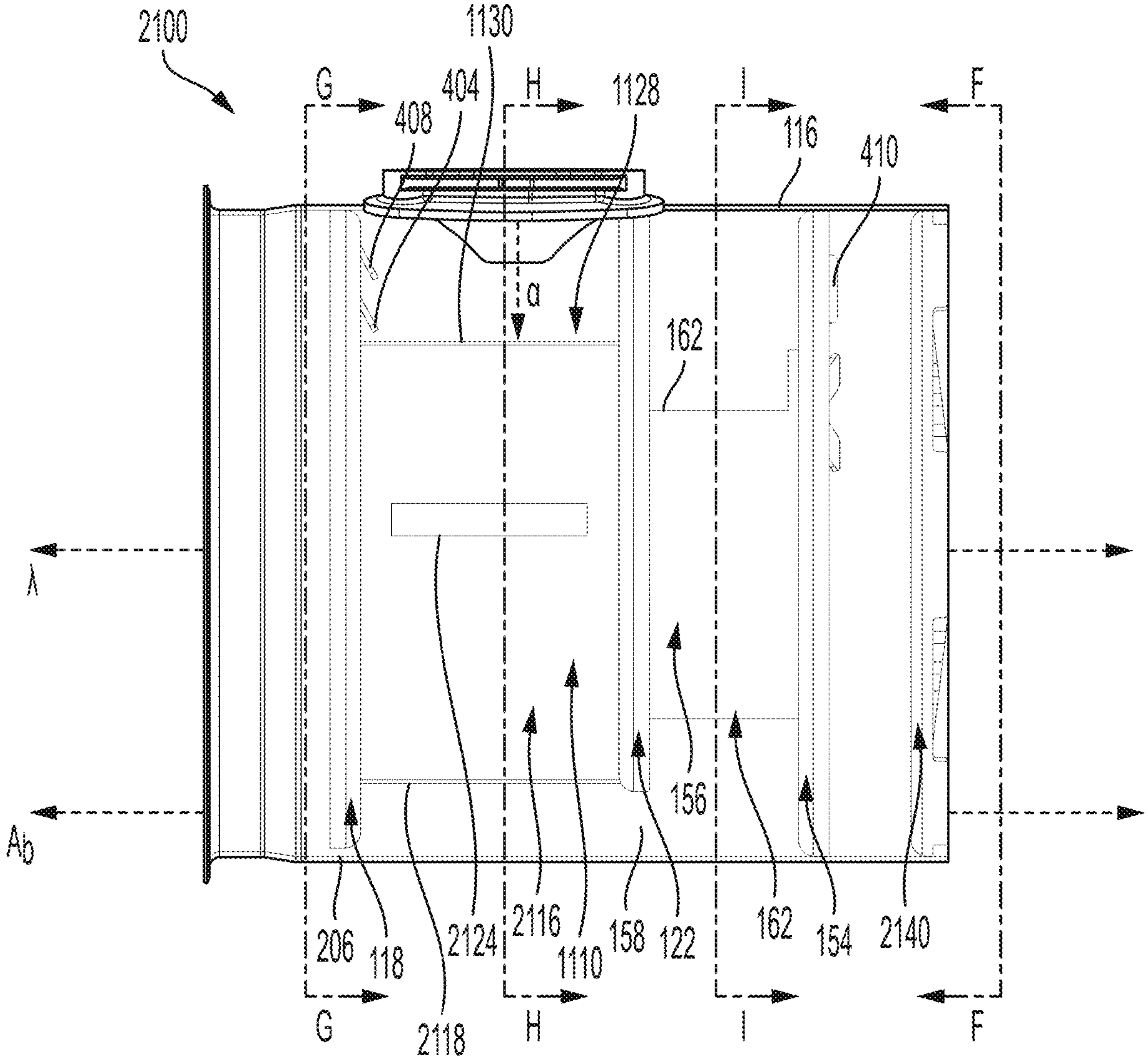
FIG. 24 is a cross-sectional view of the exhaust mixer assembly of FIG. 21 taken along plane E-E.

As shown in FIGS. 21-23, the exhaust mixer assembly 2100 further includes an impingement plate 2126. The impingement plate 2126 is positioned between the first wall 2110 and the second wall 2116 along the longitudinal axis λ. The impingement plate 2126 is also positioned in the first chamber 1128 in a half of the mixer housing 116 opposite a side of the mixer housing 116 where the injector mounting bracket 220 is positioned. According to this embodiment, the impingement plate 2126 is V shaped. In other embodiments, other shapes (e.g., U-shape, a vertical plate, a horizontal plate, etc.) are possible. The impingement plate 2126 is configured to obstruct (e.g., impede, direct, etc.) flow of exhaust and reductant within the first chamber 1128 to facilitate further mixing.

According to this embodiment, the impingement plate includes an edge 2127 (e.g., a point of the V shape of the impingement plate 2126, etc.). The edge 2127 is positioned parallel to the longitudinal axis λ. In some embodiments, the edge 2127 is positioned directly along the longitudinal axis λ. The edge 2127 is configured to direct a portion of the exhaust and reductant mixture within the first chamber 1128.

According to this embodiment, the impingement plate 2126 further includes a first wing 2128 and a second wing 2130. The first wing 2128 and the second wing 2130 extend at a non-zero angle from the edge 2127 of the impingement plate 2126. For example, a non-zero angle is positioned between the first wing 2128 and the second wing 2130. The non-zero angle may be in a range between 15 degrees and 60 degrees. The first wing 2128 and the second wing 2130 direct the flow of exhaust and reductant away from the injector axis α and towards each of the first wall 2110 and the second wall 2116 respectively.

The edge 2127 of the impingement plate 2126 is separated a first distance away from the first wall 2110 and a second distance away from the second wall 2116 defining a first channel 2131 and second channel 2132 respectively. According to this embodiment, the first distance and the second distance are equal. For example, the edge 2127 may be equidistant from each of the first wall 2110 and the second wall 2116. In other embodiments, the first distance between the edge 2127 and the first wall 2110 may be different (e.g., unequal, etc.) from the second distance between the edge 2127 and the second wall 2116. The first distance between the edge 2127 and the first wall 2110 and the second distance between the edge 2127 and the second wall 2116 when viewed in a cross section is less than or equal to 10% of a diameter of the mixer housing 116.

Further, each of the first channel 2131 and the second channel 2132 receive a portion of exhaust from the first opening 1130. The first channel 2131 and the second channel 2132 are configured to further mix the exhaust and reductant in the first chamber 1128.

The first wing 2128 and the second wing 2130 include a first wing edge 2134 and a second wing edge 2136 respectively. The first wing edge 2134 is positioned a third distance away from the first wall 2110 and the second wing edge 2136 is positioned a fourth distance away from the second wall 2116. The third distance and the fourth distance are measured along a plane that is perpendicular to the injector axis α (e.g., a horizontal axis when perpendicular to the injector axis α when viewed along a cross section, etc.). According to this embodiment, the third distance is equal to the fourth distance. Further, the third distance is less than the first distance, and the fourth distance is less than the second distance. For example, each of the first channel 2131 and the second channel 2132 decrease in size (e.g., width decreases, etc.) from the edge 2127 of the impingement plate 2126 to each of the first wing edge 2134 and the second wing edge 2136. In other embodiments, the third distance may be greater than or less than the fourth distance.

As reductant is dosed into the aftertreatment system 100, the reductant can land (e.g., settle, fall, etc.) on the impingement plate 2126. The impingement plate 2126 is heated by the exhaust in the first chamber 1128 mitigating the formation of deposits. For example, the impingement plate 2126 may mitigate the formation of deposits on the mixer housing 116.

Further, the impingement plate 2126 increases the evaporation area of reductant. For example, reductant droplets slide down and evaporate continuously along each of the first wing 2128 and the second wing 2130 which reduces deposit formation. The position of the impingement plate 2126 centrally within the first chamber 1128 and a distance away from the first opening 1130 and the injector 134 allows for heat to accumulate near the impingement plate 2126. The heat accumulation around the impingement plate 2126 aids the evaporation of reductant and reduces deposit formation. For example, hot exhaust gas passes around each of the first wing 2128 and the second wing 2130 of the impingement plate 2126. The hot exhaust gas heats up (e.g., increases the temperature of, etc.) the impingement plate 2126 causing the reductant to evaporate off of the surfaces of each of the first wing 2128 and the second wing 2130.

The exhaust mixer assembly 2100 further includes a first fin 2137. The first fin 2137 is positioned between the first wall 2110 and the first wing 2128 of the impingement plate 2126 in the first channel 2131. The first fin 2137 is positioned at a non-zero angle relative to the first wing 2128. For example, the first fin 2137 may be positioned at an angle in a range between 30 and 80 degrees relative to the first wing 2128. The first fin 2137 is configured to interact with the flow of the exhaust reductant mixture through the first channel 2131 to facilitate additional mixing. For example, the first fin 2137 may be configured to direct flow towards the first wing 2128.

The exhaust mixer assembly 2100 further includes a second fin 2138. The second fin 2138 is positioned between the second wall 2116 and the second wing 2130 of the impingement plate 2126 in the second channel 2132. The second fin 2138 is also positioned opposite the first fin 2137. The second fin 2138 is positioned at a non-zero angle relative to the second wing 2130. For example, the second fin 2138 may be positioned at an angle in a range between 30 and 80 degrees relative to second wing 2130. The second fin 2138 is configured to interact with the flow of the exhaust reductant mixture through the second channel 2132 to facilitate additional mixing. For example, the second fin 2138 is configured to direct flow towards the second wing 2130 to facilitate further mixing.

The first fin 2137 and the second fin 2138 provide additional surface area to the impingement plate 2126. Thus, the first fin 2137 and the second fin 2138 are additional surface areas that are heated by exhaust gas causing reductant droplets to evaporate. For example, the first fin 2137 and the second fin 2138 may be positioned at a non-zero angle relative to each of the first wing 2128 and the second wing 2130 such that they may provide a flatter surface to catch reductant droplets and further facilitate evaporation.

After each portion of exhaust flows through at least one of the first channel 2131 or the second channel 2132, the exhaust flows through the second opening 1132 out of the first chamber 1128. Exhaust is then directed through the support plate opening 158 to the second mixing chamber 156.

Once in the second mixing chamber 156, the exhaust reductant mixture may contact the outlet plate 154 and be directed upward toward the side of the mixer housing 116 where the injector 134 is positioned around the conveying tube 162. For example, in the second mixing chamber 156, the exhaust reductant mixture flows into the second mixing chamber 156 along the support plate opening axis $A_b$ and is directed upward circumferentially around the conveying tube 162.

At a top of the second mixing chamber 156 (e.g., adjacent to the side of the housing the injector 134 is positioned, etc.), a first portion of the exhaust reductant mixture flows downward towards the support plate opening axis $A_b$ opposite the injector 134 through the conveying tube lateral opening 226. For example, the first portion of the exhaust reductant mixture may be directed downward substantially parallel to the injector axis α through the conveying tube lateral opening 226.

Also at the top of the second mixing chamber 156, a second portion of exhaust is directed out of the second mixing chamber 156 through each of the plurality of peripheral openings 228. The exhaust mixer assembly 2100 includes three peripheral openings, but any number of peripheral openings 228 is possible.

Figure 25:
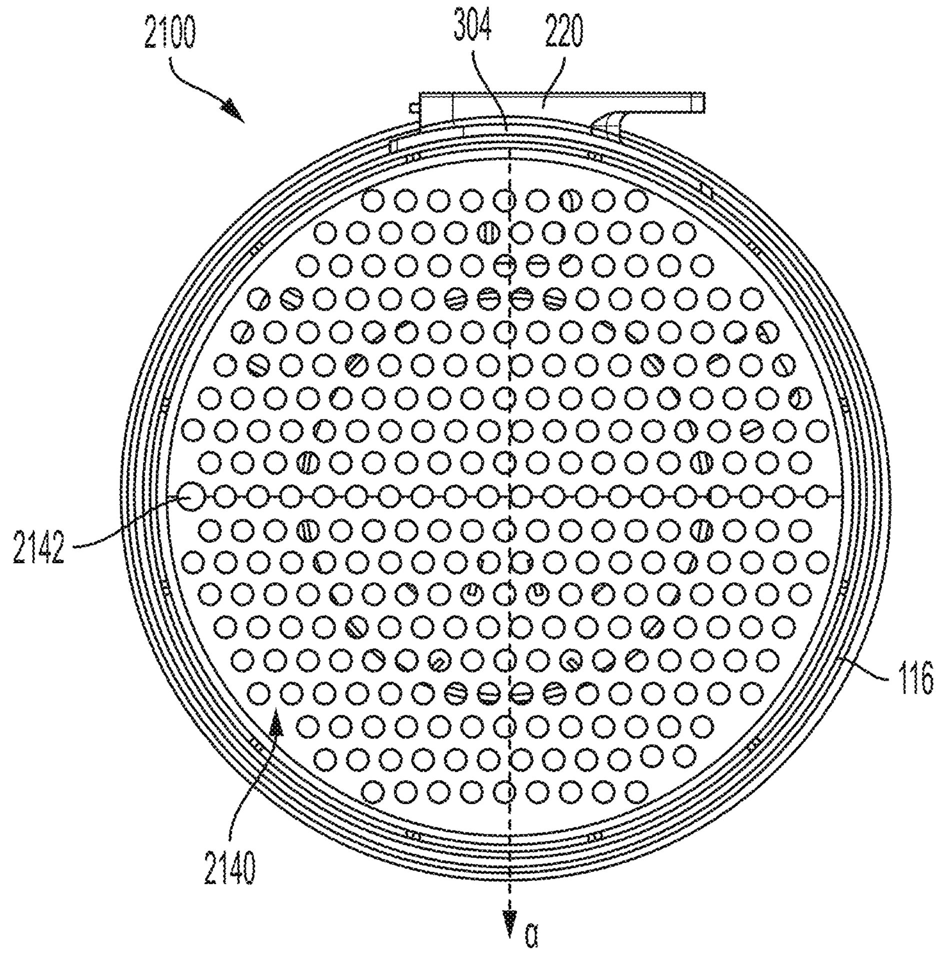
FIG. 25 is a longitudinal view of the exhaust mixer assembly of FIG. 24 taken along plane F-F.

As shown in FIG. 25, the exhaust mixer assembly 2100 further includes the perforated plate 2140. The perforated plate 2140 is coupled to the mixer housing 116 and is positioned downstream of the outlet plate 154. According to this embodiment, the perforated plate 2140 overlaps the entire outlet opening 160. For example, exhaust directed through each of the outlet opening 160 and the plurality of peripheral openings 228 flows through the perforated plate 2140 and out of the exhaust mixer assembly 2100.

The perforated plate 2140 includes a plurality of openings 2142. The plurality of openings 2142 may be uniformly defined by the perforated plate 2140. The plurality of openings 2142 are configured to further mix the exhaust reductant mixture as it exits the exhaust mixer assembly 2100.

Figure 26:
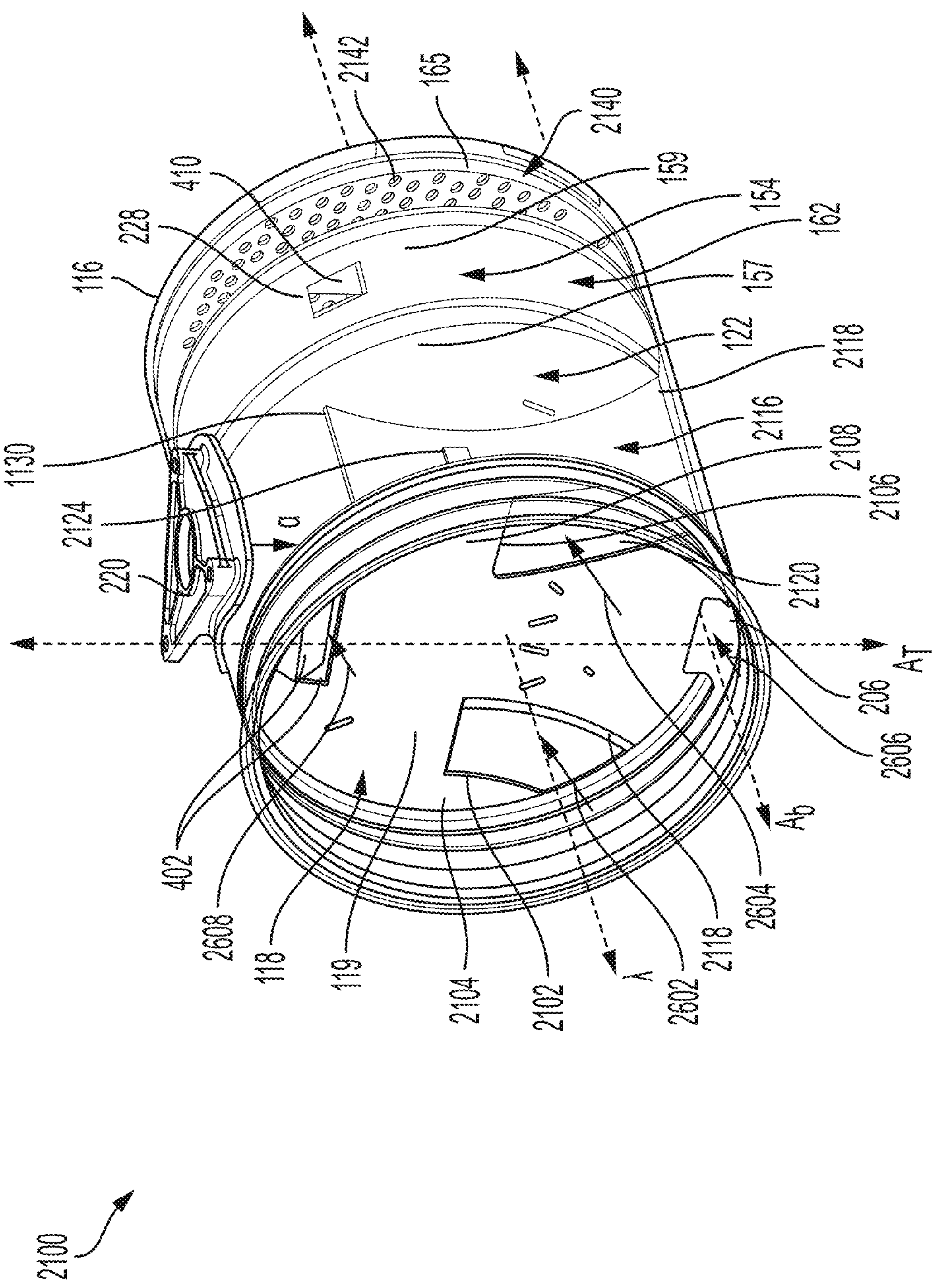
FIG. 26 is a perspective view of a portion of the exhaust mixer assembly of FIG. 21 with a portion of the exhaust mixer assembly shown with partial transparency.
Figure 27:
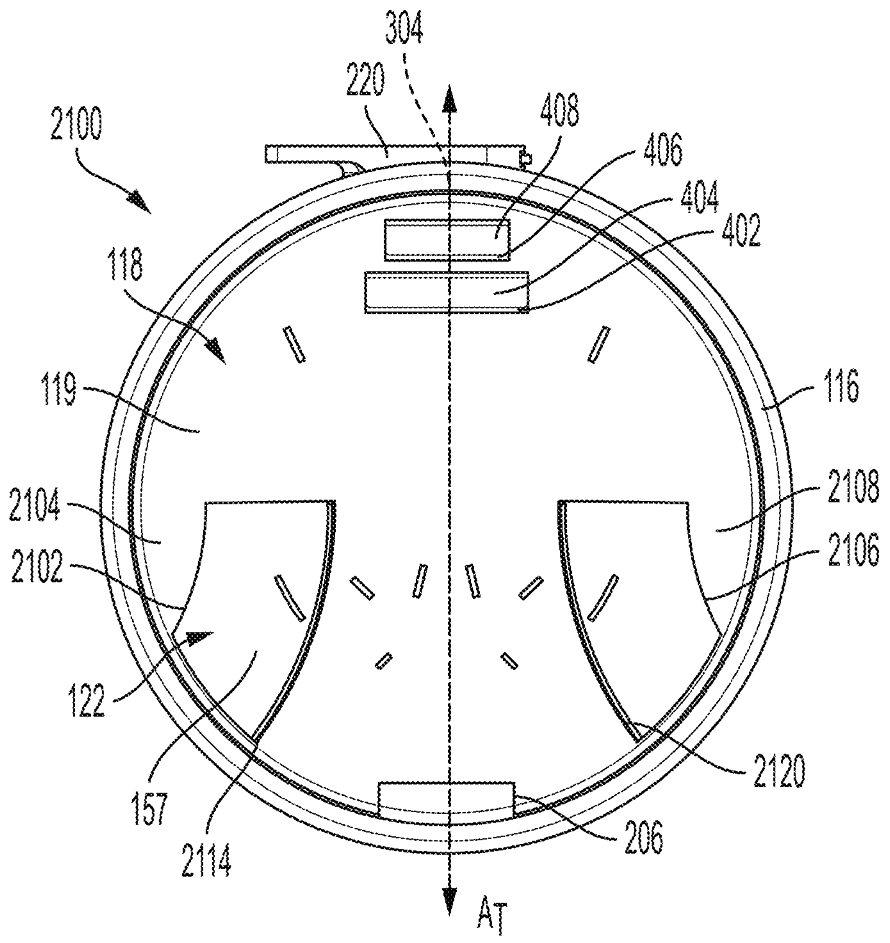
FIG. 27 is a longitudinal view of the exhaust mixer assembly of FIG. 24 taken along plane G-G.
Figure 28:
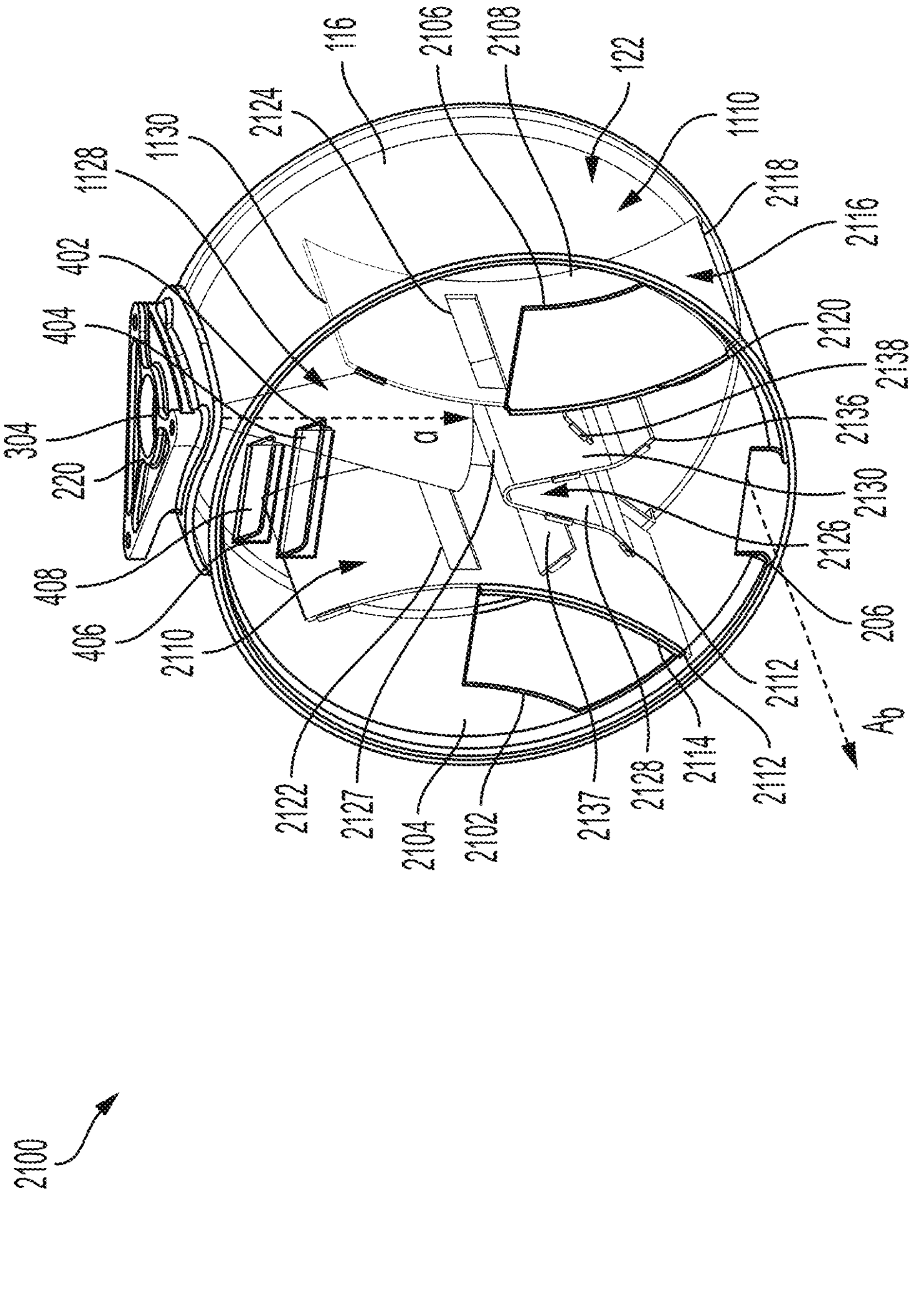
FIG. 28 is a perspective view of a portion of the exhaust mixer assembly of FIG. 21 with a portion of the exhaust mixer assembly shown with partial transparency.

As shown in FIGS. 26-28, a first portion 2602 of exhaust is received by the first inlet opening 2102 and directed into the second chamber 1110. A second portion 2604 of exhaust is received by the second inlet opening 2106 and also directed into the second chamber 1110. A third portion 2606 of exhaust is received by the auxiliary opening 206 and directing towards the support plate opening 158 below the second opening 1132. Further, a fourth portion 2608 of exhaust may flow through each of the flow assist opening 402 and the second flow assist opening 406 into an upper portion of the second chamber 1110 near the first opening 1130 and the injector mounting bracket 220.

Figure 29:
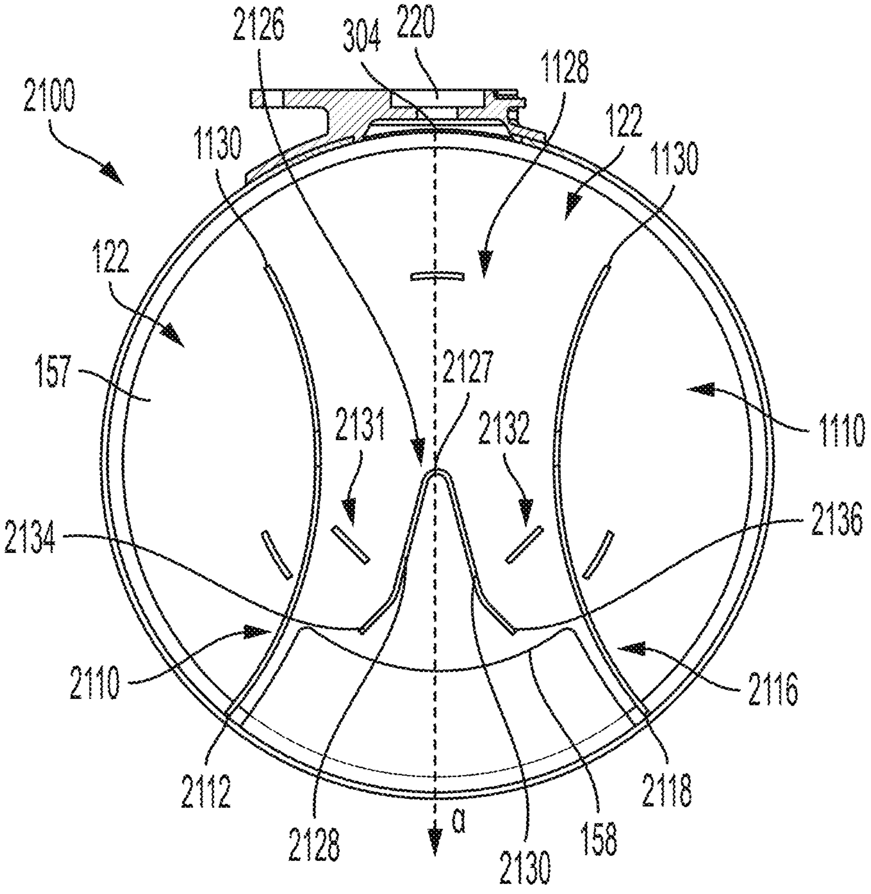
FIG. 29 is another longitudinal view of the exhaust mixer assembly of FIG. 24 taken along plane H-H.
Figure 30:
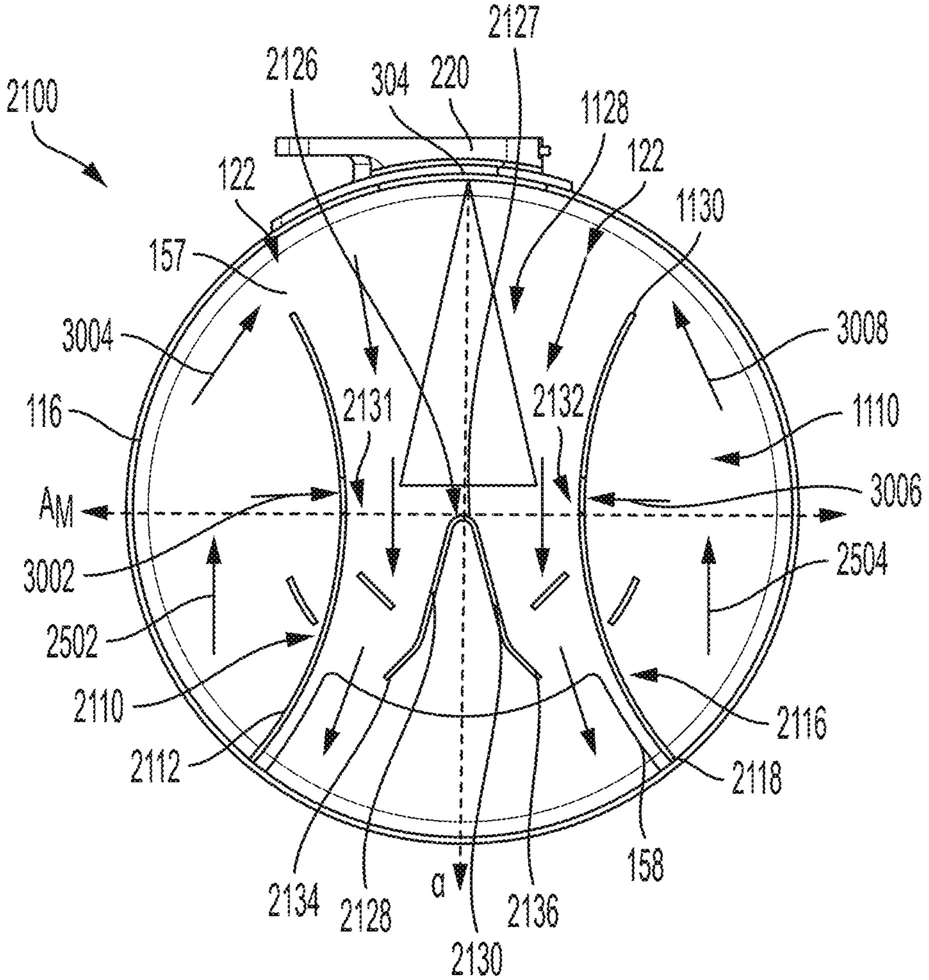
FIG. 30 is a longitudinal view of the exhaust mixer assembly of FIG. 24 taken along plane H-H.

As shown in FIG. 29-30, is the second chamber 1110 and the first chamber 1128 of the exhaust mixer assembly 2100. After the first portion 2602 and the second portion 2604 of exhaust enter the second chamber 1110 via each of the first inlet opening 2102 and the second inlet opening 2106, respectively, the first portion 2602 and second portion 2604 of exhaust are forced upwards towards the injector mounting bracket 220.

Towards a midline $A_M$ (e.g., a transverse plane perpendicular to the longitudinal axis λ of the mixer housing 116), a first amount 3002 of the first portion 2602 of exhaust is directed through the first wall opening 2122 to the first chamber 1128. For example, the first amount 3002 of the first portion 2602 of exhaust is directed perpendicular to the longitudinal axis λ and parallel to the midline $A_M$ through the first wall opening 2122. Further, a second amount 3004 of the first portion 2602 of exhaust is directed further upward toward the injector mounting bracket 220 and the first opening 1130. Once at the top of the mixer housing 116, the second amount 3004 of the first portion 2602 of exhaust is directed downward toward the impingement plate 2126 with reductant injected by the injector 134 into the first chamber 1128.

The first amount 3002 and the second amount 3004 of the first portion 2602 of exhaust is then directed into at least one of the first channel 2131 or the second channel 2132. Once in either the first channel 2131 or the second channel 2132, the first amount 3002 and the second amount 3004 contact at least one of the first fin 2137 or the second fin 2138 while moving downward toward the support plate opening axis $A_b$.

Towards the midline $A_M$, a first amount 3006 of the second portion 2604 of exhaust is directed through the second wall opening 2124 to the first chamber 1128. For example, the first amount 3006 of the second portion 2604 of exhaust is directed perpendicular to the longitudinal axis λ and parallel to the midline $A_M$ through the second wall opening 2124. Further, a second amount 3008 of the second portion 2604 of exhaust is directed further upward toward the injector mounting bracket 220 and the first opening 1130. Once at the top of the mixer housing 116, the second amount 3008 of the second portion 2604 of exhaust is directed downward toward the impingement plate 2126 with reductant injected by the injector 134 into the first chamber 1128.

The first amount 3006 and the second amount 3008 of the second portion 2604 of exhaust is then directed into at least one of the first channel 2131 or the second channel 2132. Once in either the first channel 2131 or the second channel 2132, the first amount 3006 and the second amount 3008 of the second portion 2604 contact at least one of the first fin 2137 or the second fin 2138 while moving downward toward the support plate opening axis $A_b$.

The first amount 3002 of the first portion 2602 of exhaust and the first amount 3006 of the second portion 2604 flow into the first chamber 1128 along the same plane (e.g., midline $A_M$) going opposite directions. The opposite flow through the first wall opening 2122 and the second wall opening 2124 further disrupt the downward flow of each of the second amount 3004 of the first portion 2602 of exhaust and the second amount 3008 of the second portion 2604 of exhaust within the first chamber 1128 further mixing exhaust with reductant.

Figure 31:
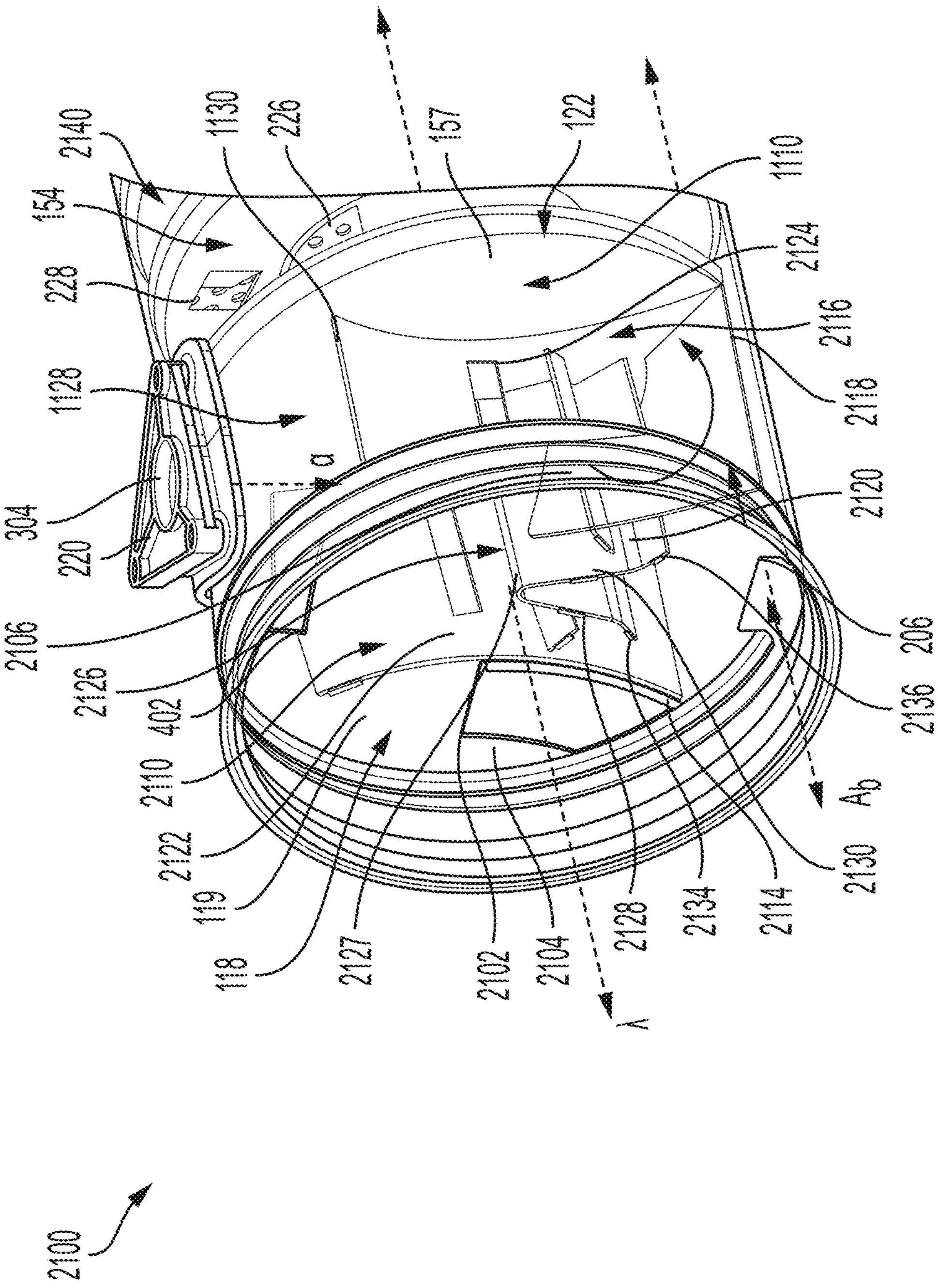
FIG. 31 is another perspective view of a portion of the exhaust mixer assembly of FIG. 21 with a portion of the exhaust mixer assembly shown with partial transparency.

As shown in FIG. 31, each of the first amount 3002 and the second amount 3004 of the first portion 2602 along with the first amount 3006 and the second amount 3008 of the second portion 2604 of exhaust flow into the second mixing chamber 156 via the support plate opening 158. Concurrently, exhaust is flowing through the auxiliary opening 206 along the support plate opening axis $A_b$ mixing with each of the first amount 3002 and the second amount 3004 of the first portion 2602 along with the first amount 3006 and the second amount 3008 of the second portion 2604 of exhaust below the second opening 1132.

Figure 32:
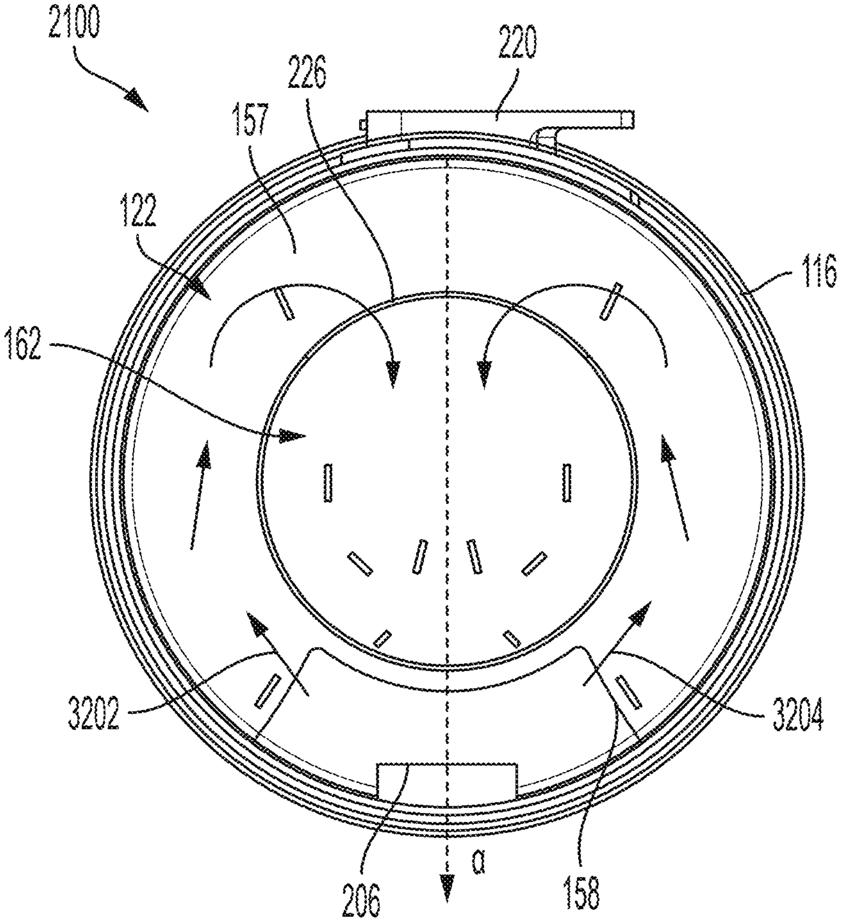
FIG. 32 is a longitudinal view of the exhaust mixer assembly of FIG. 24 taken along plane I-I.

As shown in FIG. 32, once inside the second mixing chamber 156, a first portion 3202 and a second portion 3204 of exhaust are directed upwards towards a side of the mixer housing 116 where the injector mounting bracket 220 is positioned. The first portion 3202 and the second portion 3204 of exhaust converge and mix near the each of the first amount 3002 and the second amount 3004 of the first portion 2602 along with the first amount 3006 and the second amount 3008 of the second portion 2604 of exhaust and then are directed downward towards the support plate opening axis $A_b$ through the conveying tube lateral opening 226.

Figure 33:
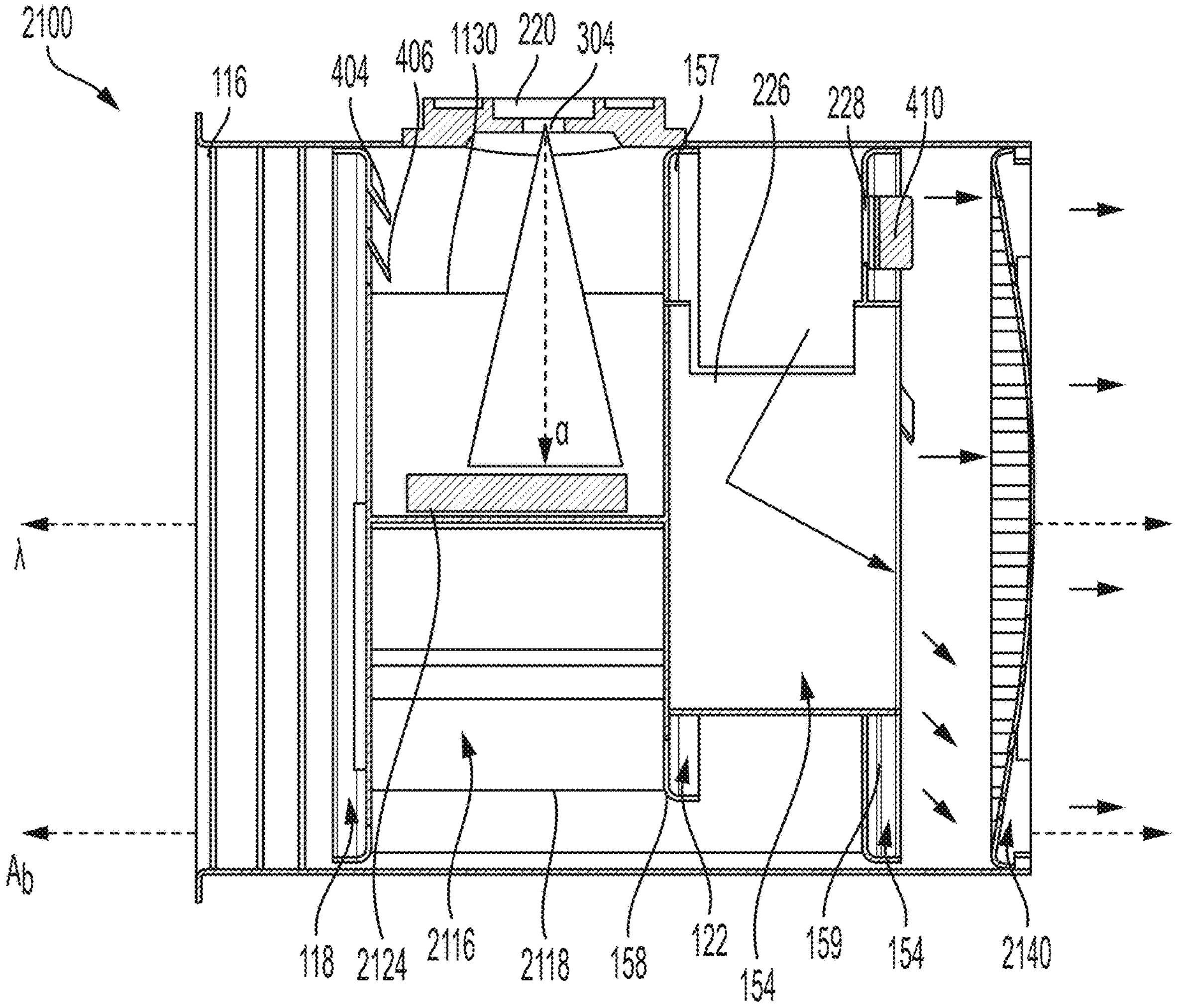
FIG. 33 is another cross-sectional view of the exhaust mixer assembly of FIG. 21 taken along plane E-E.

As shown in FIG. 33, once inside the conveying tube 162, a portion of exhaust is directed along the longitudinal axis λ of the mixer housing 116 and out of the outlet opening 160. A second portion of exhaust bypassed the conveying tube 162 and exits the second mixing chamber through the plurality of peripheral openings 228. After exiting the outlet opening 160 or one of the plurality of peripheral openings 228, exhaust in then directed through the plurality of openings 2142 of the perforated plate 2140.

VI. Configuration of Example Embodiments

As utilized herein, an area is measured along a plane (e.g., a two-dimensional plane, etc.) unless otherwise indicated. This area may change in a direction that is not disposed along the plane (e.g., along a direction that is orthogonal to the plane, etc.) unless otherwise indicated.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "configured to receive exhaust gas from," "configured to receive air from," "configured to receive reductant from," and the like, as used herein, mean the two components or objects have a pathway formed between the two components or objects in which a fluid, such as air, reductant, an air-reductant mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust mixer assembly comprising:

a mixer housing;

an inlet plate coupled to the mixer housing and comprising a first inlet opening;

a support plate coupled to the mixer housing downstream of the inlet plate, the support plate comprising a support plate opening;

a first inlet tube having an upstream end coupled to the inlet plate and configured to receive exhaust from the first inlet opening, and a downstream end that is closed by a first portion of the support plate, wherein the first inlet tube comprises a first inlet tube lateral opening that extends through a circumferential wall of the first inlet tube, and wherein the first inlet tube is offset from the support plate opening;

an outlet plate coupled to the mixer housing downstream of the support plate, the outlet plate comprising an outlet opening; and a conveying tube coupled to the support plate and the outlet plate, the conveying tube comprising a conveying tube lateral opening that extends through a circumferential wall of the conveying tube, wherein the conveying tube is configured to provide exhaust to the outlet opening.

2. The exhaust mixer assembly of claim 1, wherein, when viewed in a longitudinal direction of the mixer housing, the first inlet tube lateral opening is located in a top half of the first inlet tube, the support plate opening is in a bottom half of the support plate, and the conveying tube lateral opening is located in a top half of the conveying tube.

3. The exhaust mixer assembly of claim 1, further comprising a perforated plate coupled to the mixer housing and positioned downstream of the outlet plate, wherein the perforated plate only partially overlaps the outlet opening when viewed in a longitudinal direction of the mixer housing.

4. The exhaust mixer assembly of claim 3, wherein the perforated plate overlaps between 30% and 70% of the outlet opening when viewed in a longitudinal direction of the mixer housing.

5. The exhaust mixer assembly of claim 3, wherein, when viewed in a longitudinal direction of the mixer housing, the conveying tube lateral opening is located in a top half of the conveying tube, and at least 80% of a cross-sectional area of the perforated plate is located in a bottom half of a cross-sectional area of the mixer housing.

6. The exhaust mixer assembly of claim 1, wherein:

the inlet plate further comprises a second inlet opening, and the exhaust mixer assembly comprises a second inlet tube having an upstream end coupled to the inlet plate and configured to receive exhaust from the second inlet opening, and a downstream end that is closed by a second portion of the support plate, wherein the second inlet tube comprises a second inlet tube lateral opening that extends through a circumferential wall of the second inlet tube, and wherein the second inlet tube is offset from the support plate opening.

7. The exhaust mixer assembly of claim 1, wherein the inlet plate further comprises an auxiliary opening located in a bottom half of the inlet plate when viewed in a longitudinal direction of the mixer housing, wherein the first inlet opening is positioned in a top half of the inlet plate when viewed in the longitudinal direction of the mixer housing.

8. The exhaust mixer assembly of claim 7, comprising a first flap extending from an edge of the auxiliary opening.

9. The exhaust mixer assembly of claim 1, wherein the outlet plate comprises at least one peripheral opening positioned outward of the outlet opening.

10. The exhaust mixer assembly of claim 1, wherein the mixer housing comprises a reductant injection opening at a location between the inlet plate and the support plate.

11. The exhaust mixer assembly of claim 2, wherein the mixer housing comprises a reductant injection opening at a location between the inlet plate and the support plate, wherein, when viewed in a longitudinal direction of the mixer housing, the reductant injection opening is located in an upper half of the mixer housing.

12. The exhaust mixer assembly of claim 6, wherein the mixer housing comprises a reductant injection opening at a location between the inlet plate and the support plate, and a center axis of the reductant injection opening extends between the first inlet tube and the second inlet tube.

13. The exhaust mixer assembly of claim 6, wherein:

the first inlet tube comprises a first flat surface on a side facing the second inlet tube; and the second inlet tube comprises a second flat surface on a side facing the first inlet tube.

14. The exhaust mixer assembly of claim 13, wherein a distance between the first flat surface and the second flat surface increases in a direction from an upper side to a lower side of the first and second inlet tubes.

15. The exhaust mixer assembly of claim 1, wherein the inlet plate further comprises a flow assist opening positioned adjacent to the first inlet opening.

16. The exhaust mixer assembly of claim 15, comprising a second flap extending from an edge of the flow assist opening.

17. An exhaust mixer assembly comprising:

a mixer housing;

an inlet plate coupled to the mixer housing, the inlet plate comprising:

a first inlet opening positioned on a first side of the inlet plate, and a second inlet opening positioned on a second side of the inlet plate opposite the first inlet opening;

a support plate coupled to the mixer housing downstream of the inlet plate, the support plate comprising a support plate opening;

a first wall and a second wall extending from the inlet plate to the support plate;

a first chamber inside the first wall and the second wall, upper edges of the first wall and the second wall defining an opening into the first chamber and lower edges of the first wall and the second wall extending to the mixer housing;

a second chamber outside of the first wall and the second wall;

an outlet plate coupled to the mixer housing downstream of the support plate, the outlet plate comprising an outlet opening; and a conveying tube coupled to the support plate and the outlet plate, the conveying tube comprising a conveying tube lateral opening that extends through a circumferential wall of the conveying tube, wherein the conveying tube is configured to provide exhaust to the outlet opening.

18. The exhaust mixer assembly of claim 17, wherein, when viewed in a longitudinal direction of the mixer housing, the opening into the first chamber is located in a top half of the inlet plate and the support plate, the support plate opening is in a bottom half of the support plate, and the conveying tube lateral opening is located in a top half of the conveying tube.

19. The exhaust mixer assembly of claim 17, wherein the inlet plate further comprises an auxiliary opening located in the bottom half of the inlet plate when viewed in a longitudinal direction of the mixer housing.

20. The exhaust mixer assembly of claim 17, further comprising a perforated plate coupled to the mixer housing and positioned downstream of the outlet plate, wherein the perforated plate only partially overlaps the outlet opening when viewed in a longitudinal direction of the mixer housing.

21. The exhaust mixer assembly of claim 20, wherein the perforated plate overlaps between 30% and 70% of the outlet opening when viewed in a longitudinal direction of the mixer housing.

22. The exhaust mixer assembly of claim 20, wherein, when viewed in a longitudinal direction of the mixer housing, the conveying tube lateral opening is located in a top half of the conveying tube, and at least 80% of a cross-sectional area of the perforated plate is located in a bottom half of a cross-sectional area of the mixer housing.

23. The exhaust mixer assembly of claim 17, wherein the outlet plate comprises at least one peripheral opening positioned outward of the outlet opening.

24. The exhaust mixer assembly of claim 17, wherein the first wall comprises a first cylindrical surface and a first flat surface, and the second wall comprises a second cylindrical surface and a second flat surface.

25. The exhaust mixer assembly of claim 24, wherein a distance between the first flat surface and the second flat surface increases in a direction from an upper side to a lower side of the first flat surface and the second flat surface.

26. The exhaust mixer assembly of claim 17, further comprising a perforated plate coupled to the mixer housing and positioned downstream of the outlet plate, wherein the perforated plate overlaps an entirety of the outlet opening when viewed in a longitudinal direction of the mixer housing.

27. The exhaust mixer assembly of claim 17, wherein the mixer housing comprises a reductant injection opening at a location between the inlet plate and the support plate, and a center axis of the reductant injection opening extends between the first wall and the second wall.

28. The exhaust mixer assembly of claim 27, further comprising:

an impingement plate positioned between the first wall and the second wall, the impingement plate comprising:

an edge extending along an axis that is parallel to a longitudinal axis of the mixer housing, the edge being separated from the first wall and separated from the second wall, a first wing separated from the first wall and extending from the edge in a first direction away from the reductant injection opening, and a second wing separated from the second wall and extending from the edge in a second direction away from the reductant injection opening, the second wing separated from the first wing.

29. The exhaust mixer assembly of claim 28, wherein the axis is coincident with the longitudinal axis.

30. The exhaust mixer assembly of claim 29, wherein:

the edge is separated from the first wall by a first distance, the first distance being less than or equal to 10% of a diameter of the mixer housing; and the edge is separated from the second wall by a second distance, the second distance being less than or equal to 10% of the diameter of the mixer housing.

31. The exhaust mixer assembly of claim 28, further comprising:

a first fin coupled to the inlet plate and the support plate, the first fin positioned between the first wall and the first wing; and a second fin coupled to the inlet plate and the support plate, the second fin positioned between the second wall and the second wing.

32. The exhaust mixer assembly of claim 27, wherein the first wall comprises a first wall opening, and the second wall comprises a second wall opening opposite the first wall opening.

33. The exhaust mixer assembly of claim 32, further comprising:

an impingement plate positioned between the first wall and the second wall, the impingement plate comprising:

an edge extending along an axis that is parallel to a longitudinal axis of the mixer housing, the edge being separated from the first wall and separated from the second wall, a first wing separated from the first wall and extending from the edge in a first direction away from the reductant injection opening, and a second wing separated from the second wall and extending from the edge in a second direction away from the reductant injection opening, the second wing separated from the first wing;

wherein each of the first wall opening and the second wall opening are positioned between the edge and the reductant injection opening.

* * * * *